US000001063H

United States Statutory Invention Registration [19]

[11] Reg. Number: H1063

Hosoi

[43] Published: Jun. 2, 1992

[54] NEGATIVE TYPE LIGHT-SENSITIVE SILVER HALIDE PHOTOGRAPHIC MATERIAL

[76] Inventor: Yuji Hosoi, c/o Konica Corporation 1, Sakuramachi, Hino-shi, Tokyo, Japan

[21] Appl. No.: 432,045

[22] Filed: Nov. 6, 1989

[30] Foreign Application Priority Data

Nov. 9, 1988 [JP] Japan ..... 63-281304

[51] Int. Cl.[5] ..... G03C 1/06; G03C 1/005

[52] U.S. Cl. ..... 430/264; 430/642; 430/539; 430/401

[58] Field of Search ..... 430/264, 642

[56] References Cited

U.S. PATENT DOCUMENTS

| | | | |
|---|---|---|---|
| 4,634,661 | 1/1987 | Cavallaro | 430/567 |
| 4,686,167 | 8/1987 | Resnick et al. | 430/265 |
| 4,737,452 | 4/1988 | Kameoka et al. | 430/600 |
| 4,816,373 | 3/1989 | Ohashi et al. | 430/264 |
| 4,828,968 | 5/1989 | Okutsu | 430/398 |
| 4,830,950 | 5/1989 | Kuwabara et al. | 430/264 |
| 4,950,578 | 8/1990 | Yagihara et al. | 430/264 |
| 4,971,890 | 11/1990 | Okada et al. | 430/264 |
| 4,988,603 | 1/1991 | Takamuki et al. | 430/264 |

*Primary Examiner*—Robert L. Stoll
*Assistant Examiner*—C. Harris

[57] ABSTRACT

Disclosed is a negative type light-sensitive silver halide photographic material comprising at least one light-sensitive silver halide emulsion provided on a support, wherein the ratio of silver amount to gelatin amount (Ag/Gel) (wherein the silver amount is the total silver amount in one or more layers provided in the same side as the light-sensitive silver halide emulsion layer with respect to the support, and the gelatin amount is the total gelatin amount in one or more gelatin layers provided in the same side as the light-sensitive silver halide emulsion layer with respect to the support) is 1.0 or more, and a hydrophilic colloid layer in the light-sensitive silver halide emulsion contains a hydrazine compound.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NEGATIVE TYPE LIGHT-SENSITIVE SILVER HALIDE PHOTOGRAPHIC MATERIAL

BACKGROUND OF THE INVENTION

This invention relates to a negative type light-sensitive silver halide photographic material.

In recent years, in the field of printing plates, the developing method by use of a developer of hydroquinone alone called lith-developing for obtaining an image of high contrast has been the main stream, but this method is poor in preservability of the developer, and also since the developing time is long, a rapid access development using phenidone or metol as the developing agent is incorporated.

However, if such developer is used, the high contrast characteristic of lith-developing will be lost.

Accordingly, so as to have high contrast characteristic comparable with lith-developing in spite of fast processing, the method of adding a tetrazolium compound or a hydrazine compound into the film has been proposed, and it has been reported that an image of high contrast can be obtained by this method even by fast processing with a developing time of 20 to 30 seconds.

However, the trend of fast processing in recent years is demanding even ultra-fast processing such as shorter than 20 seconds, and also the situation is such that also the image quality inferior to the present level is not tolerable. When the light-sensitive material of the prior art is subjected to ultra-fast processing with a developing time as short as 15 seconds by use of a processing solution of the prior art, the amount of the silver developed is small to give no sufficient density as unsuitable for practical application.

Further, in this field of art, there is the working of etching chemically developed silver, which is called "reduction", and the image developed is demanded to have sufficient amount of silver, and also from the standpoint of saving of resources, it is preferable that 90% of the silver coated should participate effectively in the development.

Thus, it has been desired to have a means which enables development of sufficient silver amount without waste within a short time and can give an image of high contrast.

SUMMARY OF THE INVENTION

An object of the present invention is to provide a negative type light-sensitive silver halide photographic material which can solve the above-mentioned problems, namely capable of developing sufficient amount of silver without waste within a short time, and having an image of high contrast.

The above object can be accomplished by a negative type light-sensitive silver halide photographic material comprising at least one light-sensitive silver halide emulsion provided on a support, wherein the ratio of silver amount to gelatin amount (Ag/Gel) (wherein said silver amount is the total silver amount in one or more layers provided in the same side as said light-sensitive silver halide emulsion layer with respect to the support, and said gelatin amount is the total gelatin amount in one or more gelatin layers provided in the same side as said light-sensitive silver halide emulsion layer with respect to the support) is 1.0 or more, and a hydrophilic colloid layer in said light-sensitive silver halide emulsion contains a hydrazine compound.

In the present invention, it is desirable that the light-sensitive silver halide photographic material should contain 2 g/m$^2$ or less, more preferably 0.2 to 1.5 g/m$^2$ of a polymer latex therein.

More specifically, the present inventors have found that in order to obtain sufficient density after development processing by ultra-fast processing, increase of Ag/Gel should be extremely preferable rather than mere increase of the silver amount coated, to have accomplished the above invention. However, by merely increasing Ag/Gel, there is a tendency that cracking may occur when the raw film and the film after processing is stored under low humidity conditions (at relative humidity of 30% or lower) during storage, and hence it has been found that a polymer latex of 2 g/m$^2$ or lower should be desirably contained in the light-sensitive silver halide photographic material. Also, by doing so, the problem of coating irregularity has been reduced.

DESCRIPTION OF THE PREFERRED EMBODIMENTS

The specific content of the present invention will be explained below.

The gelatin amount in the present invention is the sum of the gelatin amount in the gelatin layers of one layer or more in the side including the light-sensitive silver halide emulsion layer with respect to the support (even in the case of the gelatin derivative as described below, the amount of the gelatin derivative is considered as the gelatin amount), and is not limited only to the gelatin amount in the silver halide emulsion layer. Also, the silver amount is the total silver amount in the respective layers, when it is provided by coating in a plural number of layers in the same side with respect to the support.

The hydrazine compound to be used in the present invention may include compounds represented by the following formula [I], [I-a], [I-b]or [I-c].

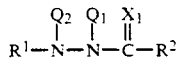

Formula [I]

wherein $R^1$ and $R^2$ each represent hydrogen atom, a monovalent aromatic residue, a monovalent heterocyclic residue or a monovalent aliphatic residue, $Q_1$ and $Q_2$ each represent hydrogen atom, an alkylsulfonyl group which may be substituted or unsubstituted, an arylsulfonyl group which may be substituted or unsubstituted, and Xl represents oxygen atom or sulfur atom.

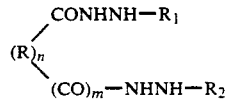

Formula [I-a]

wherein $R_1$ and $R_2$ each represent an aryl group or a heterocyclic group, R represents a divalent organic linking group, n is 0 to 6, m is 0 or 1, and when n is 2 or more, respective R's may be either the same or different.

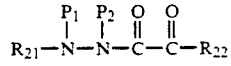

Formula [I-b]

wherein $R_{21}$ represents an aliphatic group, an aromatic group or a heterocyclic group, $R_{22}$ represents hydrogen atom, an alkoxy group which may be substituted, a heterocyclic oxy group, an amino group or an aryloxy group, $P_1$ and $P_2$ each represent hydrogen atom, an acyl group or a sulfinic acid group.

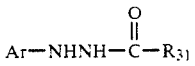

Formula [I-c]

wherein Ar represents an aryl group containing at least one of diffusion resisitant group or silver halide adsorption promoting group, and $R_{31}$ represents a substituted alkyl group.

Of the hydrazine compounds represented by Formula [I] to be used in the present invention, the compounds wherein $X_1$ is oxygen atom and $R^2$ is hydrogen atom are particularly preferred.

As the monovalent organic residue of the above $R^1$ and $R^2$, aromatic residues, heterocyclic residues and aliphatic residues are included.

As the aromatic residues, there may be included phenyl group, naphthyl group and these groups having substituents (e.g. alkyl, alkoxy, acylhydrazino, dialkylamino, alkoxycarbonyl, cyanol, carboxyl, nitro, alkylthio, hydroxy, sulfonyl, carbamoyl groups, halogen atoms, acylamino, sulfonamide, thiourea groups, etc ). Specific examples having substituents may include 4-methylphenyl, 4-ethylphenyl, 4-oxyethylphenyl, 4-dodecylphenyl, 4-carboxyphenyl, 4-diethylaminophenyl, 4-octylaminophenyl, 4-benzylaminophenyl, 4-acetamido-2-methylphenyl, 4-(3-ethylthioureido)-phenyl,4-[2-(2,4-di-tert-butylphenoxy)butylamido]phenyl, 4-[2-(2,4-di-tert-butylphenoxy)butylamido]phenyl groups, etc.

As the heterocyclic groups, 5-membered or 6-membered monocyclic or fused rings having at least one of oxygen, nitrogen, sulfur or selenium atom may be included, and these may have substituents. Specific examples may include residues such as pyrroline, pyridine, quinoline, indole, oxazole, benzooxazole, naphthoxazole, imidazole, benzoimidazole, thiazoline, thiazole, benzothiazole, naphthothiazole, selenazole, benzoselenazole, naphthoselenazole rings, etc.

These heterocyclic rings may be also substituted with alkyl groups having 1 to 4 carbon atoms, alkoxy groups having 1 to 4 carbon atoms, aryl group having 6 to 18 carbon atoms, halogen atoms, alkoxycarbonyl group, cyano group, amide group, etc.

As the aliphatic residues, straight and branched alkyl groups, cycloalkyl groups and these groups attached with substituents, as well as alkenyl and alkynyl groups are included.

Examples of the straight or branched alkyl group may include alkyl groups having 1 to 18, preferably 1 to 8 carbon atoms, specifically methyl, ethyl, isobutyl, 1-octyl groups and the like.

Examples of the cycloalkyl group may include those having 3 to 10 carbon atoms, specifically cyclopropyl, cyclohexyl, adamantyl groups and the like. As the substituent on the alkyl group or the cycloalkyl group, there may be included alkoxy, alkoxycarbonyl, carbamoyl, hydroxy, alkylthio, amide, acyloxy, cyano, sulfonyl groups, halogen atoms, aryl groups, etc., and specific examples of those substituted can include 3-methoxypropyl, ethoxycarbonylmethyl, 4-chlorocyclohexyl, benzyl, p-methylbenzyl, p-chlorobenzyl groups, etc.

As the alkenyl group, for example, allyl group, and as the alkynyl group, propargyl group may be included.

Specific examples of the hydrazine compound to be used in the present invention are shown below, but the present invention is not limited by these at all.

(I-1) 1-Formyl-2-{4-[2-(2,4-di-tert-butylphenoxy)-butylamido]phenyl}hydrazine (I-2) 1-Formyl-2-{4-[2-(2,4-di-tert-butylphenoxy)-butylureido]phenyl}hydrazine (I-3) 1-Formyl-2-(4-diethylaminophenyl)hydrazine (I-4) 1-Formyl-2-(p-tolyl)hydrazine (I-5) 1-Formyl-2-(4-ethylphenyl)hydrazine (I-6) 1-Formyl-2-(4-acetamido-2-methylphenyl)hydrazine (I-7) 1-Formyl-2-(4-oxyethylphenyl)hydrazine (I-8) 1-Formyl-2-(4-N,N-dihydroxyethylaminophenyl)-hydrazine (I-9) 1-Formyl-2-(4-(3-ethylthioureido)phenyl)hydrazine (I-10) 1-Thioformyl-2-(4-[2-(2,4-di-tert-butylphenoxy)-butylamido]phenyl)hydrazine (I-11) 1-Formyl-2-(4-benzylaminophenyl)hydrazine (I-12) 1-Formyl-2-(4-octylaminophenyl)hydrazine (I-13) 1-Formyl-2-(4-dodecylphenyl)hydrazine (I-14) 1-Acetyl-2-{4-[2-(2,4-di-tert-butylphenoxy)-butylamido]phenyl}hydrazine (I-15) 4-Carboxyphenylhydrazine (I-16) 1-Acetyl-1-(4-methylphenylsulfonyl)-2-phenylhydrazine (I-17) 1-Ethoxycarbonyl-1-(4-methylphenylsulfonyl)-2-phenylhydrazine (I-18) 1-Formyl-2-(4-hydroxyphenyl)-2-(4-methylphenylsulfonyl)hydrazine (I-19) 1-(4-Acetoxyphenyl)-2-formyl-1-(4-methylphenylsulfonyl)hydrazine (I-20) 1-Formyl-2-(4-hexanoxyphenyl)-2-(4-methylphenylsulfonyl)hydrazine (I-21) 1-Formyl-2-[4-(tetrahydro-2H-pyran-2-yloxy)-phenyl]-2-(4-methylphenylsulfonyl)hydrazine (I-22) 1-Formyl-2-(4-(3-hexylureidophenyl))-2-(4-methylphenylsulfonyl)hydrazine (I-23) 1-Formyl-2-(4-methylphenylsulfonyl)-2-[4-(phenoxythiocarbonylamino)phenyl]hydrazine (I-24) 1-(4-Ethoxythiocarbonylaminophenyl)-2-formyl-1-(4-methylphenylsulfonyl)hydrazine (I-25) 1-Formyl-2-(4-methylphenylsulfonyl)-2-[4-(3-methyl-3-phenyl-2-thioureido)phenyl]hydrazine (I-26) 1-{{4-{3-[4-(2,4-bis-t-amylphenoxy)butyl]ureido}phenyl}}-2-formyl-1-(4-methyl-phenylsulfonyl)hydrazine

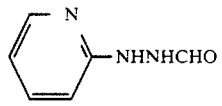

(I-27)

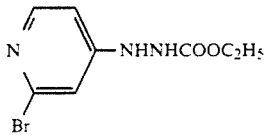

(I-28)

-continued
(I-29)
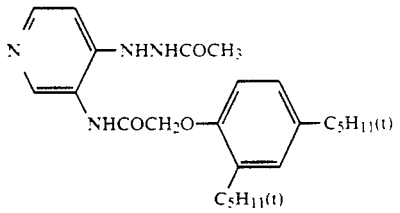
(I-30)
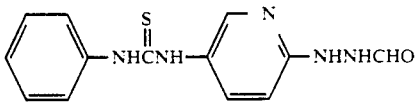
(I-31)
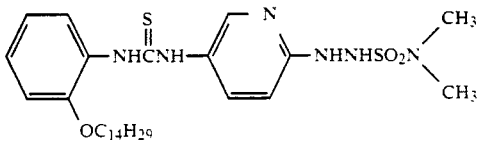
(I-32)
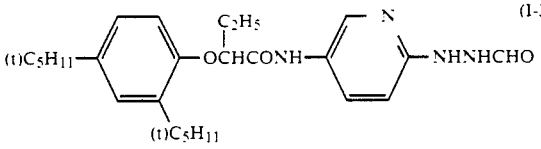
(I-33)
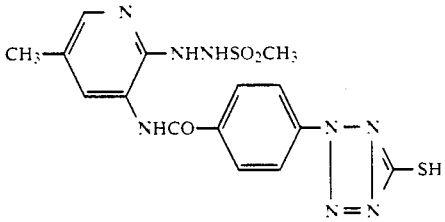
(I-34)
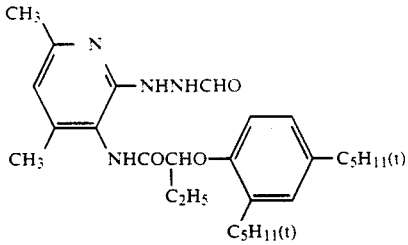
(I-35)
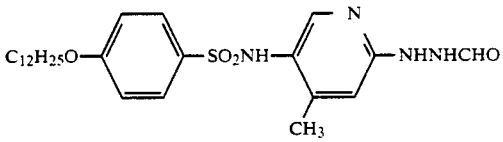
(I-36)
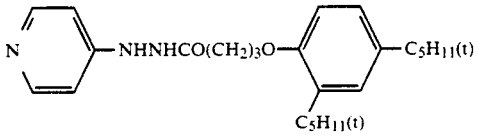
-continued
(I-37)
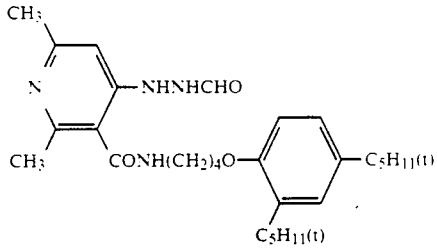
(I-38)
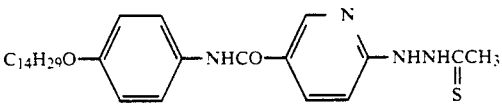
(I-39)
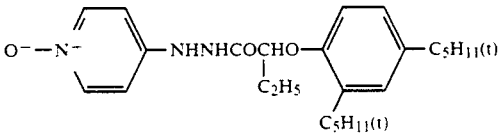
(I-40)
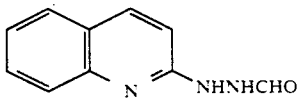
(I-41)
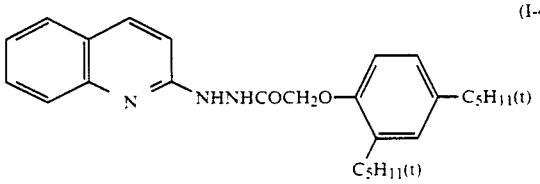
(I-42)
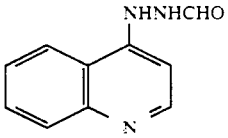
(I-43)
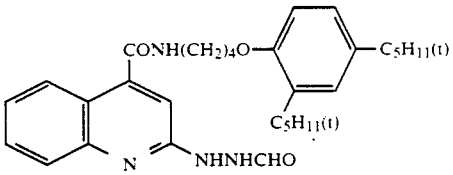
(I-44)
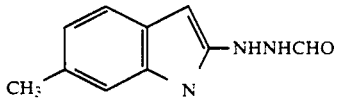
(I-45)
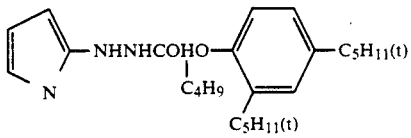
(I-46)
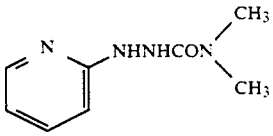

-continued (I-47)

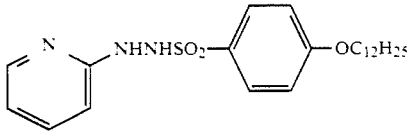

Next, Formulae [I - a], [I -b] and [I - c] are to be described in more detail below.

Formula [I-a]

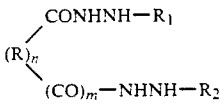

In the formula, $R_1$ and $R_2$ each represent an aryl group or a heterocyclic group, R represents a divalent organic linking group, and n represents 0 to 6 and m represents 0 or 1.

Here, the aryl group represented by $R_1$ and $R_2$ may include phenyl group, naphthyl group, and the heterocyclic group represented by $R_1$ and $R_2$ may include pyridyl group, benzothiazolyl group, quinolyl group, thienyl group, etc., but $R_1$ and $R_2$ may be preferably aryl groups. The aryl group or heterocyclic group represented by $R_1$ and $R_2$ can introduce various substituents therein. Examples of substituents may include halogen atoms (e.g. chlorine, fluorine, etc.), alkyl groups (e.g. methyl, ethyl, dodecyl, etc.), alkoxy groups (e.g. methoxy, ethoxy, isopropoxy, butoxy, octyloxy, dodecyloxy, etc.), acylamino groups {e.g. acetylamino, pivalylamino, benzoylamino, tetradecanoylamino α-(2 4-di-t-amylphenoxy) butyrylamino, etc.}, sulfonylamino groups (e.g. methanesulfonylamino, butanesulfonylamino, dodecanesulfonylamino, benzenesulfonylamino, etc.), urea groups (e.g. phenylurea, ethylurea, etc.), thiourea groups (e.g. phenylthiourea, ethylthiourea, etc.), hydroxy group, amino group, alkylamino groups (e.g. methylamino, dimethylamino, etc.), carboxy group, alkoxycarbonyl groups (e.g. ethoxycarbonyl), carbamoyl group, sulfo group and so on. Examples of the divalent organic linking group represented by R may include alkylene groups (e.g. methylene, ethylene, trimethylene, tetramethylene, etc.), arylene groups (e.g. phenylene, naphthylene, etc.), aralkylene groups, etc., and the alkylene group may contain oxy group, thio group, seleno group, carbonyl group,

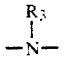

group ($R_3$ represents hydrogen atom, an alkyl group, an aryl group), sulfonyl group, etc. in the bond. Into the group represented by R can be introduced various substituents.

Examples of substituents may include —CONHNHR$_4$ ($R_4$ has the same meaning as $R_1$ and $R_2$ as described above), alkyl groups, alkoxy groups, halogen atoms, hydroxy group, carboxy group, acyl groups, aryl groups, etc.

R may be preferably a alkylene group.

Of the compounds represented by Formula [I - a], preferable are compounds wherein $R^1$ and $R^2$ are substituted or unsubstituted phenyl groups, n=m=1 and R represents an alkylene group.

Representative compounds represented by the above Formula [I - a] are shown below.

Specific compounds

I-a-1

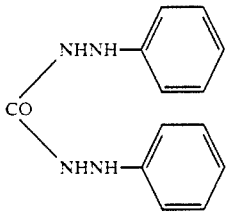

I-a-2

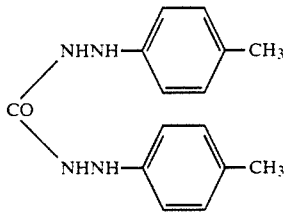

I-a-3

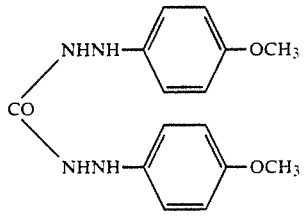

-continued
Specific compounds
I-a-4
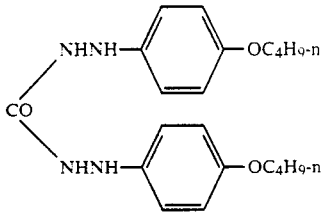
I-a-5
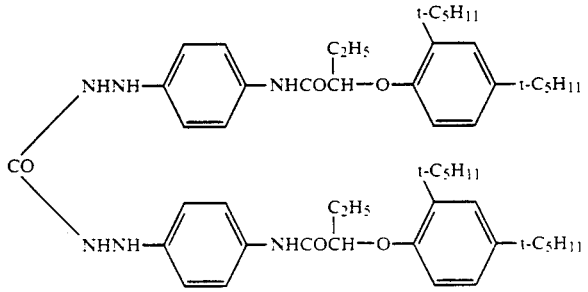
I-a-6
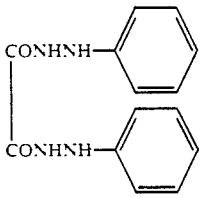
I-a-7
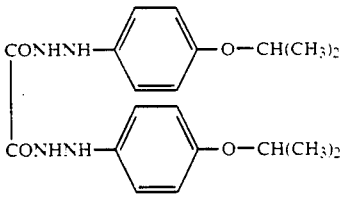
I-a-8
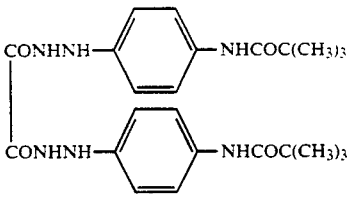
I-a-9
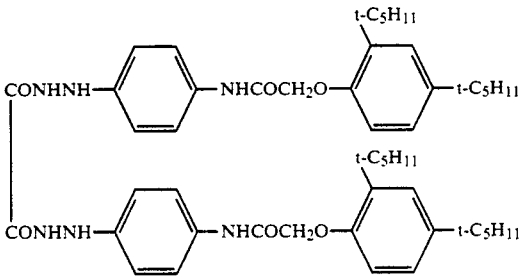

-continued
Specific compounds
I-a-10
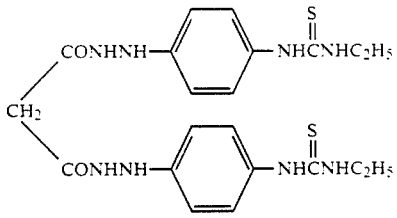
I-a-11
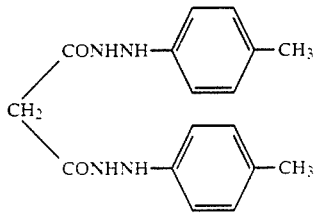
I-a-12
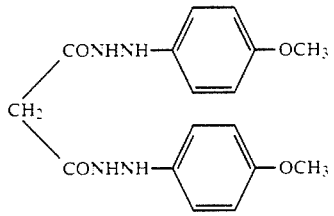
I-a-13
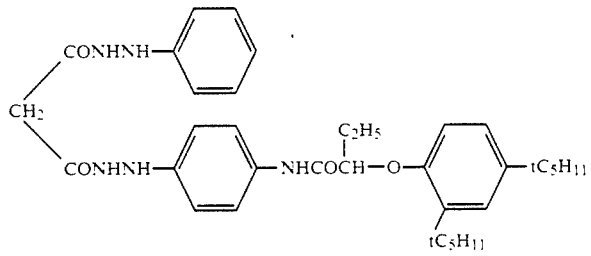
I-a-14
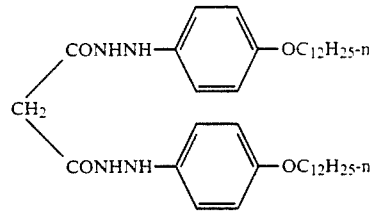
I-a-15
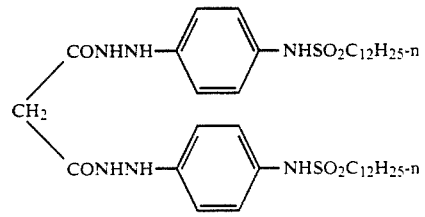

-continued
Specific compounds
I-a-16
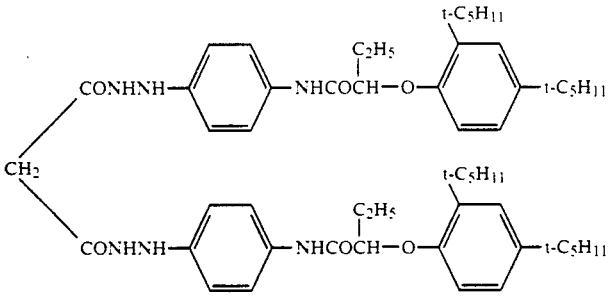
I-a-17
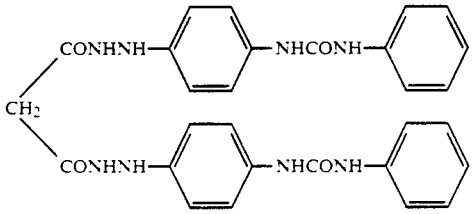
I-a-18
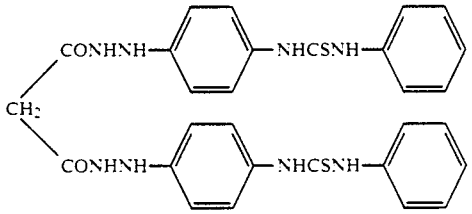
I-a-19
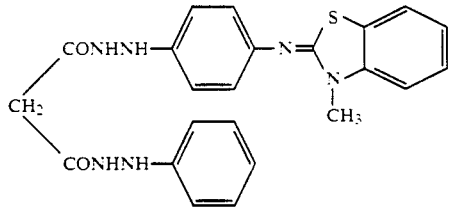
I-a-20
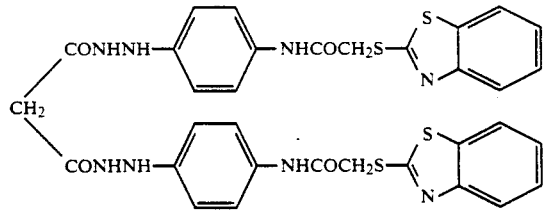
I-a-21
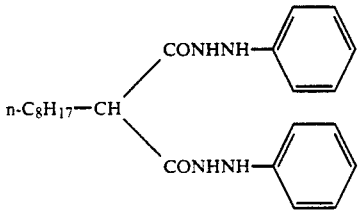

-continued
Specific compounds
I-a-22
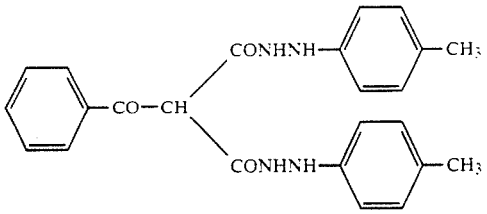
I-a-23
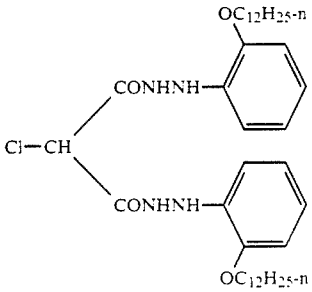
I-a-24
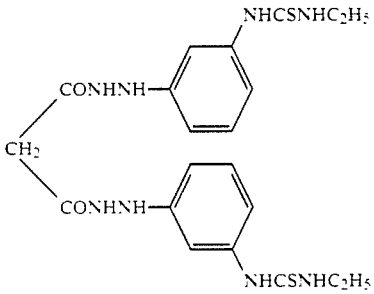
I-a-25
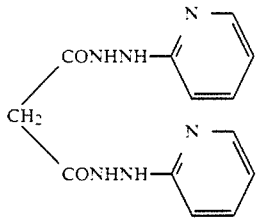
I-a-26
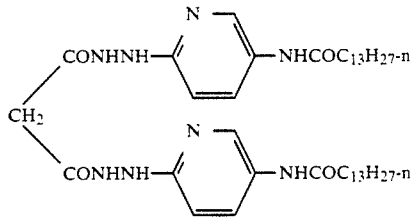
I-a-27
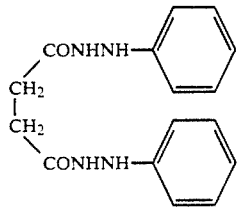

-continued
Specific compounds
I-a-28
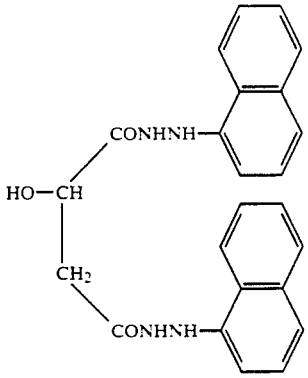
I-a-29
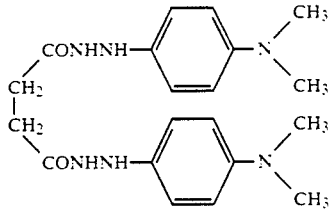
I-a-30
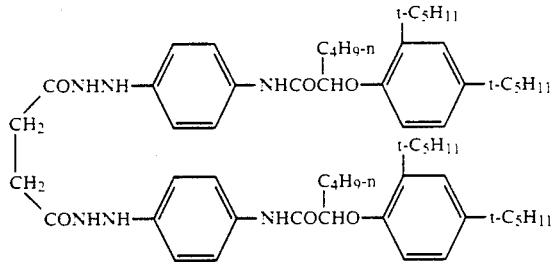
I-a-31
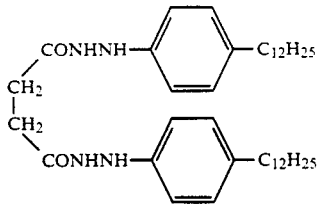
I-a-32
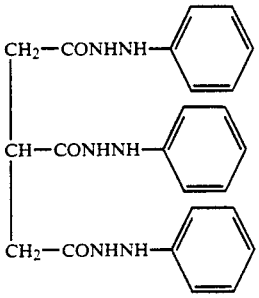

-continued
Specific compounds
I-a-33
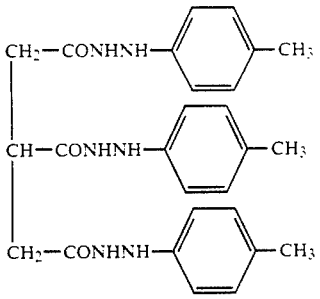
I-a-34
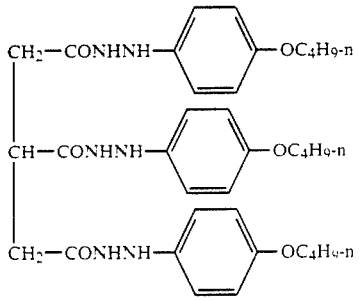
I-a-35
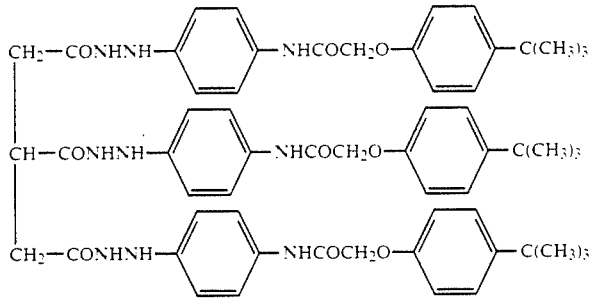
I-a-36
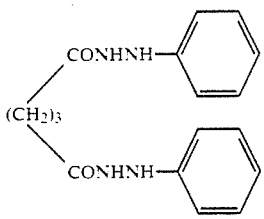
I-a-37
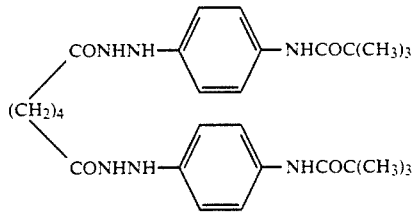
I-a-38
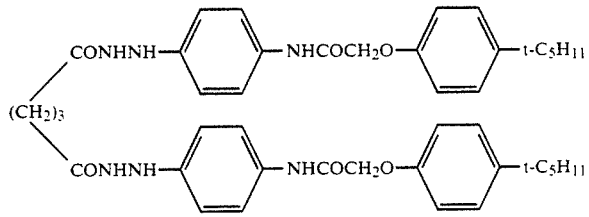

-continued
Specific compounds
I-a-39
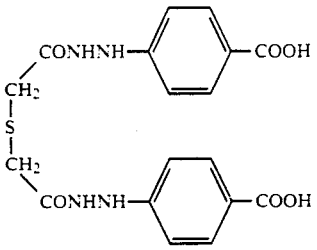
I-a-40
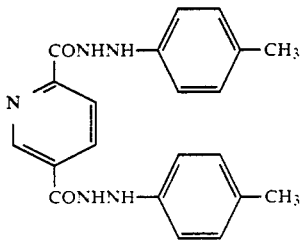
I-a-41
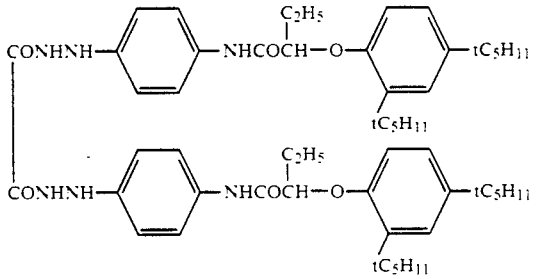
I-a-42
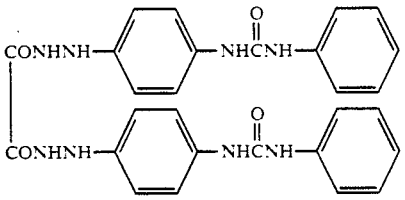
I-a-43
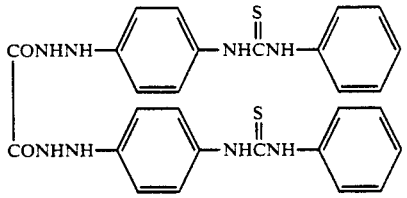
I-a-44
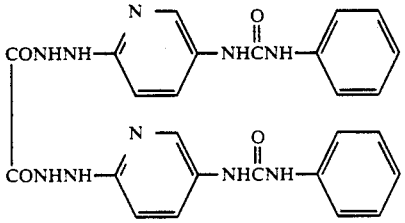

-continued
Specific compounds
I-a-45
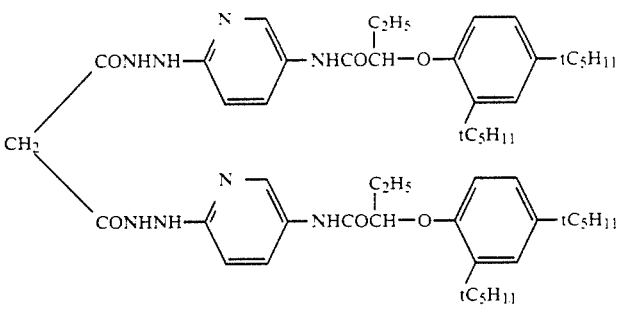
I-a-46
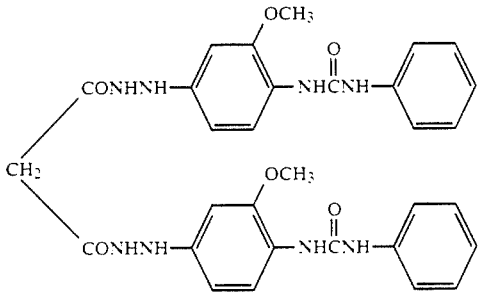
I-a-47
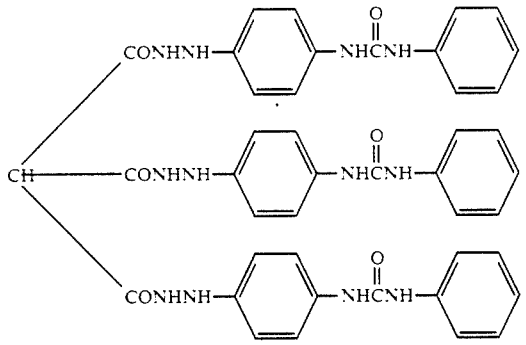
I-a-48
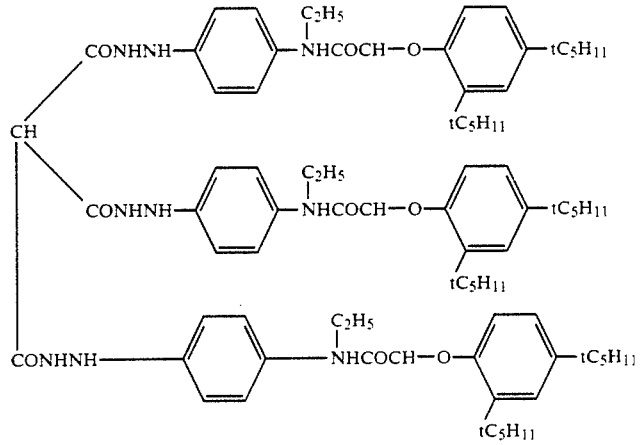

-continued
Specific compounds
I-a-49
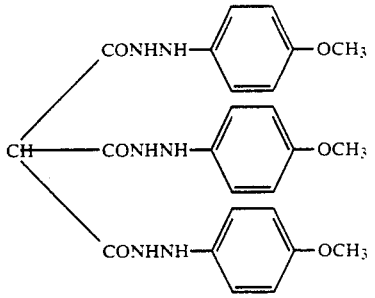
I-a-50
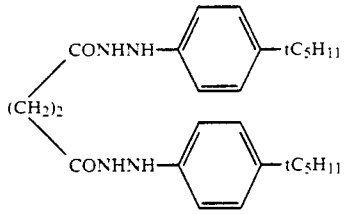
I-a-51
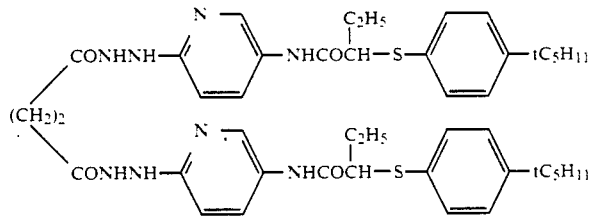
I-a-52
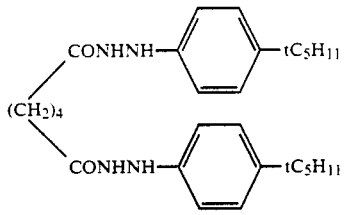
I-a-53
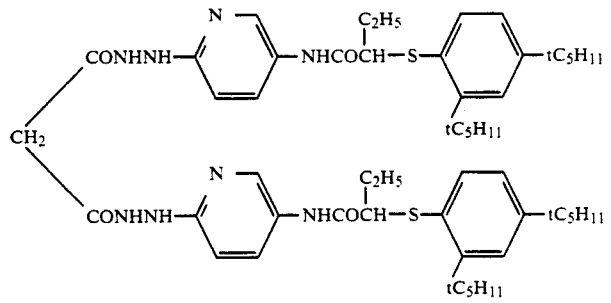

-continued

Specific compounds

I-a-54

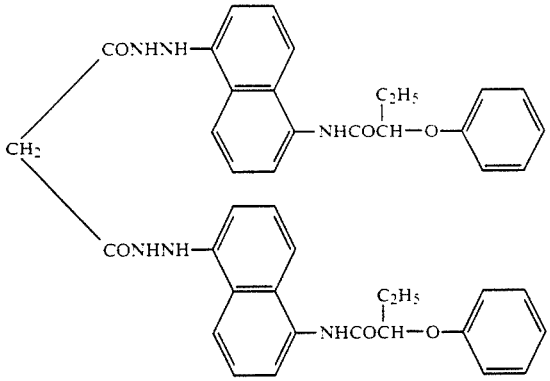

I-a-55

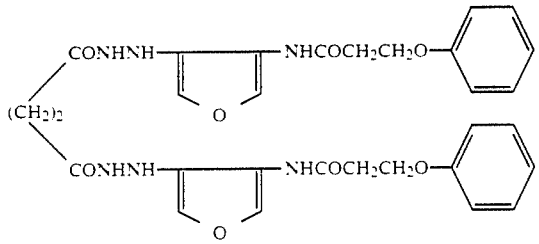

I-a-56

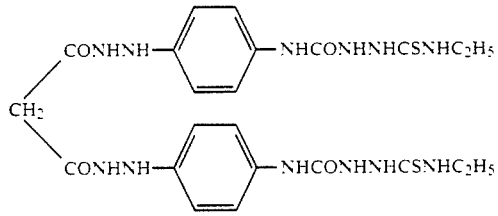

I-a-57

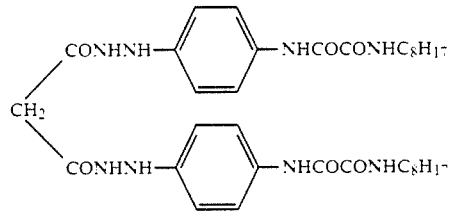

I-a-58

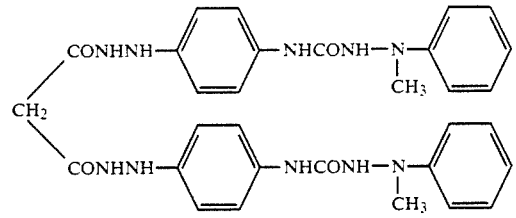

In the following, Formula [I - b] is to be described.

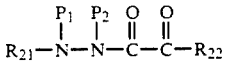

The aliphatic group represented by $R_{21}$ may be preferably one having 6 or more carbon atoms, particularly a straight, branched or cyclic alkyl group having 8 to 50 carbon atoms. Here, the branched alkyl group may be cyclized so as to form a saturated hetero ring containing one or more hetero atoms. The alkyl group may have substituent such as aryl group, alkoxy group, sulfoxy group, etc.

The aromatic group represented by $R_{21}$ is a monocyclic or bicyclic aryl group or unsaturated heterocyclic group. Here, the unsaturated heterocyclic group may be condensed with the monocyclic or bicyclic group to form a heteroaryl group.

For example, there may be included benzene ring, naphthalene ring, pyridine ring, pyrimidine group, imidazole ring, pyrazole ring, quinoline ring, isoquinoline ring, benzimidazole ring, thiazole ring, benzothiazole ring, etc., but amount them those containing benzene ring are preferred.

As $R_{21}$, particularly preferred is an aryl group.

The aryl group or unsaturated heterocyclic group represented by $R_{21}$ may be substituted, and representative substituents may include straight, branched or cyclic alkyl groups (preferably monocyclic or bicyclic ones with an alkyl moiety having 1 to 20 carbon atoms), alkoxy groups (having preferably 1 to 20 carbon atoms), substituted amino groups (preferably amino groups substituted with alkyl groups having 1 to 20 carbon atoms), acylamino groups (having preferably 2 to 30 carbon atoms), sulfonamide groups (having preferably 1 to 30 carbon atoms), ureido groups (having preferably 1 to 30 carbon atoms) and others.

Of the groups represented by $R_{22}$ in the formula [I - b], the alkoxy group which may be substituted may have 1 to 20 carbon atoms and may be substituted with halogen atoms, aryl groups, etc.

Of the groups represented by $R_{22}$ in the formula [I - b], the aryloxy group or the heterocyclic oxy group which may be also substituted may be preferably monocyclic, and the substituent may include halogen atoms, alkyl groups, alkoxy group, cyano group, etc.

Of the groups represented by $R_{22}$, preferable are alkoxy groups or amino groups which may be also substituted.

In the case of an amino group, $A_1$ and $A_2$ in the group

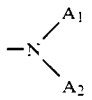

group may be an alkyl group, alkoxy group which may be substituted, or a cyclic structure containing —O—, —S—, —N— group bond. However, $R_{22}$ cannot be hydrazino group.

$R_{21}$ or $R_{22}$ in Formula [I - b] may be one having a ballast group conventionally used in the immobile additive for photography such as coupler, etc. incorporated therein. The ballast group is a group having 8 or more carbon atoms relatively inert to photographic characteristic, and can be chosen from, for example, alkyl groups, alkoxy groups, phenyl groups, alkylphenyl groups, phenoxy groups, alkylphenoxy groups, etc.

$R_{21}$ or $R_{22}$ in Formula [I- b] may be also one having a group for strengthening adsorption to the surface of silver halide grains incorporated therein. As such adsorptive groups, there may be included the groups as disclosed in U.S. Pat. No. 4,355,105 such as thiourea group, heterocyclic thioamide group, mercaptoheterocyclic group, triazole group, etc. Among the compounds represented by the group [I - b], the compounds represented by Formula [I - b - a] are particularly preferable.

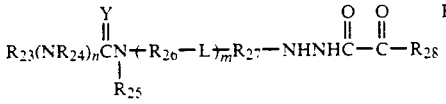

Formula [I-b-a]

In the Formula [I - b - a], $R_{23}$ and $R_{24}$ each represent hydrogen atom, an alkyl group which may be substituted (e.g. methyl, ethyl, butyl, dodecyl, 2-hydroxypropyl, 2-cyanoethyl, 2-chloroethyl group), a phenyl, naphthyl, cyclohexyl, pyridyl, pyrrolidyl group which may be substituted (e.g. phenyl, p-methylphenyl, naphthyl, α-hydroxynaphthyl, cyclohexyl, p-methylcyclohexyl, pyridyl, 4-propyl-2-pyridyl, pyrrolidyl, 4-methyl-2-pyrrolidyl group);

$R_{25}$ represents hydrogen atom or a benzyl, alkoxy and alkyl group which may be substituted (e.g. benzyl, p-methylbenzyl, methoxy, ethoxy, ethyl, butyl group);

$R_{26}$ and $R_{27}$ each represent a divalent aromatic group (e.g. phenylene or naphthylene group), Y represents sulfur atoms or oxygen atom, L represents a divalent linking group (e.g. $—SO_2CH_2CH_2NH—SO_2NH—$, $—OCH_2SO_2NH—$, —O—, —CH=N—);

$R_{28}$ represents —NR'R'' or $—OR_{29}$;

R', R'' and $R_{29}$ each represent hydrogen atom, an alkyl group which may be substituted (e.g. methyl, ethyl, dodecyl group), a phenyl group which may be substituted (e.g. phenyl, p-methylphenyl, p-methoxyphenyl group) or a naphthyl group which may be substituted (e.g. α-naphthyl group, β-naphthyl group), m, n represent 0 or 1, and when $R_{28}$ represents $OR_{29}$, Y should preferably represent sulfur atom.

Representative compounds represented by the above Formulae [I - b] and [I - b - a] are shown below.

Specific compounds of Formula [I-b]:

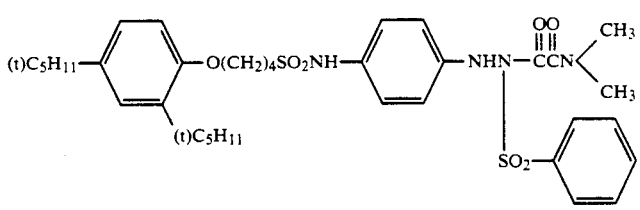

I-b-1

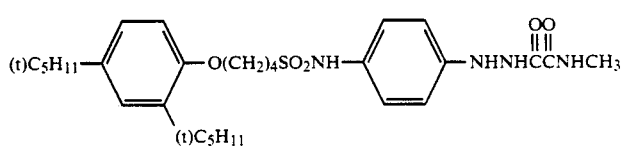

I-b-2

-continued
I-b-3
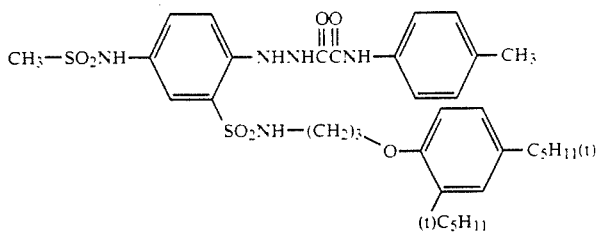
I-b-4
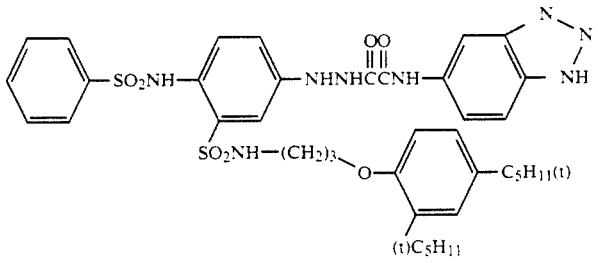
I-b-5
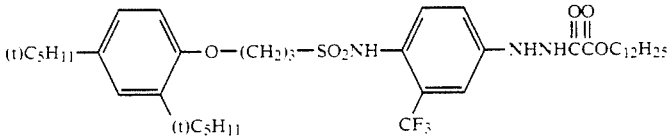
I-b-6
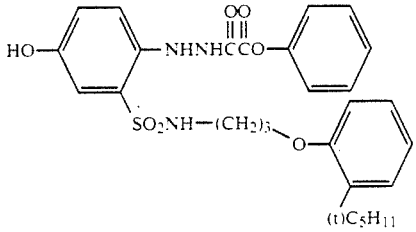
I-b-7
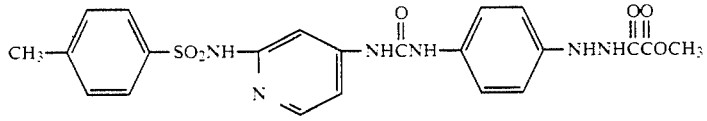
I-b-8
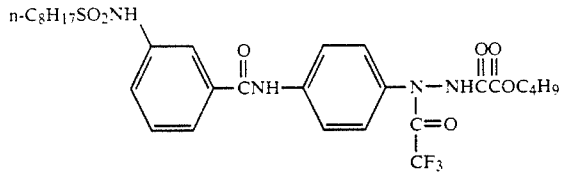
I-b-9
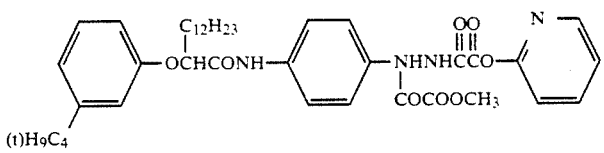
I-b-10
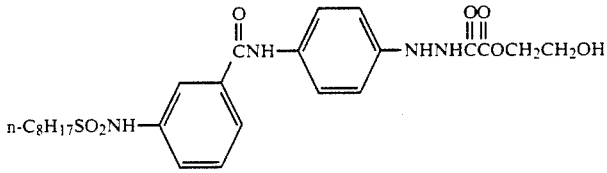

-continued
I-b-11
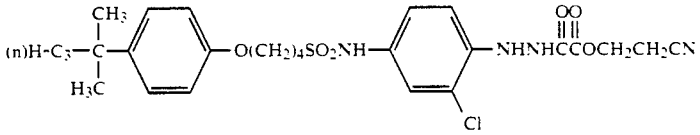
I-b-12
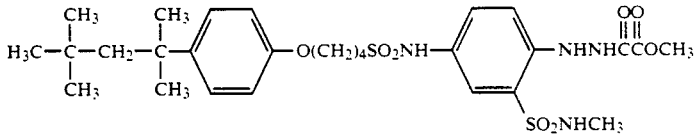
I-b-13
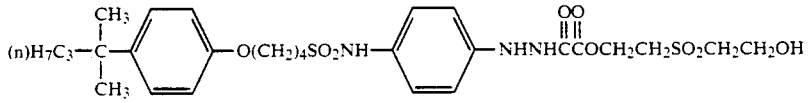
I-b-14
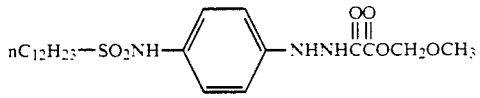
I-b-15
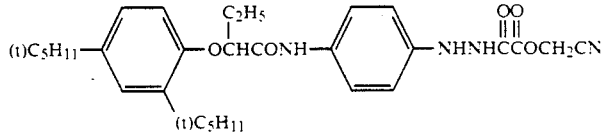
I-b-16
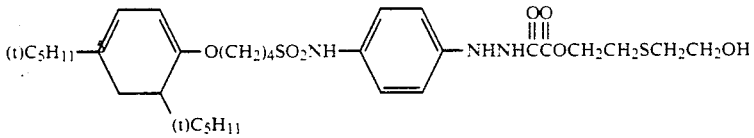
I-b-17
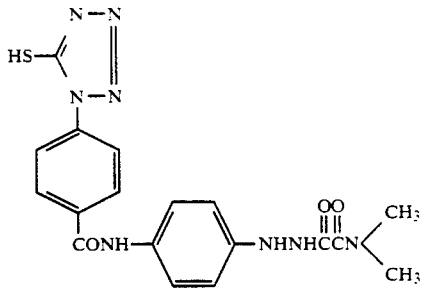
I-b-18
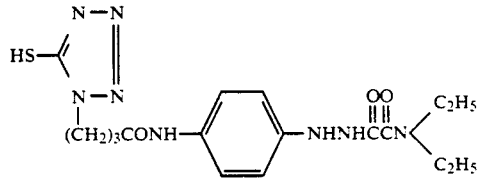

-continued
I-b-19
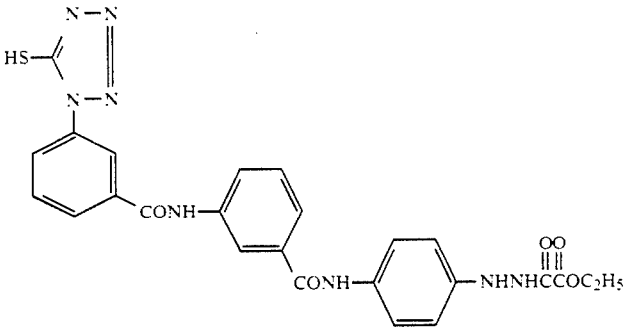
I-b-20
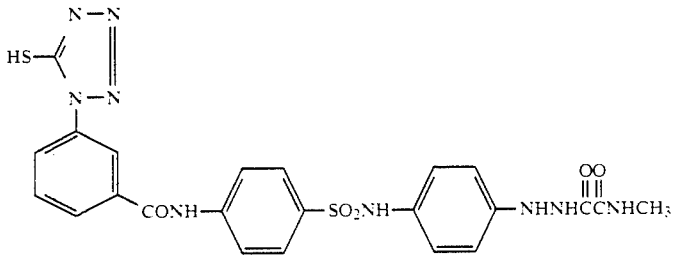
I-b-21
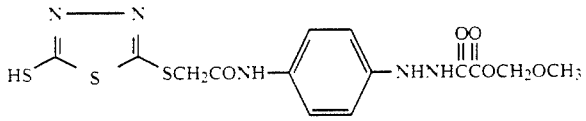
I-b-22
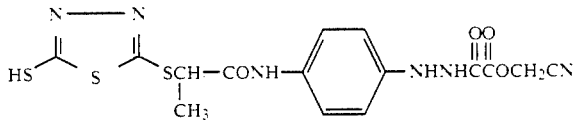
I-b-23
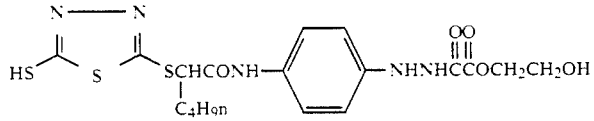
I-b-24
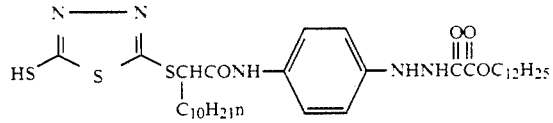
I-b-25
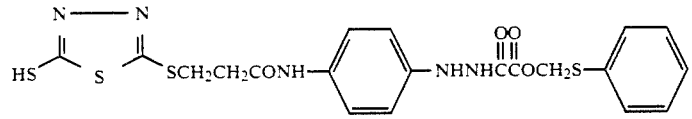
I-b-26
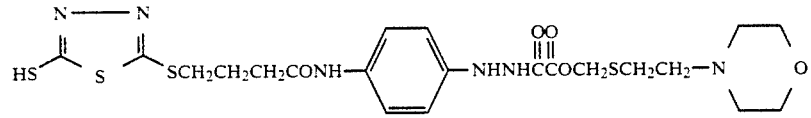
I-b-27
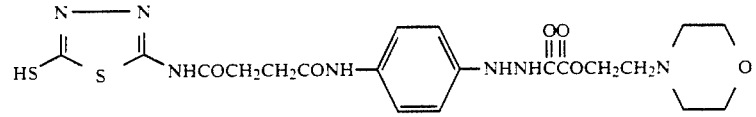

-continued
I-b-28
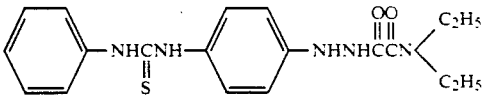
I-b-29
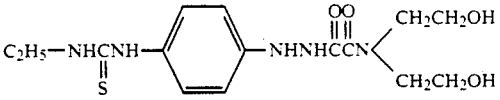
I-b-30
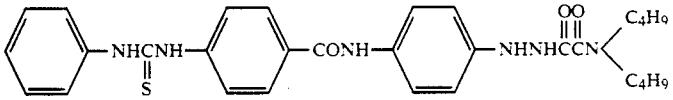
I-b-31
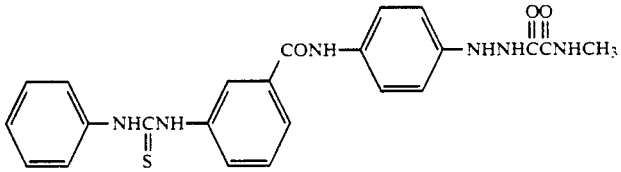
I-b-32
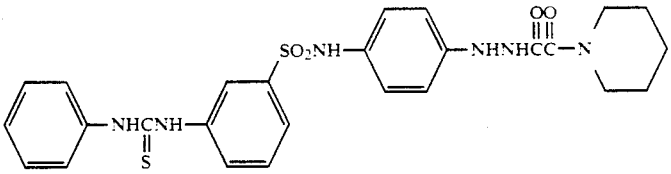
I-b-33
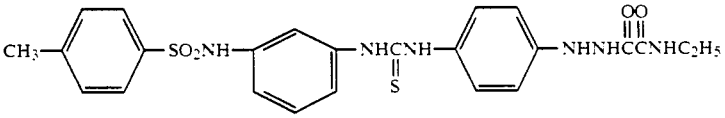
I-b-34
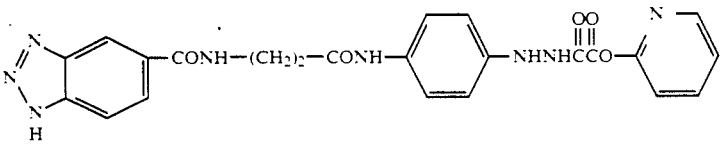
I-b-35
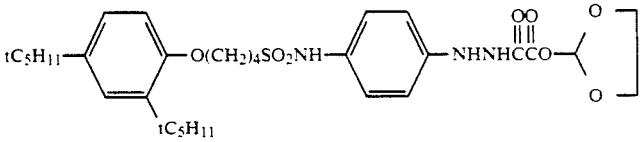
I-b-36
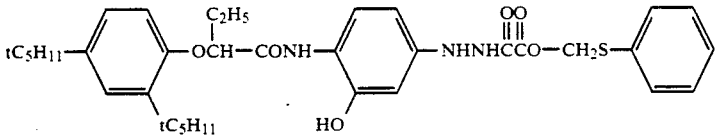
I-b-37
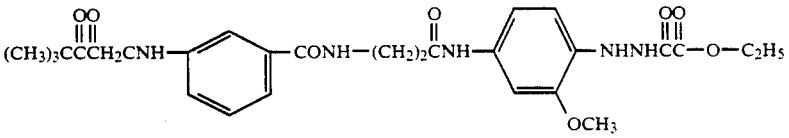
I-b-38
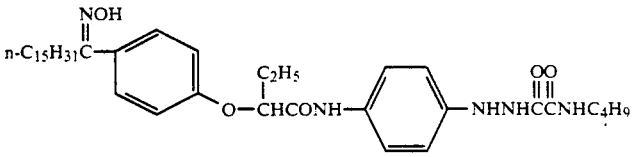

-continued
I-b-39
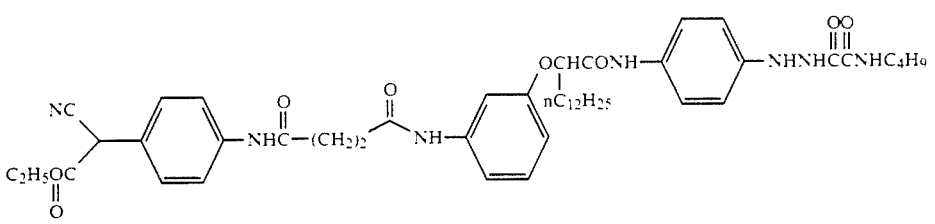
I-b-40
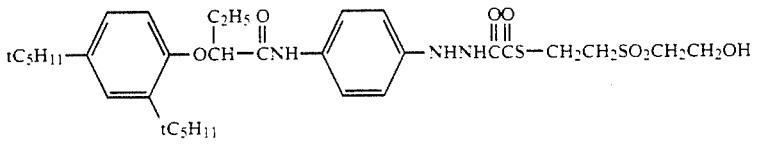
I-b-41
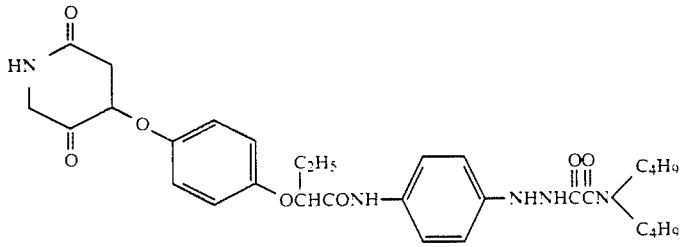
I-b-42
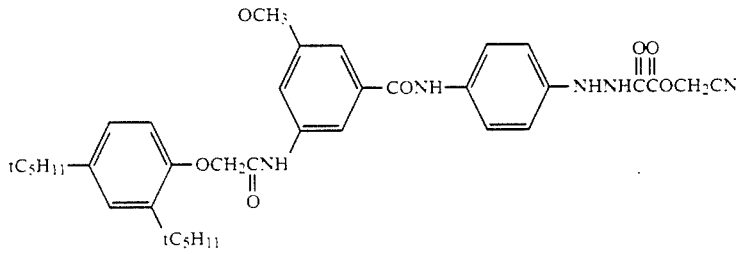
I-b-43
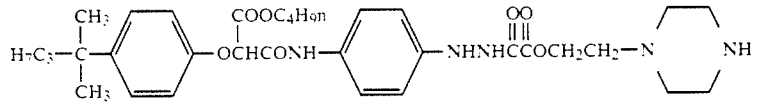
I-b-44
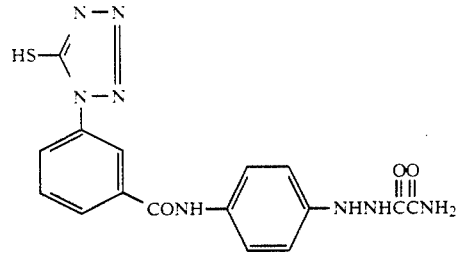
I-b-45
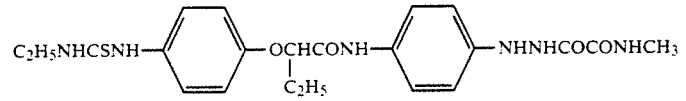
I-b-46
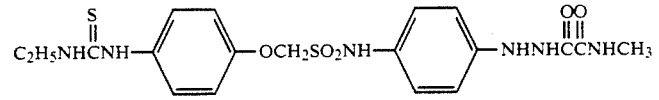
I-b-47
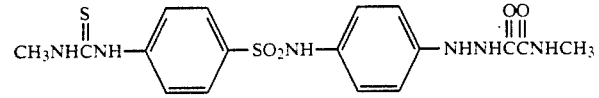

-continued
I-b-48
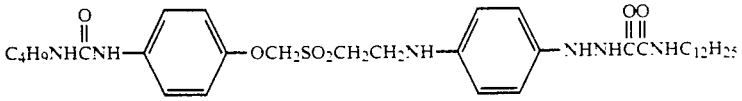
I-b-49
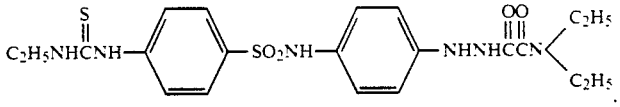
I-b-50
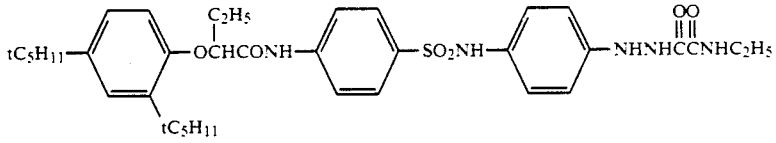
I-b-51
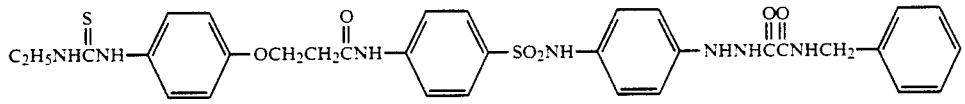
I-b-52
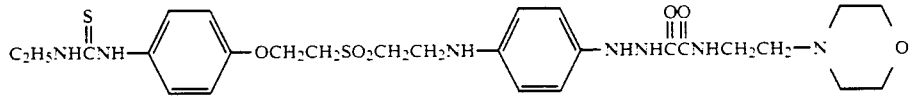
I-b-53
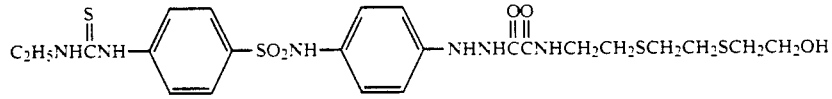
I-b-54
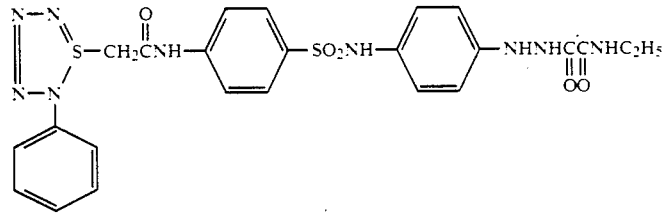
I-b-55
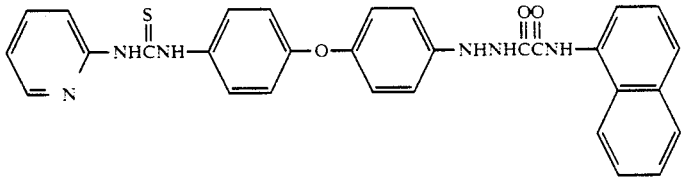
I-b-56
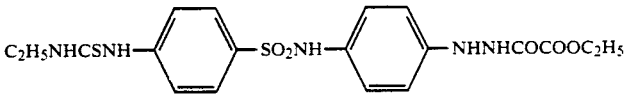
I-b-57
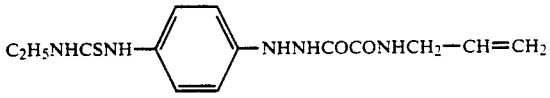
I-b-58
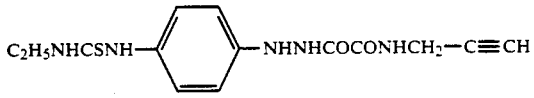
I-b-59
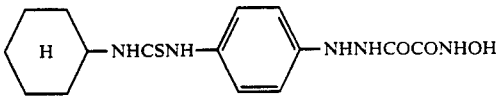

-continued
I-b-60
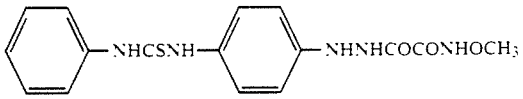
I-b-61
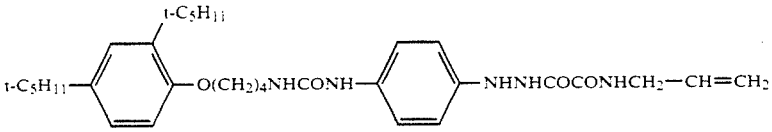
I-b-62
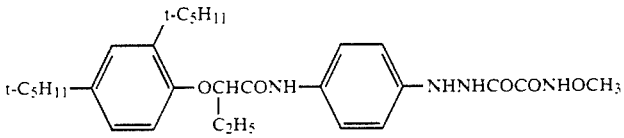
I-b-63
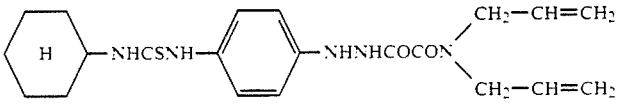
I-b-64
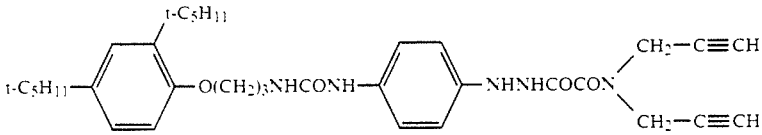
I-b-65
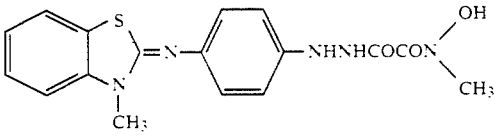
I-b-66
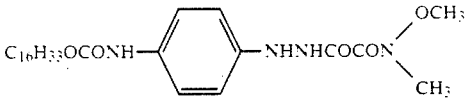
I-b-67
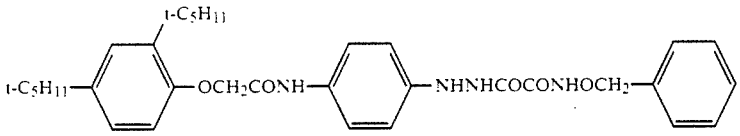
I-b-68
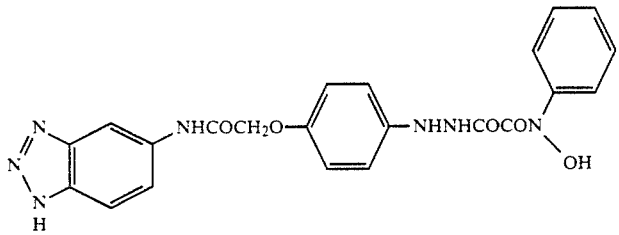
I-b-69
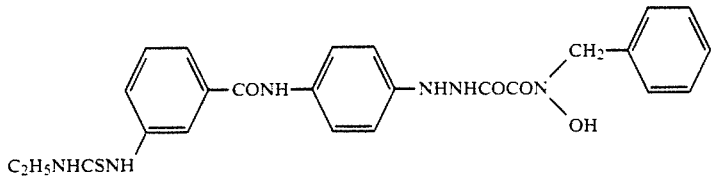

-continued
I-b-70
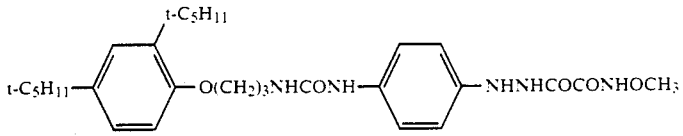
I-b-71
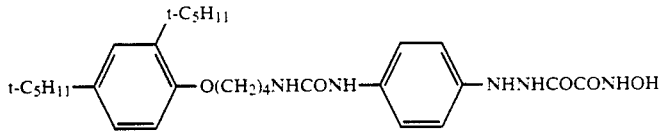
I-b-72
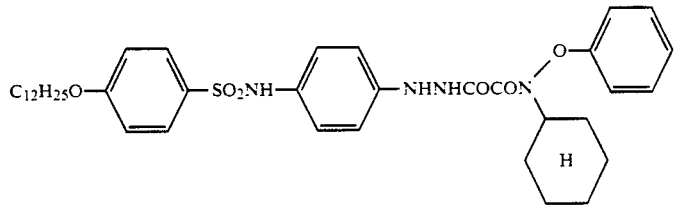
I-b-73
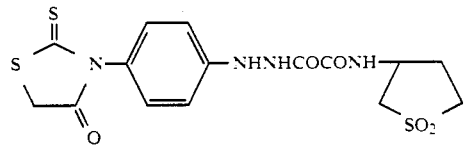
I-b-74
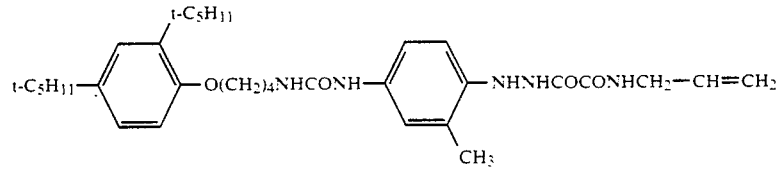
I-b-75
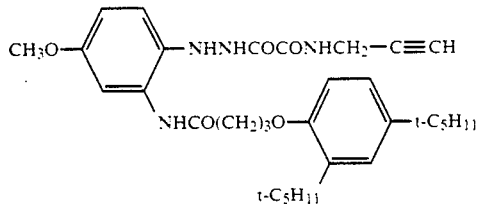
I-b-76
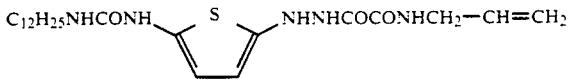
I-b-77
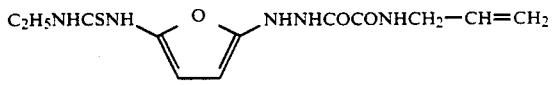
I-b-78
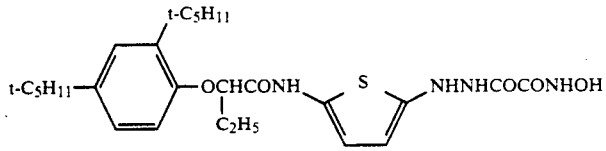
I-b-79
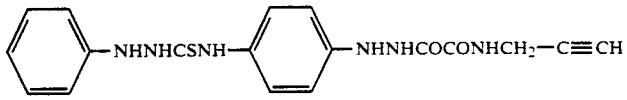

-continued
I-b-80
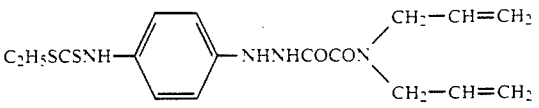
I-b-81
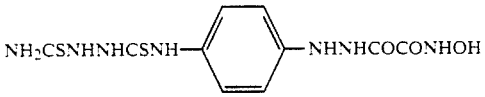
I-b-82
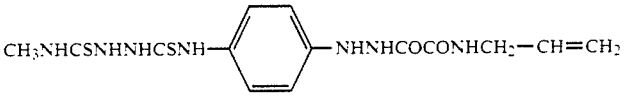
I-b-83
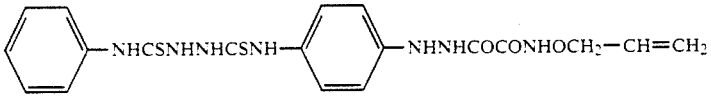
I-b-84
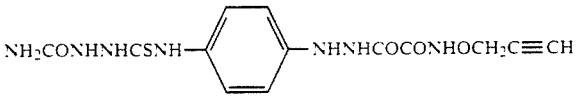
I-b-85
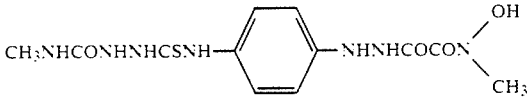
I-b-86
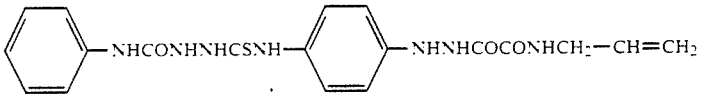
I-b-87
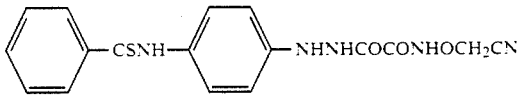
I-b-88
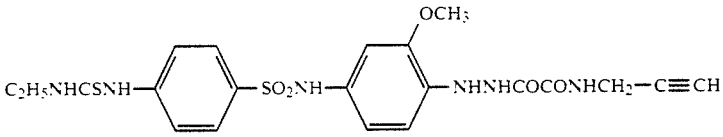
I-b-89
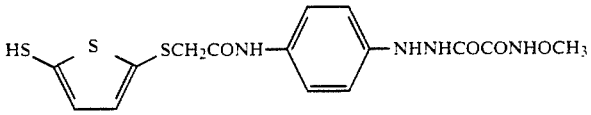
I-b-90
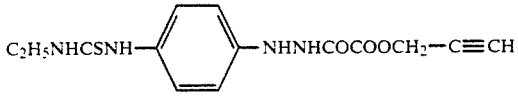
I-b-91
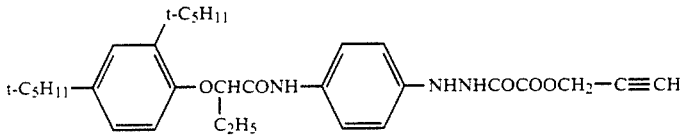

-continued
I-b-92
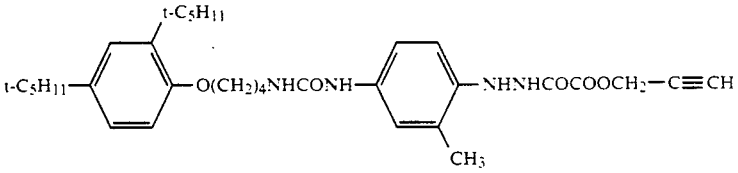
I-b-93
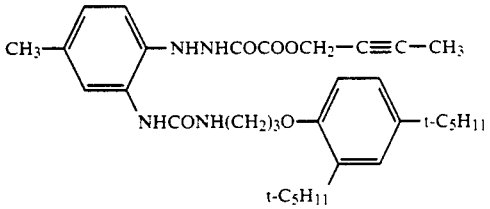
I-b-94
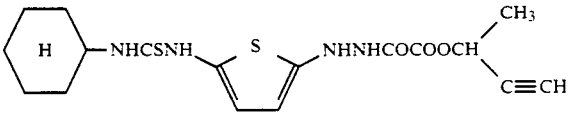
I-b-95
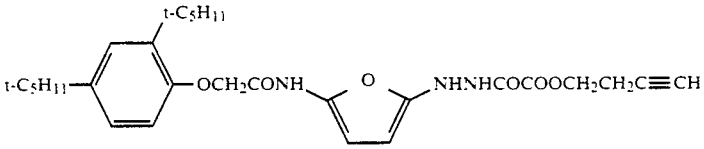
I-b-96
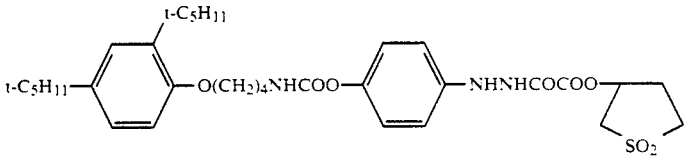
I-b-97
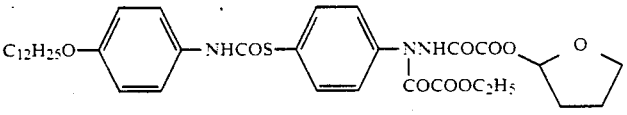
I-b-98
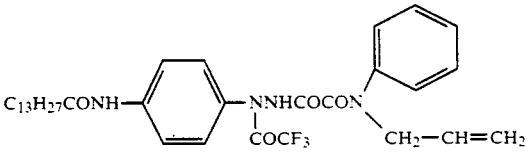
I-b-99
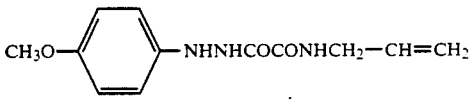
I-b-100
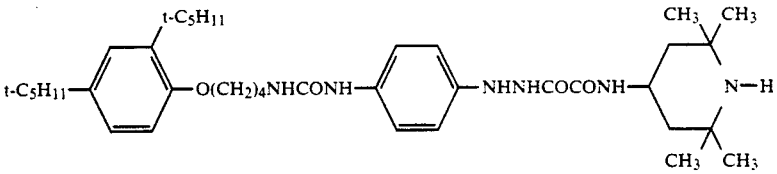
I-b-101
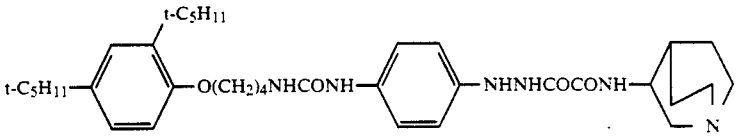

-continued
I-b-102
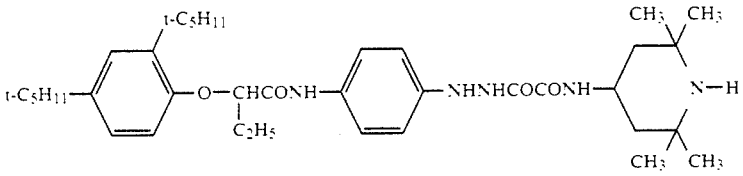
I-b-103
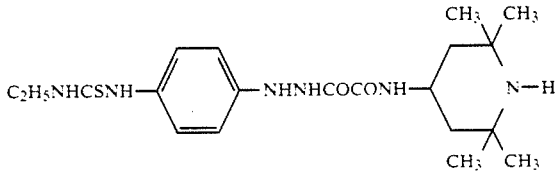
I-b-104
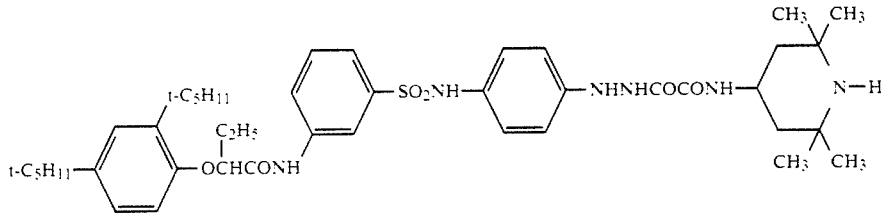
I-b-105
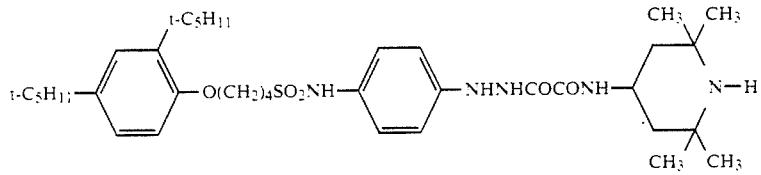
I-b-106
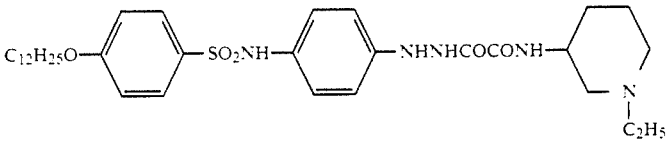
I-b-107
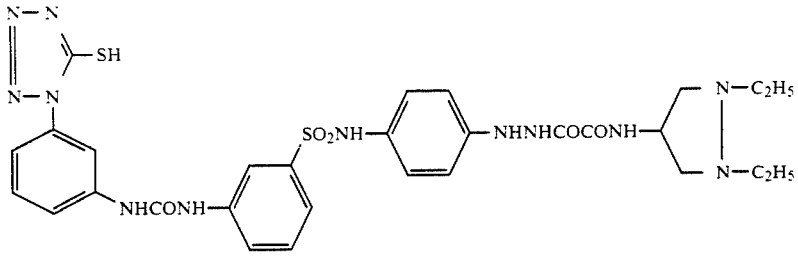
I-b-108
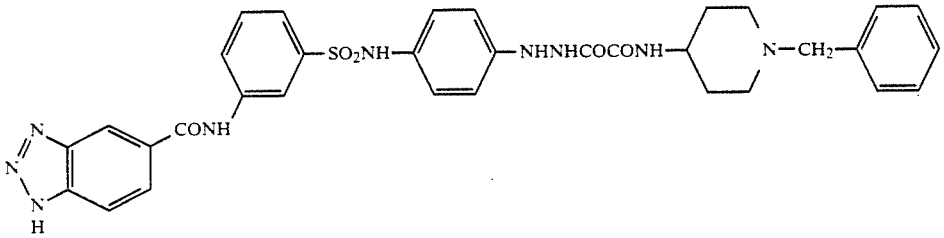

-continued
I-b-109
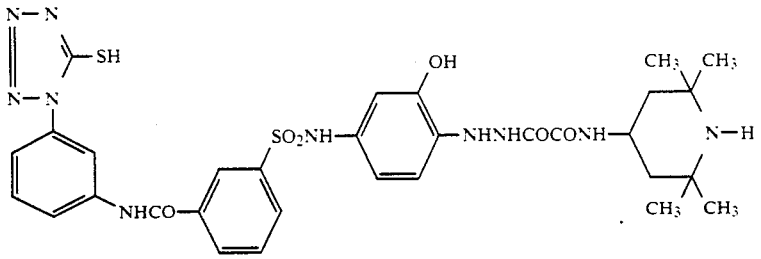
I-b-110
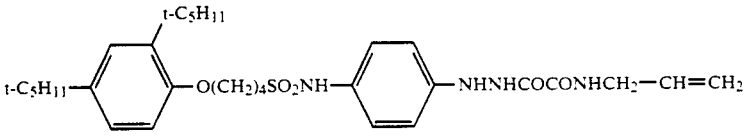
I-b-111
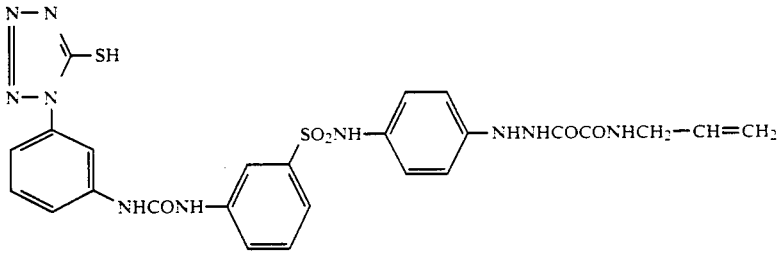
I-b-112
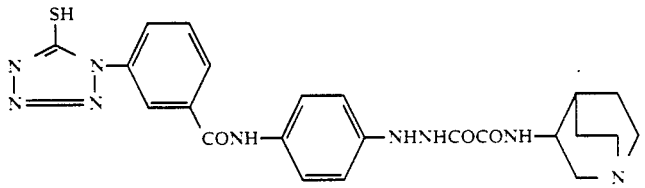
I-b-113
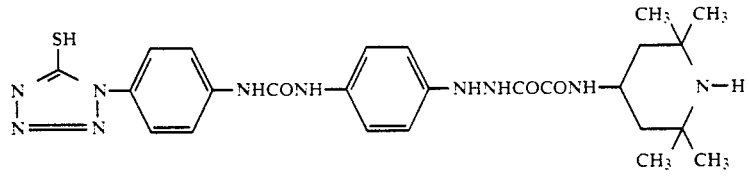
I-b-114
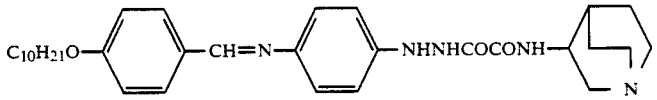
I-b-115
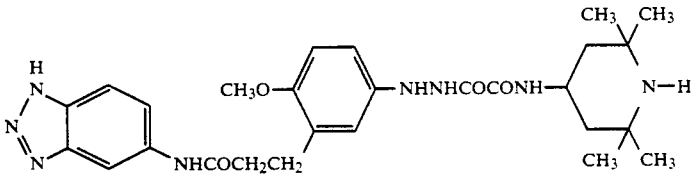
I-b-116
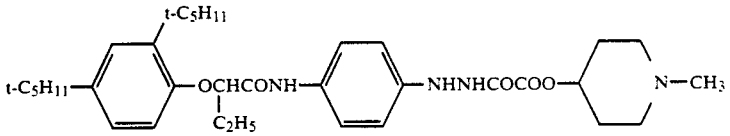

-continued
I-b-117
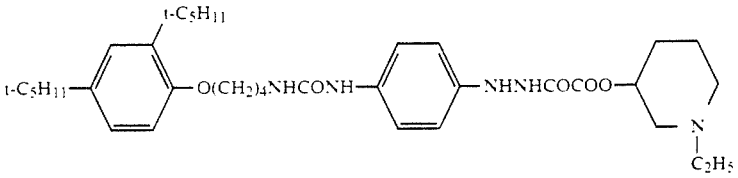
I-b-118
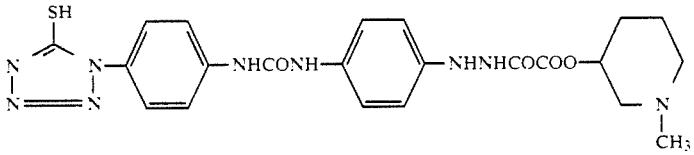
I-b-119
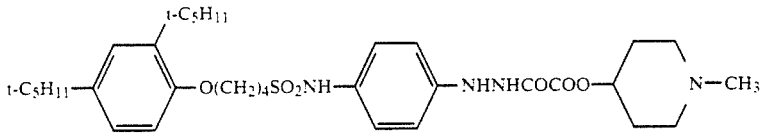
I-b-119'
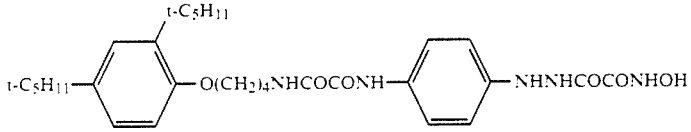
I-b-120
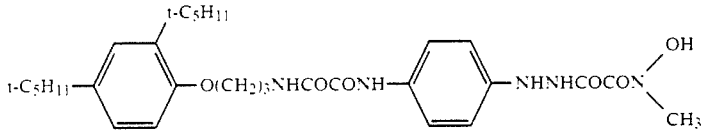
I-b-121
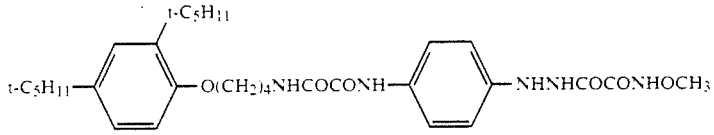
I-b-122
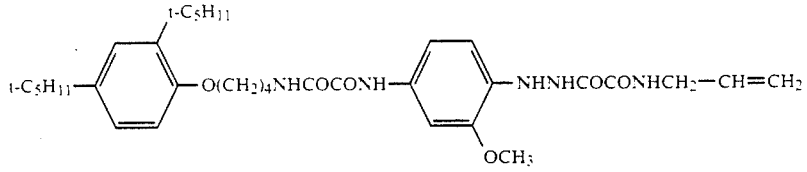
I-b-123
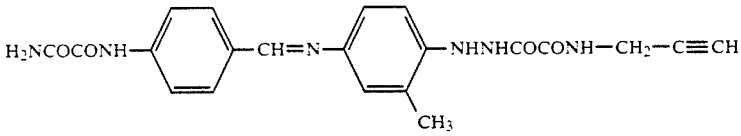
I-b-124
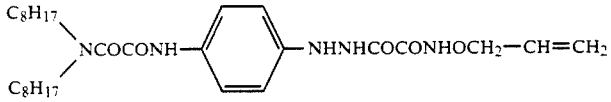
I-b-125
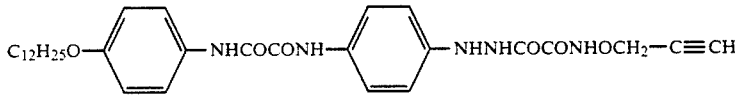
I-b-126
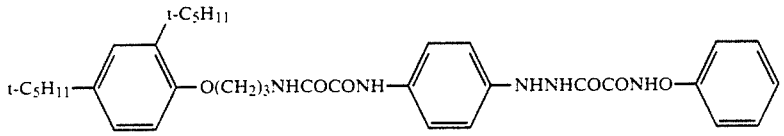

-continued
I-b-127
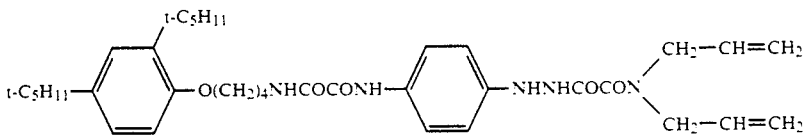
I-b-128
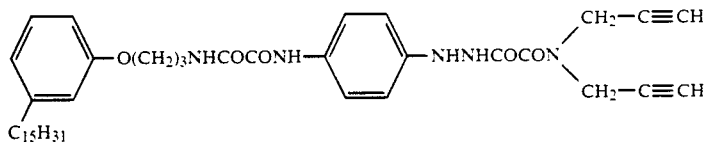
I-b-129
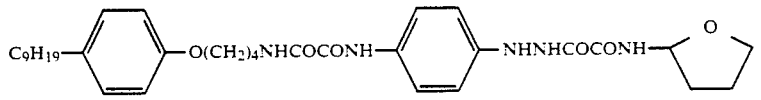
I-b-130
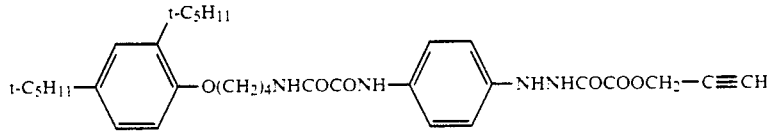
I-b-131
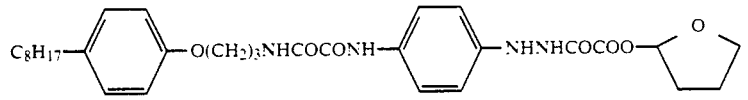
I-b-132
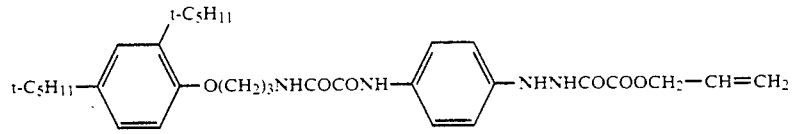
I-b-133
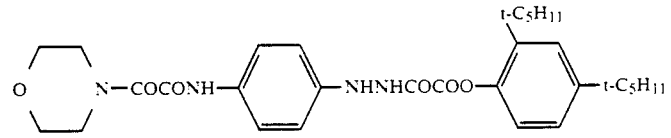
I-b-134
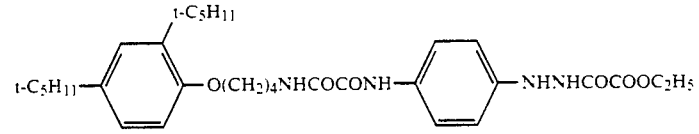
I-b-135
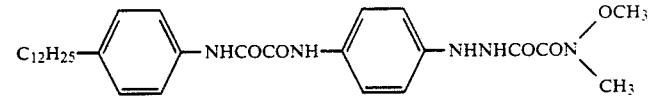
I-b-136
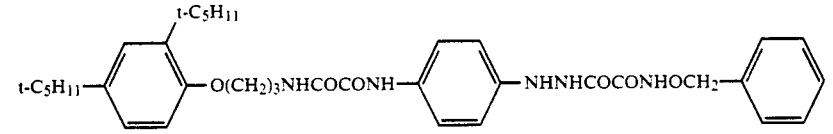
I-b-137
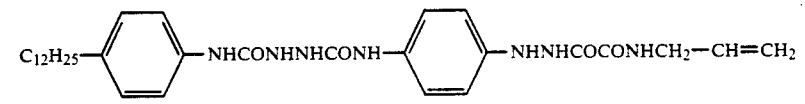
I-b-138
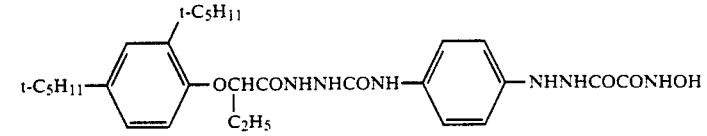

-continued
I-b-139
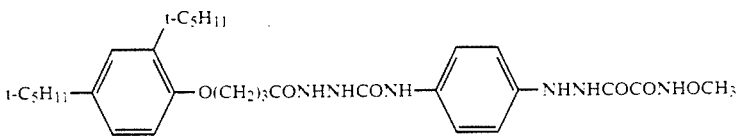
I-b-140
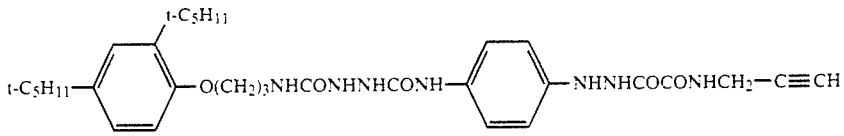
I-b-141
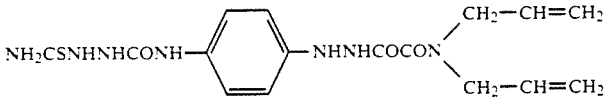
I-b-142
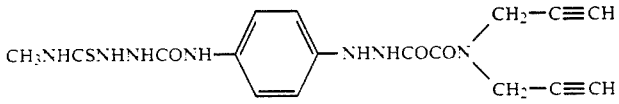
I-b-143
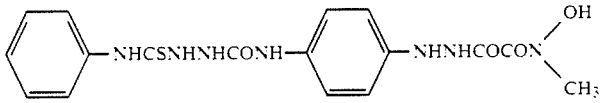
I-b-144
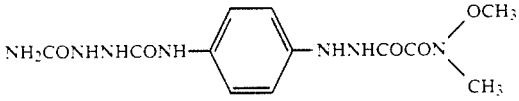
I-b-145
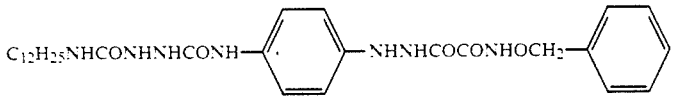
I-b-146
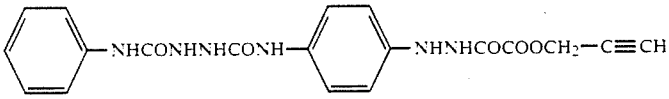
I-b-147
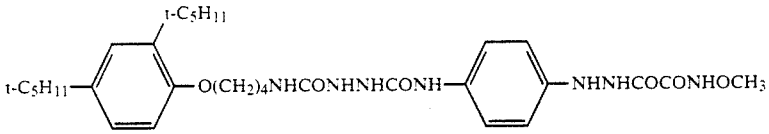
I-b-148
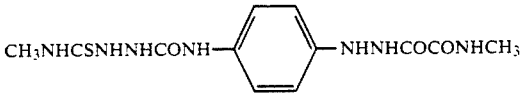
I-b-149
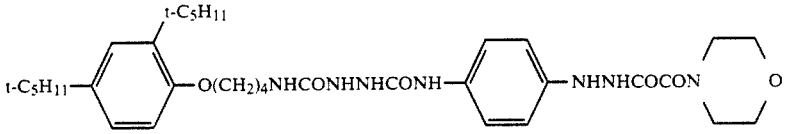
I-b-150
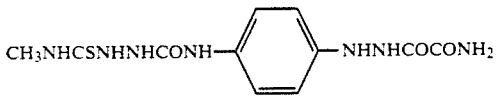

-continued
I-b-151
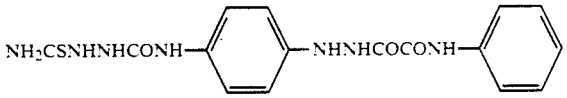
I-b-152
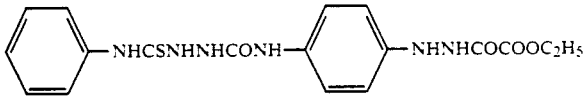
I-b-153
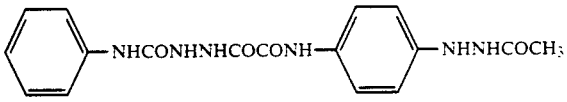
I-b-154
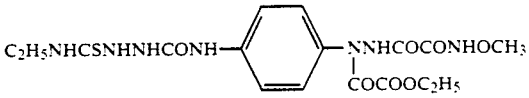
I-b-155
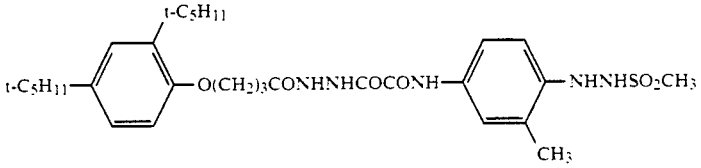
I-b-156
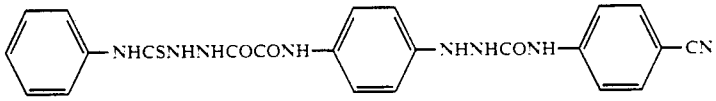
I-b-157
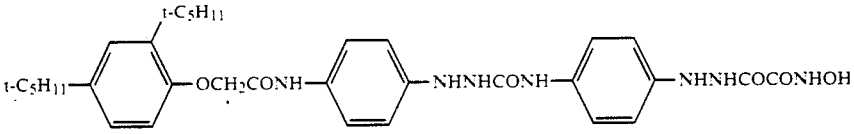
I-b-158
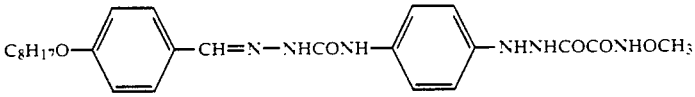
I-b-159
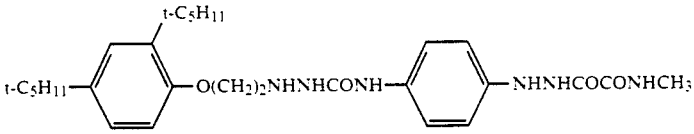
I-b-160
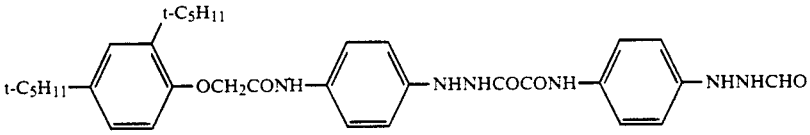
I-b-161
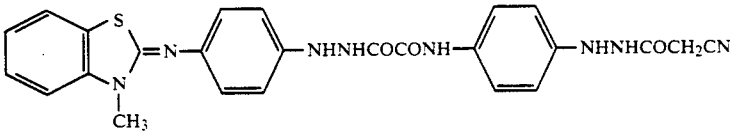
I-b-162
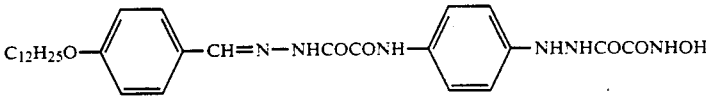

-continued
I-b-163
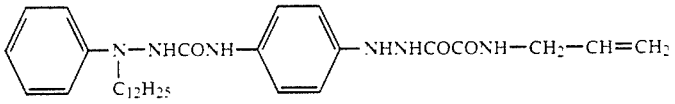
I-b-164
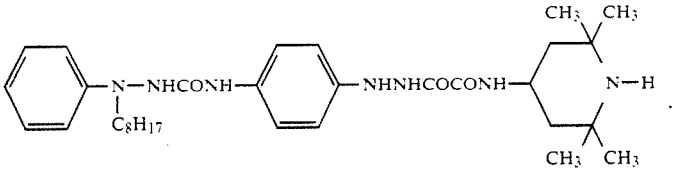
I-b-165
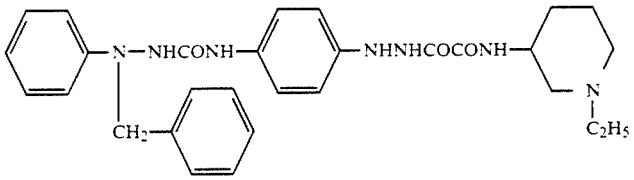
I-b-166
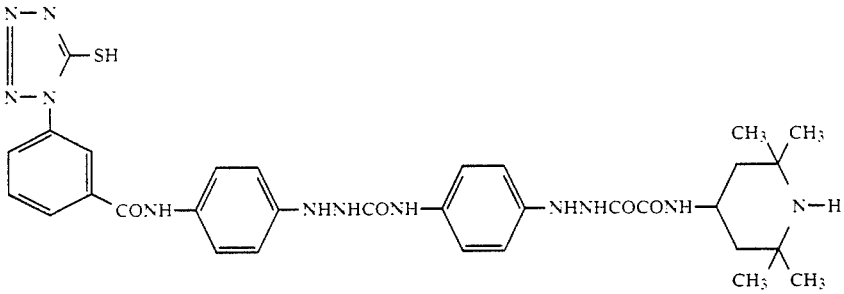
I-b-167
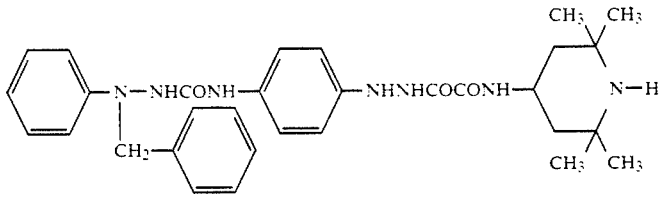
I-b-168
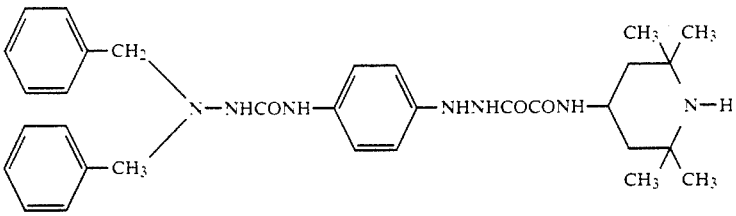
Of the above specific compounds, by taking examples of the compounds I-b-45 and I-b-47, their synthetic methods are shown below.
Synthesis of Compound I-b-45
Synthesis scheme
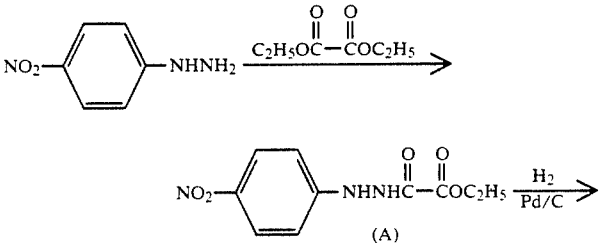
(A)

-continued

Synthesis of Compound I-b-45

Synthesis scheme

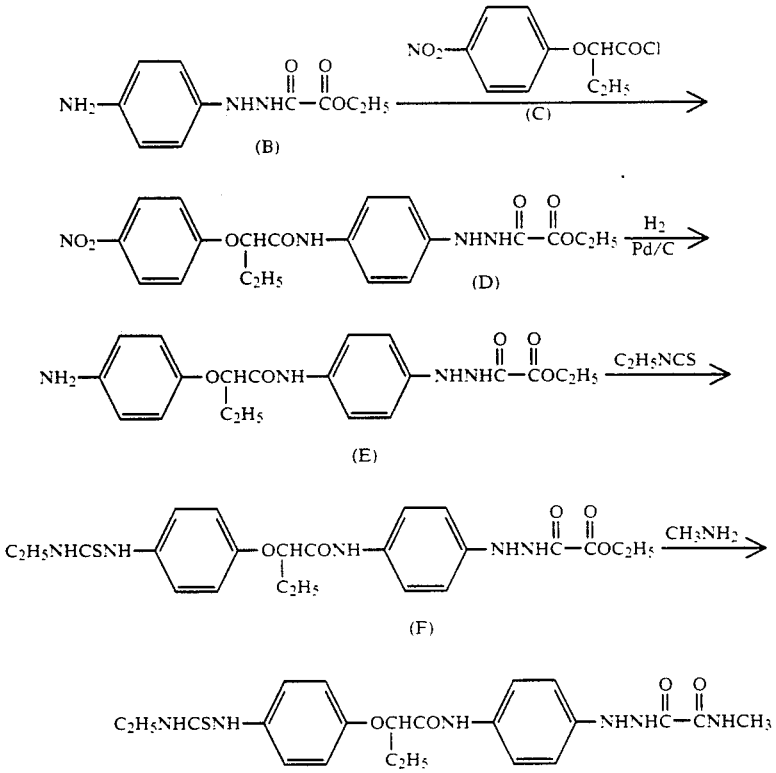

compound I-b-45

A mixture of 153 g of 4-nitrophenylhydrazide and 500 ml of diethyloxalate is refluxed for one hour. While the reaction is proceeded, ethanol is removed and finally the mixture is cooled to precipitate crystals. After filtration, the product is washed several times with petroleum ether and recrystallized. Then, 50 g of the crystals (A) obtained are dissolved by heating in 1000 ml of methanol, and reduced in a $H_2$ atmosphere pressurized at 50 psi in the presence of Pd/C (palladium-carbon) catalyst to obtain the compound (B).

To a solution of 22 g of the compound (B) dissolved in 200 ml of acetonitrile and 16 g of pyridine is added an acetonitrile solution containing 24 g of the compound (C) at room temperature. After the insolubles are filtered off, the filtrate is concentrated and purified by recrystallization to obtain 31 g of the compound (D).

Thirty (30) g of the compound (D) is hydrogenated similarly as described above to obtain 20 g of the compound (E).

To a solution of 10 g of the compound (E) dissolved in 100 ml of acetonitrile is added 3.0 g of ethylisothiocyanate, and the mixture is refluxed for one hour. After evaporation of the solvent, the residue is purified by recrystallization to obtain 7.0 g of the compound (F). To a solution of 5.0 g of the compound (F) dissolved in 50 ml of methanol is added methylamine (8 ml of aqueous 40% solution), followed by stirring. After concentrating slightly methanol, the precipitated solid is taken out and purified by recrystallization to obtain Compound I - b - 45.

Synthesis of Compound I-b-47

Synthesis scheme

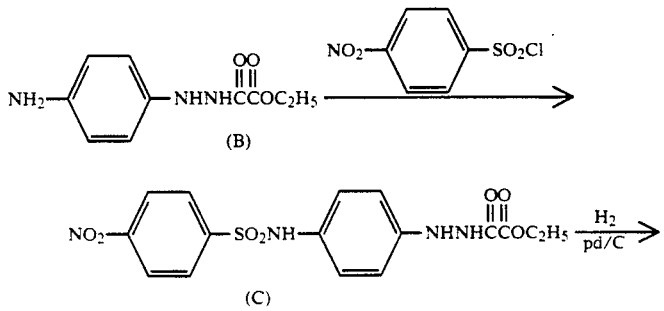

-continued

Synthesis of Compound I-b-47

Synthesis scheme

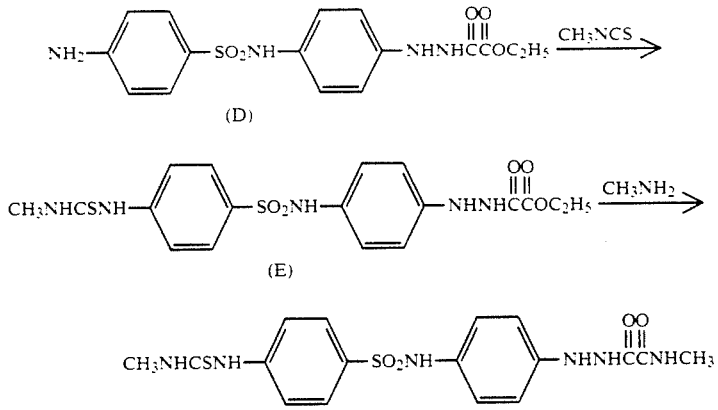

Into a stirred solution of 22 g of the compound (B) dissolved in 200 ml of pyridine, 22 g of p-nitrobenzenesulfonyl chloride is added. The reaction mixture is poured into water, and the post-precipitated solid is taken out to obtain the compound (C). From the compound (C), according to the same reactions as in the case of Compound I - b - 45 following the synthesis scheme, Compound I - b - 47 is obtained.

Next, Formula [I - c] is to be described.

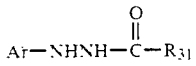

Formula [I-c]

In Formula [I - c], Ar represents an aryl group containing at least one of diffusion resistant groups or silver halide adsorption promoting groups, and as the diffusion resistant group, a ballast group conventionally used in immobile additives for photography such as coupler, etc. is preferable. The ballast group is a group having 8 or more carbon atoms relatively inert to photographic characteristic, and can be chosen from, for example, alkyl groups, alkoxy groups, phenyl groups, alkylphenyl groups, phenoxy groups, alkylphenoxy groups, etc.

As the silver halide adsorption promoting group, there may be included the groups as disclosed in U.S. Pat. No. 4,385,108 such as thiourea group, thiourethane group, heterocyclic thioamide group, mercaptoheterocyclic group, triazole group, etc.

$R_3$ represents a substituted alkyl group, and the alkyl group may be a straight, branched or cyclic alkyl group, including methyl, ethyl, propyl, butyl, isopropyl, pentyl, cyclohexyl and the like.

As the substituent to be introduced into these alkyl group, there may be included groups of alkoxy (e.g. methoxy, ethoxy), aryloxy (e.g. phenoxy, p-chlorophenoxy), heterocyclic oxy (e.g. pyridyloxy), mercapto, alkylthio (e.g. methylthio, ethylthio), arylthio (e.g. phenylthio, p-chlorophenylthio), heterocyclic thio (e.g. pyridylthio, pyrimidylthio, thiadiazolylthio), alkylsulfonyl (e.g. methanesulfonyl, butanesulfonyl), arylsulfonyl (e.g. benzenesulfonyl), heterocyclic sulfonyl (e.g. pyridylsulfonyl, morpholinosulfonyl), acyl (e.g. acetyl, benzoyl), cyano, chloro, bromo, alkoxycarbonyl (e.g. ethoxycarbonyl, methoxycarbonyl), aryloxycarbonyl (e.g. phenoxycarbonyl), carboxy, carbamoyl, alkylcarbamoyl (e.g. N-methylcarbamoyl, N,N-dimethylcarbamoyl), arylcarbamoyl (e.g. N-phenylcarbamoyl), amino, alkylamino (e.g. methylamino, N,N-dimethylamino), arylamino (e.g. phenylamino, naphthylamino), acylamino (e.g. acetylamino, benzoylamino), alkoxycarbonylamino (e.g. ethoxycarbonylamino), aryloxycarbonylamino (e.g. phenoxycarbonylamino), acyloxy (e.g. acetyloxy, benzoyloxy), alkylaminocarbonyloxy (e.g. methylaminocarbonyloxy), arylaminocarbonyloxy (e.g. phenylaminocarbonyloxy), sulfo, sulfamoyl, alkylsulfamoyl (e.g. methylsulfamoyl), arylsulfamoyl (e.g. phenylsulfamoyl), etc.

The hydrogen atom of hydrazide may be also substituted with a substituent such as sulfonyl group (e.g. methanesulfonyl, toluenesulfonyl), acyl group (e.g. acetyl, trifluoroacetyl), oxalyl group (e.g. ethoxalyl), etc.

Representative compounds represented by the above Formula [I - c] are shown below.

I-c-1

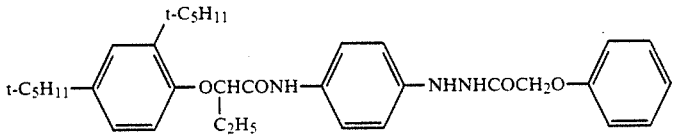

I-c-2

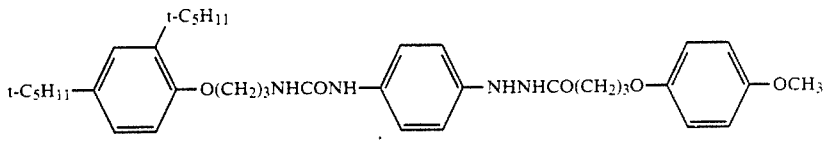

-continued
I-c-3
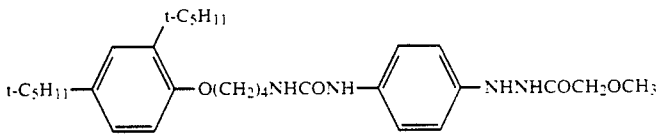
I-c-4
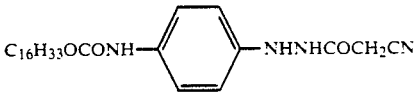
I-c-5
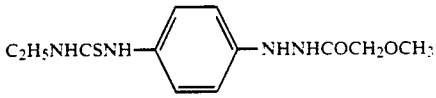
I-c-6
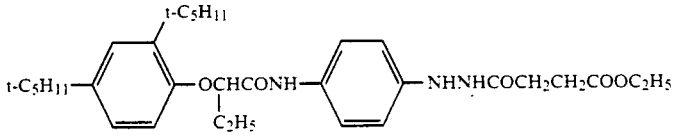
I-c-7
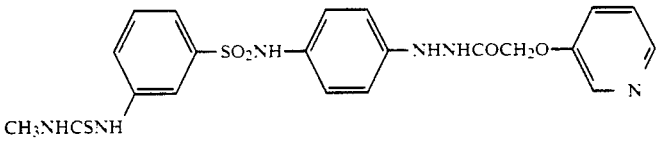
I-c-8
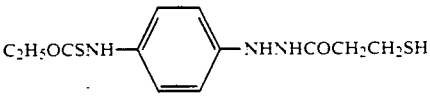
I-c-9
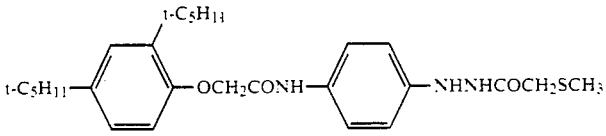
I-c-10
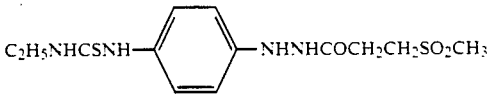
I-c-11
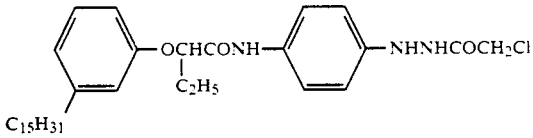
I-c-12
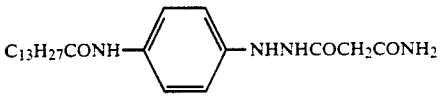
I-c-13
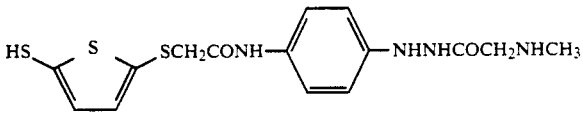
I-c-14
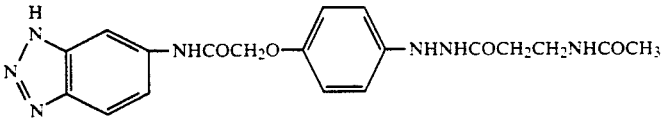

-continued
I-c-15
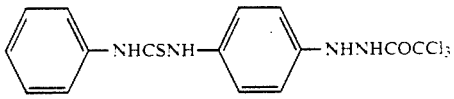
I-c-16
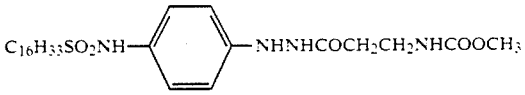
I-c-17
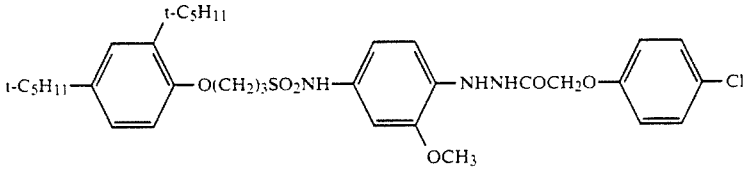
I-c-18
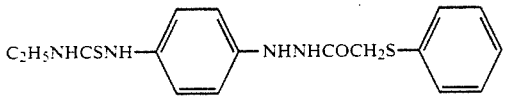
I-c-19
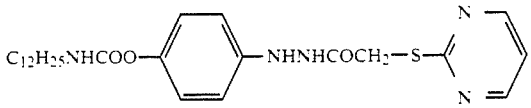
I-c-20
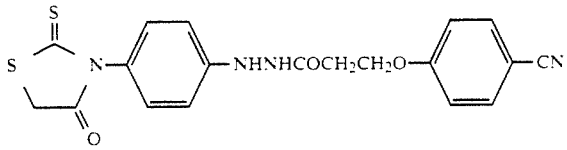
I-c-21
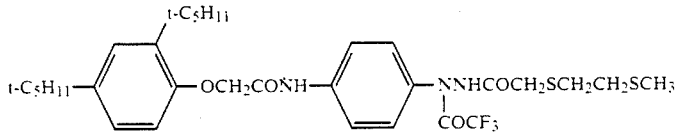
I-c-22
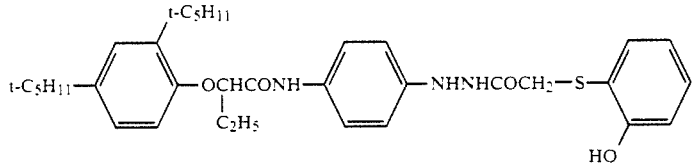
I-c-23
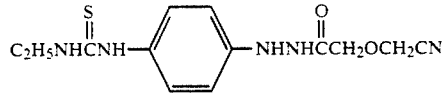
I-c-24
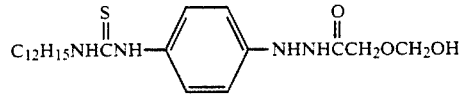
I-c-25
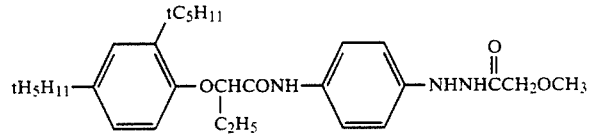
I-c-26
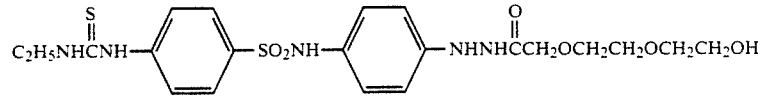

-continued
I-c-27
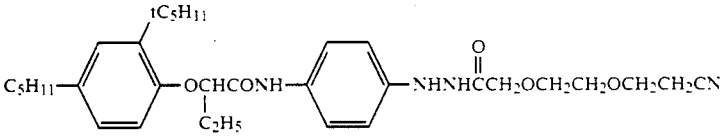
I-c-28
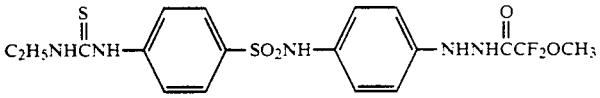
I-c-29
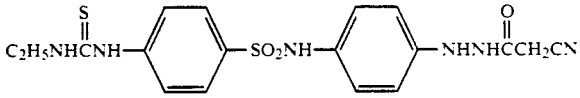
I-c-30
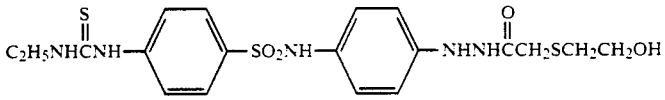
I-c-31
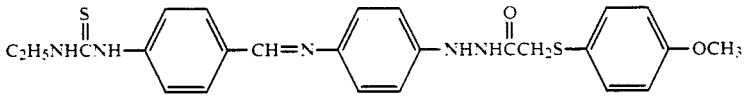
I-c-32
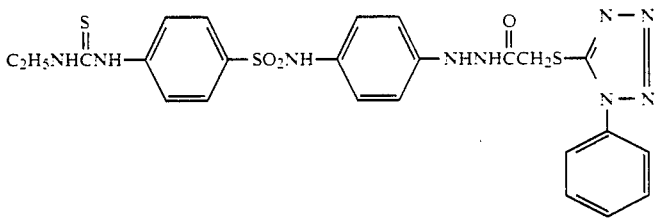
I-c-33
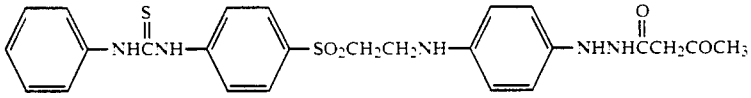
I-c-34
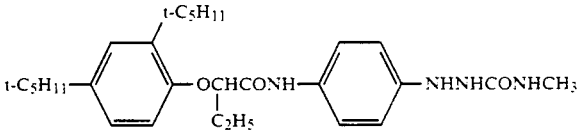
I-c-35
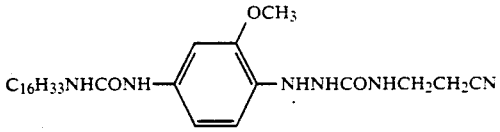
I-c-36
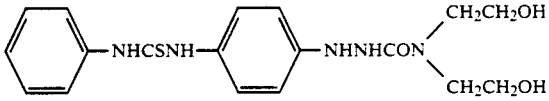
I-c-37
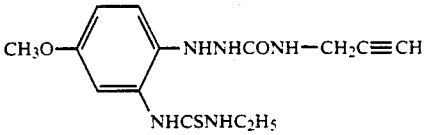

-continued
I-c-38
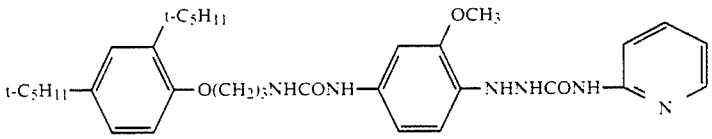
I-c-39
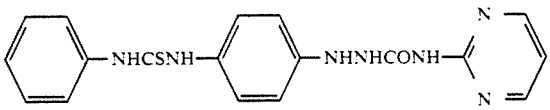
I-c-40
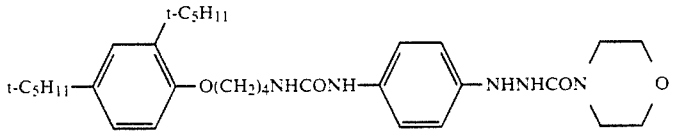
I-c-41
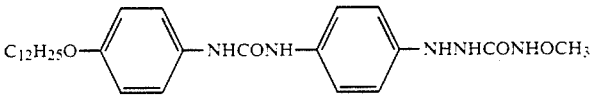
I-c-42
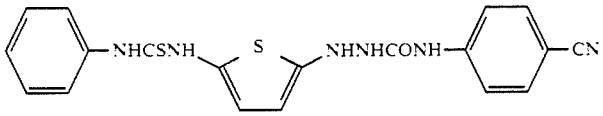
I-c-43
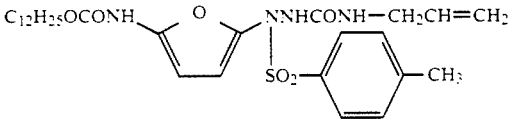
I-c-44
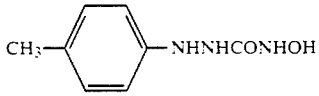
I-c-45
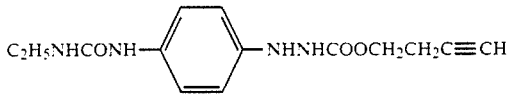
I-c-46
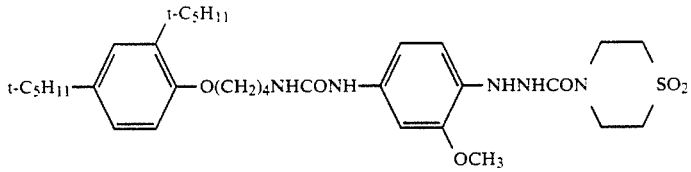
I-c-47
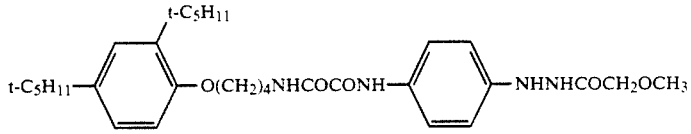
I-c-48
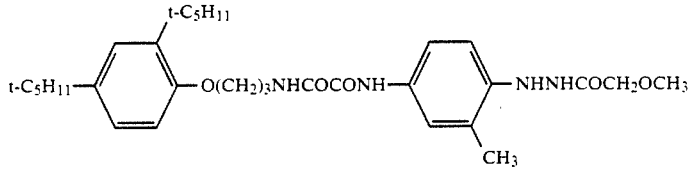

-continued
I-c-49
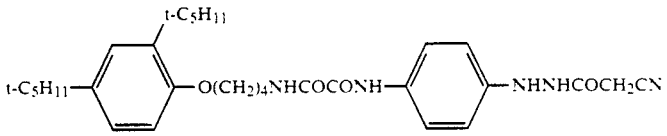
I-c-50
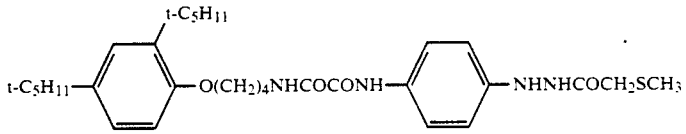
I-c-51
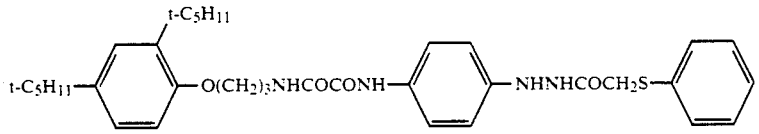
I-c-52
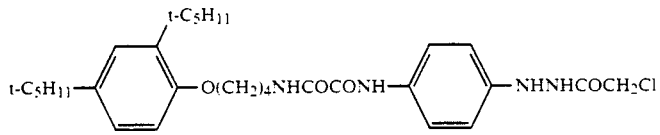
I-c-53
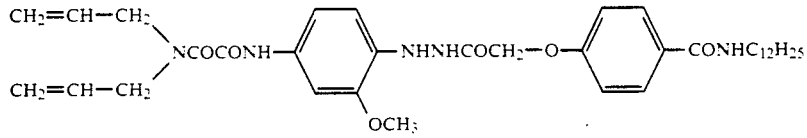
I-c-54
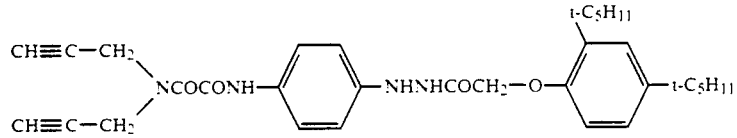
I-c-55
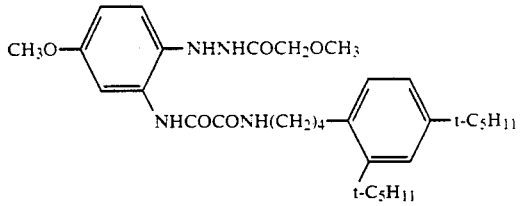
I-c-56
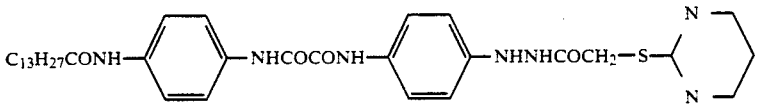
I-c-57
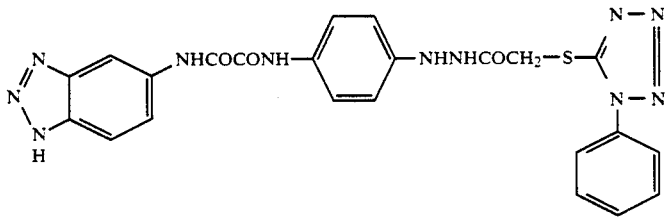

-continued
I-c-58
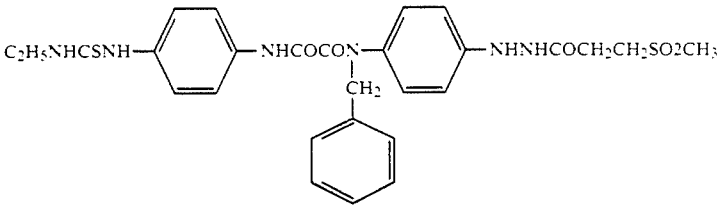
I-c-59
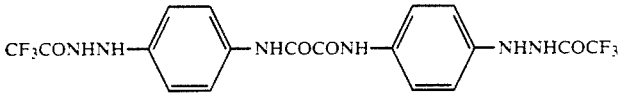
I-c-60
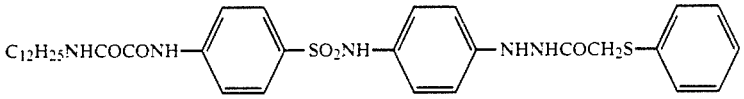
I-c-61
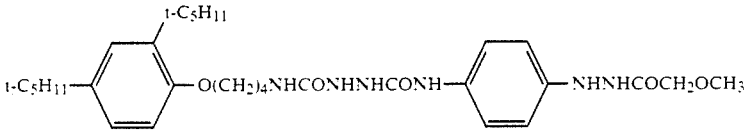
I-c-62
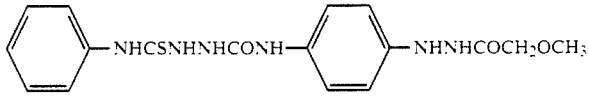
I-c-63
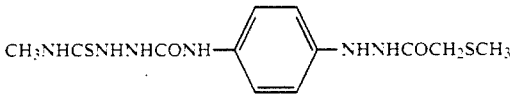
I-c-64
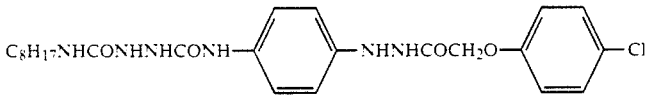
I-c-65
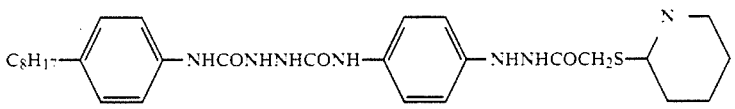
I-c-66
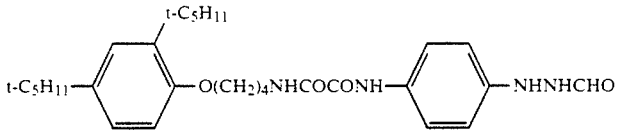
I-c-67
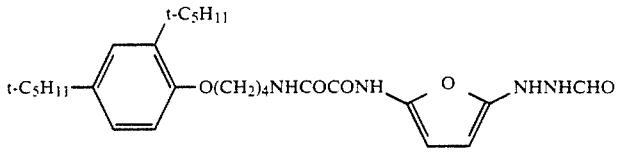
I-c-68
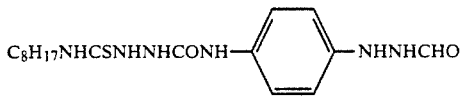
I-c-69
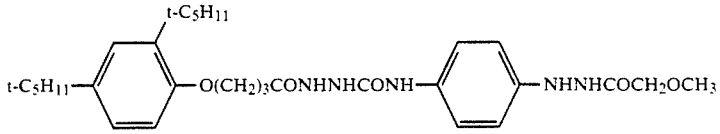

-continued
I-c-70
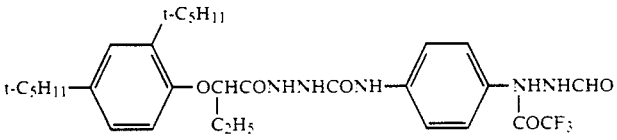
I-c-71
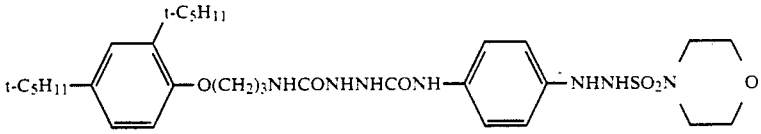
I-c-72
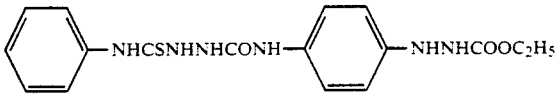
I-c-73
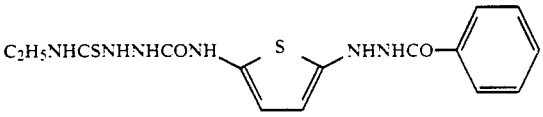
I-c-74
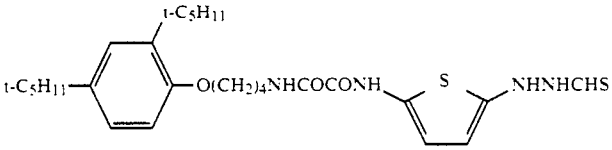
I-c-75
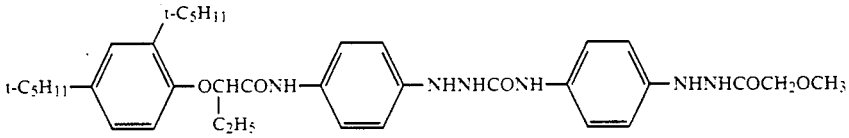
I-c-76
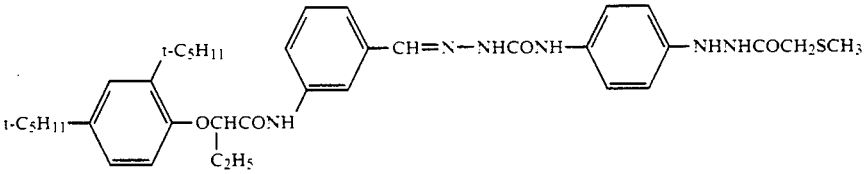
I-c-77
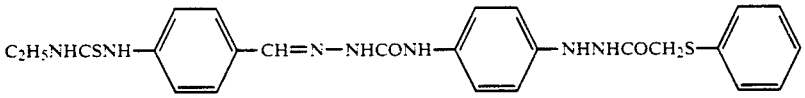
I-c-78
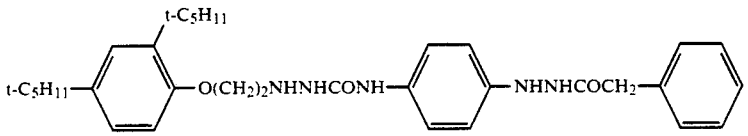
I-c-79
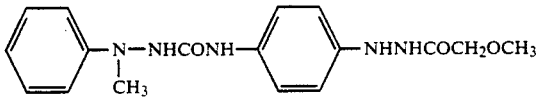
I-c-80
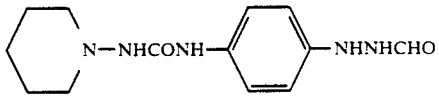

-continued
I-c-81
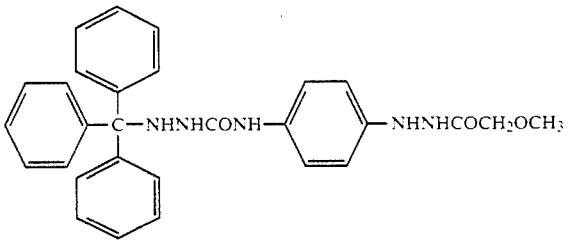
I-c-82
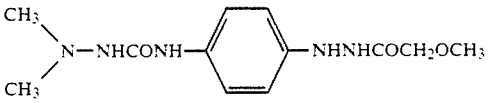
I-c-83
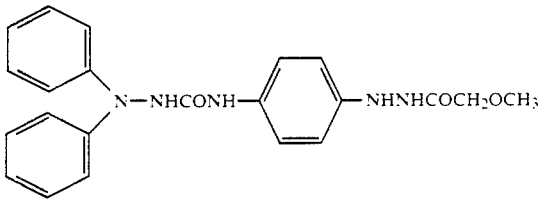
I-c-84
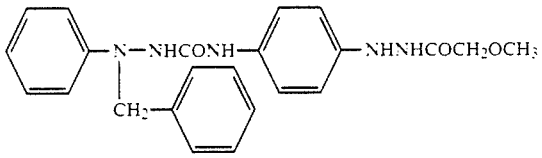
I-c-85
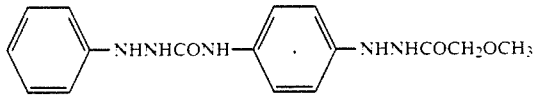
I-c-86
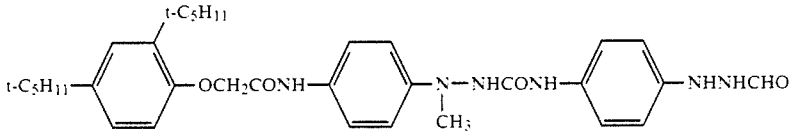
I-c-87
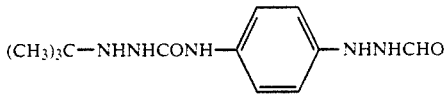
I-c-88
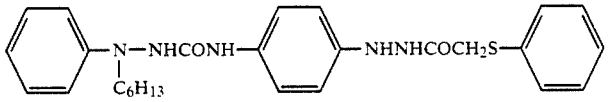
I-c-89
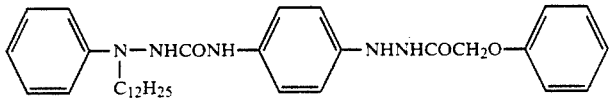
I-c-90
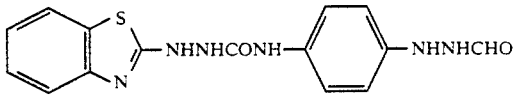

-continued

I-c-91

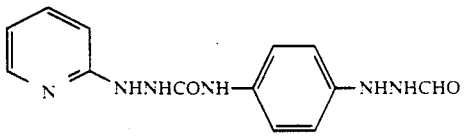

I-c-92

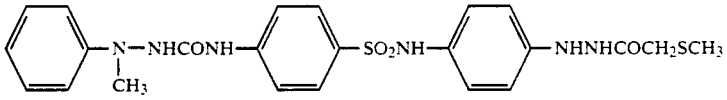

I-c-93

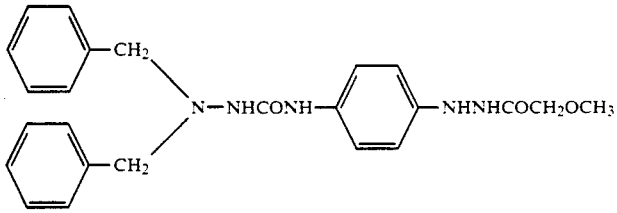

Next, a synthesis example of Compound I - c - 5 is described.

Synthesis of Compound I-c-5

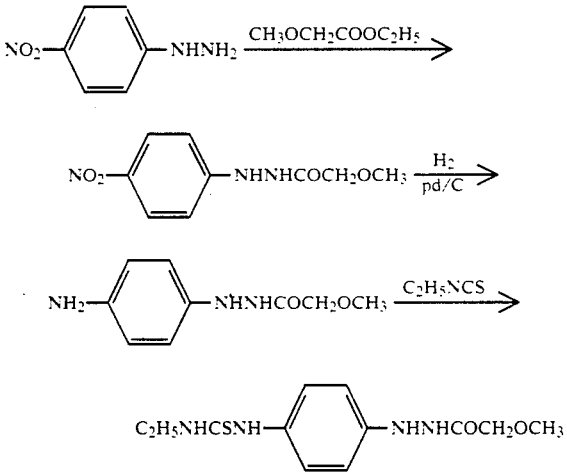

According to the procedure similar to the synthetic method of Compound I - b - 45, Compound I - c - 5 is obtained.

The position where the above hydrazine compound is to be added is in the silver halide emulsion layer and/or the non-light-sensitive layer existing on the silver halide emulsion layer on the support, but preferably in the silver halide emulsion layer and/or its subbing layer.

The amount added should be preferably $10^{-5}$ to $10^{-1}$ mole/1 mole of silver, further preferably $10^{-4}$ to $10^{-2}$ mole/1 mole of silver.

In the present invention, it is preferable to use light-sensitive silver halide grains with an average grain size of 0.05 to 0.3μ. Here, the average grain size refers to its diameter in the case of spherical particles, or the diameter when calculated on the circular image with the same area as its projected image in the case of grains with shapes other than spherical shape.

It is preferred that 60% or more of the total grains should have particle sizes within the range of ±10% of the average grain size.

For the silver halide emulsion to be used in the present invention (hereinafter called silver halide emulsion or merely emulsion), any of silver bromide, silver iodobromide, silver iodochloride, silver chloroiodobromide, silver chloride, silver chlorobromide, silver iodide may be used. Also, the silver halide emulsion used in the present invention may have a single composition, or alternatively grains with a plurality of compositions may be also contained within the single layer or a plurality of layers.

To the silver halide grains to be used in the silver halide emulsion, there can be added metal ions by use of at least one selected from cadmium salts, zinc salts, lead salts, thallium salts, iridium salts (complexes containing them), rhodium salts (complexes containing them) and iron salts (complexes containing them) in the process of forming and/or growing the grains to incorporate these metal elements internally of the grains and/or on the grain surfaces, and a water-soluble rhodium salt is particularly preferably. Also, by placing in a reductive appropriate atmosphere, reduced sensitizing nuclei can be imparted internally of the grains and/or on the grain surfaces. When a water-soluble rhodium salt is added, the amount added may be preferably $1\times10^{-7}$ to $1\times10^{-4}$ mole/1 mole AgX.

The silver halide grains to be used in the silver halide emulsion may either have a uniform silver halide composition distribution within the grain or a core-shell grain with different silver halide compositions in the inner portion and in the surface layer of the grain.

The silver halide grains to be used in the silver halide emulsion may be either those in which latent images are formed primarily on the surface or those primarily internally of the grains.

The silver halide grains to be used in the silver halide emulsion may be either those having regular crystal forms such as cubic, octahedral, tetradecahedral bodies, or irregular shapes such as spherical, plate shapes. Also, they may have composite form of these crystal forms, and may contain grains of various forms mixed therein.

As the silver halide emulsion, two or more kinds of silver halide emulsions which have been formed separately may be used in a mixture.

The silver halide emulsion should be preferably sensitized by use of chemical sensitizers and the sensitizing methods as described in G.B. Pat. Nos. 618,061, 1,315,755, 1,396,696, Japanese Patent Publication No.

15748/1969, U.S. Pat. Nos. 1,574,944, 1,623,499, 1,673,522, 2,278,947, 2,399,083, 2,410,689, 2,419,974, 2,448,060, 2,487,850, 2,518,698, 2,521,926, 2,642,361, 2,694,637, 2,728,668, 2,739,060, 2,743,182, 2,743,183, 2,983,609, 2,983,610, 3,021,215, 3,026,203, 3,297,446, 3,297,447, 3,361,564, 3,411,914, 3,554,757, 3,565,631, 3,565,633, 3,591,385, 3,656,955, 3,761,267, 3,772,031, 3,857,711, 3,891,446, 3,901,714, 3,904,415, 3,930,867, 3,984,249, 4,054,457, 4,067,740 and The Theory of the Photographic Process. 4th Ed. Macmillan. 1977 by T. H. James, page 67~76.

The silver halide emulsion to be used in the light-sensitive material according to the present invention can be chemically sensitized to a required wavelength region by use of a dye which has been known as the sensitizing dye in the field of photography. The sensitizing dye may be also used alone, but may be also used in combination of two or more kinds. Together with the sensitizing dye, there may be also contained a supersensitizer which is a dye having itself no spectral sensitizing action, or a compound absorbing substantially no visible light, and potentiating the sensitizing action of the sensitizing dye may be also contained in the emulsion.

As the useful sensitizing dye to be used in the blue-sensitive silver halide nucleus emulsion layer, there may be included, for example, those as described in West German Pat. No. 929,080, U.S. Pat. Nos. 2,231,658, 2,493,748, 2,503,776, 2,519,001, 2,912,329, 2,656,959, 3,672,897, 3,694,217, 4,025,349, 4,046,572, G.B. Pat. No. 1,242,588, Japanese Patent Publication Nos. 14030/1969, 1977.

As the useful sensitizing dye to be used in the green-sensitive silver halide emulsion, there may be included, for example, cyanine dyes, melocyanine dyes or complex cyanine dyes as described in U.S. Pat. Nos. 1,939,201, 2,072,908, 2,739,149, 2,945,763, G. B. Pat. No. 505,979 as representative ones.

Further, as the useful sensitizing dye to be used in the red-sensitive silver halide emulsion, there may be included, for example, cyanine dyes, melocyanine dyes or complex cyanine dyes as described in U.S. Pat. Nos. 2,269,234, 2,270,378, 2,442,710, 2,454,629, 2,776,280 as representative ones. Also, cyanine dyes or complex cyanine dyes as described in U.S. Pat. Nos. 2,213,995, 2,493,748, 2,519,001, West German Pat. No. 929,080 can be advantageously used in the green-sensitive silver halide emulsion or the red-sensitive silver halide emulsion.

In the silver halide emulsion to be used in the present invention, for the purpose of preventing fog or maintaining photographic performances during the preparation steps, storage or photographic processing of the light-sensitive material, a compound known as the antifoggant or stabilizer in the field of photography can be added during chemical aging, on completion of chemical aging and/or after completion of chemical aging before coating of the silver halide emulsion.

Examples of the antifoggant, stabilizer may include azaindenes such as pentazaindenes as disclosed in U.S. Pat. Nos. 2,713,541, 2,743,180, 2,743,181, tetrazaindenes as disclosed in U.S. Pat. Nos. 2,716,062, 2,444,607, 2,444,605, 2,756,147, 2,835,581, 2,852,375, Research Disclosure I4851, triazaindenes as disclosed in U.S. Pat. No. 2,772,146, polymerized azaindenes as disclosed in Japanese Unexamined Patent Publication No. 211142/1982; quaternary phosphonium salts such as thiazolium salts as disclosed in U.S. Pat. Nos. 2,131,038, 3,342,596, 3,954,478, pyrylium salts as disclosed in U.S. Pat. No. 3,148,067, and phosphonium salts as disclosed in Japanese Patent Publication No. 40665/1975; mercapto-substituted heterocyclic compounds such as mercaptotetrazoles, mercaptotriazoles, mercaptodiazole as disclosed in U.S. Pat. Nos. 2,403,927, 3,266,897, 3,708,303, Japanese Unexamined Patent Publication Nos. 135835/1980, 71047/1984, mercaptothiazoles as disclosed in U.S. Pat. No. 2,824,001, mercaptobenzthiazoles, mercaptobenzimidazoles as disclosed in U.S. Pat. No. 3,937,987; mercaptooxadiazoles as disclosed in U.S. Pat. No. 2,843,491, mercapto-substituted heterocyclic compounds such as mercaptothiadiazoles as disclosed in U.S. Pat. No. 3,364,028, polyhydroxybenzenes such as catechols as disclosed in U.S. Pat. No. 3,236,652, Japanese Patent Publication No. 10256/1968, rezorcine as disclosed in Japanese Patent Publication No. 44413/1981, and gallic acid esters as disclosed in Japanese Patent Publication No. 4133/1968; heterocyclic compounds including azoles such as tetrazoles as disclosed in West German Patent No. 1,189,380, triazole as disclosed in U.S. Pat. No. 3,157,509, benztriazoles as disclosed in U.S. Pat. No. 2,704,721, urazoles as disclosed in U.S. Pat. No. 3,287,135, pyrazoles as disclosed in U.S. Pat. No. 3,106,467, imidazoles as disclosed in U.S. Pat. No. 2,271,229, and azoles such as polymerized benzotriazoles as disclosed in Japanese Unexamined Patent Publication No. 90844/1984, etc., pyrimidines as disclosed in U.S. Pat. No. 3,161,515, 3-pyrazolidones as disclosed in U.S. Pat. No. 2,751,297, and heterocyclic compounds such as polymerized pyrrolidones, namely polyvinyl pyrrolidones, etc. as disclosed in U.S. Pat. No. 3,021,213; various inhibitor precursors as disclosed in Japanese Unexamined Patent Publication Nos. 130929/1979, 137945/1984, 140445/1984, G.B. Patent No. 1,356,142, U.S. Pat. Nos. 3,575,699, 3,649,267; sulfinic acid, sulfinic acid derivatives as disclosed in U.S. Pat. No. 3,047,393; and inorganic salts as disclosed in U.S. Pat. Nos. 2,566,263, 2,839,405, 2,488,709, 2,728,663.

Further, in all the hydrophilic colloid layers in the light-sensitive material to be used in the present invention, various additives for photography can be used, if necessary, such as gelatin plasticizers, film hardeners, surfactants, image stabilizers, UV-ray absorbers, antistain agents, pH controllers, antioxidants, antistatic agents, thickeners, graininess improvers, dyes, mordants, brighteners, developing speed controllers, matte agents, etc., within the range which does not impair the effect of the present invention.

In the light-sensitive material according to the present invention, a polymer latex should be preferably contained, and examples of the polymer latex to be incorporated in said light-sensitive material may include preferably hydrates of vinyl polymers such as acrylates, methacrylates, styrene, etc. as disclosed in U.S. Pat. Nos. 2,772,166, 3,325,286, 3,411,911, 3,311,912, 3,525,620, Research Disclosure No. 195, 19551 published in July, 1989.

As the polymer latex which may be preferably used, there may be included homopolymers of methaalkyl acrylate such as methyl methacryate, ethyl methacrylate, etc, homopolymers of styrene, or copolymers of methaalkyl acrylate or styrene with acrylic acid, N-methylolacryl-amide, glycidol methacrylate, etc., homopolymers of alkyl acrylate such as methyl acrylate, ethyl acrylate, butyl acrylate, etc. or copolymers of alkyl acrylate with acrylic acid, N-methylolacrylamide, etc. (preferably the content of the copolymer component such as acrylic acid, etc. being up to 30% by weight), homopolymers of butadiene or copolymers of butadiene with at least one of styrene, butoxymethylacrylamide acrylic acid, vinylidene chloride-methyl acrylate-acrylic acid ternary copolymer, etc.

The preferable range of the average particle size of the polymer latex to be used in the present invention may be 0.005 to 1μ, particularly preferably 0.2 to 0.1μ.

The polymer latex to be used in the present invention may be contained either on one surface with respect to the support or both surfaces. More preferably, it should be contained on both surfaces. When it is contained on both surfaces with respect to the support, the kind and/or the amount of the polymer latex contained on the respective surfaces may be either the same or different:

The layer in which the polymer latex is added may be any layer. For example, when it is contained in the side containing the silver halide light-sensitive layer with respect to the support, the polymer latex may be contained in the silver halide light-sensitive layer, or alternatively in the non-light-sensitive colloid layer of the uppermost layer which is generally called protective layer. Of course, when other layers, for example, intermediate layers exist between the silver halide light-sensitive layer and the uppermost layer, it may be contained in such intermediate layer. Further, the polymer latex may be contained in either single layer in the surface comprising a plurality of layers or in plural layers (not limited to 2 layers) comprising any desired combination of layers.

As the binder in the light-sensitive material to be used in the present invention, gelatin is used, and this gelatin includes gelatin derivatives, etc., and also cellulose derivatives, graft polymers of gelatin with other polymers, and other proteins, sugar derivatives, cellulose derivatives, hydrophilic colloids of synthetic hydrophilic polymeric substances, etc. which may be either of homopolymers or copolymers can be also used in combination.

As gelatin, in addition to lime-treated gelatin, acid-treated gelatin, enzyme-treated gelatin as described in Bulletin of Society of Science Photography of Japan (Bull. Soi. Sci. Phot. Japan) No. 16, p. 30 (1966) may be also used, and also hydrolyzates or enzyme decomposed products of gelatin can be used. As the gelatin derivatives, there may be employed those obtained by reacting various compounds such as acid halide, acid anhydride, isocyanates, bromoacetic acid, alkanesulfones, vinylsulfonamides, maleinimide compounds, polyalkylene oxides, epoxy compounds, etc. with gelatin. Specific examples are disclosed in U.S. Pat. Nos. 2,614,928, 3,132,945, 3,186,846, 3,312,553, G.B. Patent Nos. 861,414, 1,033,189, 1,005,784, Japanese Patent Publication No. 26845/1967.

As the protein, albumin, casein, as the cellulose derivative, hydroxyethyl cellulose, carboxymethyl cellulose, cellulose sulphate or as the sugar derivative, sodium alginate, starch derivative may be also used in combination with gelatin.

As the above-mentioned graft polymer of gelatin with other polymers, those having homo- or copolymer of a vinyl type monomer such as acrylic acid, methacrylic acid, derivatives thereof such as ester, amide, etc., acrylonitrile, styrene, etc. grafted onto gelatin can be used. Particularly, graft copolymers of polymers compatibility to some extent with gelatin, such as polymers of acrylic acid, acrylamide, methacrylamide, hydroxyalkyl methacrylate, etc. are preferred. Examples of these are disclosed in U.S. Pat. Nos. 2,763,625, 2,831,767, 2,956,884.

The amount of gelatin coated, when containing no polymer latex other than subbing layer on the surface corresponding to the surface of the light-sensitive material, may be preferably 1.8 g/m$^2$ to 5.5 g/m$^2$, particularly 2.0 to 4.8 g/m$^2$ per one surface of the support. When a polymer latex is contained on that surface, it should be preferably 1.5 to 6.0 g/m$^2$, particularly preferably 1.8 to 5.5 g/m$^2$.

The support to be used in the light-sensitive material of the present invention may include flexible reflective support such as papers laminated with α-olefin polymer (e.g. polyethylene/butene copolymer), etc., synthetic papers, etc., films comprising semi-synthetic or synthetic polymers such as cellulose acetate, cellulose nitrate, polystyrene, polyvinyl chloride, polyethylene terephthalate, polycarbonate, polyamide, etc., and flexible supports having reflective layer provided on these films, metal, etc.

Among them, polyethylene terephthalate is particularly preferred.

As the subbing layer which can be used in the present invention, there may be included the subbing working layer in organic solvent system containing polyhydroxybenzenes as disclosed in Japanese Unexamined Patent Publication No. 3972/1984, etc., aqueous latex subbing working layers as disclosed in Japanese Unexamined Patent Publication No. 11118/1974, 104913/1977, 19941/1984, 19940/1984, 1984, 112326/1976, 117617/1976, 58469/1976, 114120/1976, 121323/1976, 123129/1976, 114121/1976, 139320/1977, 65422/1977, 109923/1977, 119919/1977, 1980, 128332/1982, 19941/1984.

Also, said subbing layer can be generally subjected on its surface to chemical or physical treatment. As said treatment, there may be included surface activating treatments such as chemical treatment, mechanical treatment, corona dicharging treatment, flame treatment, UV-ray treatment, high frequency treatment, glow discharging treatment, active plasma treatment, laser treatment, mixed acid treatment, ozone oxidation treatment, etc.

The subbing layer is distinguished from the coating layer according to the present invention and the coating timing and conditions are not limited at all.

In the present invention, filter dyes and other dyes for various purposes such as halation prevention can be used. The dyes employed may include triaryl dyes, oxanol dyes, hemioxanol dyes, malocyanine dyes, cyanine dyes, styryl dyes, azo dyes. Among them, oxanol dyes, hemioxanol dyes and melocyanine dyes are useful. Specific examples of the dyes which can be used may include those as disclosed in West German Patent No. 616,007, G.B. Patent Nos. 584,609, 1,177,429, Japanese Patent Publication Nos. 7777/1951, 1964, 38129/1979, 85130/1973, 99620/1974, 111420/1974, 129537/1974, 28827/1975, 108115/1977, 185038/1982, 24845/1984, U.S. Pat. Nos. 1,878,961, 1,884,035, 1,912,797, 2,098,891, 2,150,695, 2,274,782, 2,298,731, 2,409,612, 2,461,484, 2,527,583, 2,533,472, 2,865,752, 2,956,879, 3,094,418, 3,125,448, 3,148,187, 3,177,078, 3,247,127, 3,260,601, 3,282,699, 3,409,433, 3,540,887, 3,575,704, 3,653,905, 3,718,472, 3,865,817, 4,070,352, 4,071,312, PB report No. 74175, Photo Abstr. 128 (1921).

Particularly, in film for daylight contact work light-sensitive material, these dyes should be preferably used, and it is particularly preferable to use them so that the sensitivity to the light of 400 nm may be incorporated to 30-fold or more of the sensitivity to the light of 360 nm.

Further, in the practice of the present invention, it is also possible to use an organic desensitizer with the sum of the anode potential and the cathode potential of polarography being positive as described in Japanese Unexamined Patent Publication No. 26041/1986.

The light-sensitive material of the present invention can be exposed by use of an electromagnetic wave in the spectral region to which the emulsion layer constituting said light-sensitive material has sensitivity.

The present invention can give remarkable effect when applied to a light-sensitive material for printing for which very high dimensional stability before and after processing is required.

The developing agent to be used in development of the light-sensitive silver halide photographic material according to the present invention may include those as mentioned below.

Representative of the HO—(CH=CH)$_n$—OH type developing agents are hydroquinone, and otherwise catechol, pyrogallol and their derivatives, and also ascorbic acid, chlorohydroquinone, bromohydroquinone, methylhydroquinone, 2,3-dibromohydroquinone, 2,5-diethylhydroquinone, catechol, 4-chlorocatechol, 4-phenylcatechol, 3-methoxy-catechol, 4-acetyl-pyrogallol, sodium ascorbate.

As the heterocyclic type developer, there may be included 3-pyrazolidones such as 1-phenyl-3-pyrazolidone, 1-phenyl-4,4-dimethyl-3-pyrazolidone, 1-phenyl-4-methyl-4-hydroxymethyl-3-pyrazolidone; 1-phenyl-4-amino-5-pyrazolone, 5-aminouracil, etc.

Otherwise, the developers as described in T. H. James The Theory of The Photographic Process, Fourth Edition), p. 291–334 and Journal of the American Chemical Society, vol. 73, p. 3,100 (1951) can be effectively used in the present invention. These developing agents can be used either singly or as a combination of two or more kinds, but preferably two or more kinds may be used in combination.

Also, in the developer to be used for development of the light-sensitive material, as the preservative, for example, a sulfite such as sodium sulfite, potassium sulfite, etc. can be used without impairing the effect of the present invention. Also, hydroxylamine, a hydrazide compound can be used as the preservative, and in this case, its amount may be preferably 5 to 500 g, more preferably 20 to 200 g per one liter of the developer.

Also, in the developer may be contained glycols as an organic solvent, and as such glycol, ethylene glycol, diethylene glycol, propylene glycol, triethylene glycol, 1,4-butanediol, 1,5-pentane diol, etc. may be preferably used. The amount of these glycols used may be 5 to 500 g, more preferably 20 to 200 g per one liter of the developer. These organic solvents can be used either alone or in combination.

The light-sensitive silver halide photographic material according to the present invention can be subjected to developing processing by use of a developer containing a development inhibitor, whereby a light-sensitive material very excellent in storage stability can be obtained.

The light-sensitive silver halide photographic material according to the present invention can be processed under various conditions. The processing temperature may be, for example, a developing temperature of 50° C. or lower, particularly around 25° to 40° C., and also the developing time should be preferably completed within less than 20 seconds, particularly 19 seconds or less. Further, the present invention can exhibit its effect most effectively when the developing time is within the range of 15 seconds or less, and further 15 to 10 seconds.

Other processing steps than developing, for example, water washing, stopping, stabilizing, fixing, and further previous film hardening, neutralization, etc. can be employed as desired, and these can be also suitably omitted.

In the present invention, in the fixer which can be used during processing, in addition to thiosulfate, sulfite, etc., various acids, salts, fixing promoters, humectants, surfactants, chelating agents, film hardeners, etc. can be contained. For example, there may be included as thiosulfates, sulfites, potassium, sodium, ammonium salts of these acids, as acids, sulfuric acid, hydrochloric acid, nitric acid, boric acid, formic acid, acetic acid, propionic acid, oxalic acid, tartaric acid, citric acid, malic acid, phthalic acid, etc. and as salts, potassium, sodium, ammonium salts, etc. of these acids. As the fixing promoter, there may be included thiourea derivatives, alcohols having triple bond within the molecule as disclosed in Japanese Patent Publication No. 35754/1970, Japanese Unexamined Patent Publication Nos. 122535/1983, 122536/1983, thioethers, as disclosed in U.S. Pat. No. 4,126,459, or cyclodextran ethers which make free anions, crown ethers, diazabicycloundecene, di(hydroxyethyl)butamine, etc. As the humectant, alkanolamines, alkylene glycols, etc. may be included. As the chelating agent, aminoacetic acids such as nitrilotriacetic acid, EDTA, etc. may be included. As the film hardener, chromium alum, potassium alum, and other Al compounds, etc. can be incorporated.

The present invention can exhibit its advantages greatly when ultra-fast processing with a processing time of 20 to 60 seconds is applied. Although such ultra-fast processing has been desired, the ultra-fast processing as mentioned in the present specification refers to a processing in which the total time after the tip end of a film is inserted into an automatic developing machine, passing through the developing tank, the cross-over portion, the fixing tank, the cross-over portion, the water washing tank, the cross-over portion, the drying portion, until the tip end of the film comes out from the drying portion (in other words the quotient of the entire length of the processing line divided by the line conveying speed) is 20 seconds to 60 seconds. Here, the reason why the time at the cross-over portions is included, as is well known in this field of art, because the processing steps are regarded to substantially proceed, since the liquid in the preceding process is swelled in the gelatin film also in the cross-over portion.

The present invention is described in detail by referring to Examples, by which the present invention is not limited at all.

EXAMPLE 1

An aqueous silver nitrate solution and an aqueous solution of sodium chloride and potassium bromide were mixed in an aqueous gelatin solution at pAg=7.7 by use of the control double jet method to form silver halide grains, followed by desalting in conventional manner to obtain a silver halide emulsion. The silver halide emulsions obtained at this time are shown in Table 1.

TABLE 1

| Emulsion | Halide composition Cl/Br | Average grain size μm | Crystal habit |
|---|---|---|---|
| A | 98/2 | 0.12 | Cubic |
| B | 70/30 | 0.22 | " |
| C | 0/100 | 0.25 | " |

Then, 1.2 g of the hydrazine compound shown in Table 2 was added to the emulsion A per 1 mole of silver. Further, as the antifoggant, 30 mg/m$^2$ of 1-phenyl-5-mercaptotetrazole and 20 mg/m$^2$ of 5-methylbenzotriazole, as the development controller, 30 mg/m$^2$ of a nonylphenoxy-polyethylene glycol (ethylene oxide units 30) and 1 g/m$^2$ of an acrylic acid-butyl methacrylate-styrene polymer latex, and further bisvinylsulfomethyl ether and glyoxazole of the film hardening agent were successively added, and the resultant mixture was coated on a polyethylene terephthalate base simultaneously with a protective layer. The gelatin amount relative to the silver amount is shown in Table 2. Then, these samples were exposed through a glass wedge by P-627 FM roomlight printer (manufactured by Dainippon Screen), and processed with the developer and the fixed shown below. In this processing, developing time was 15 seconds (35° C.).

| <Developer recipe> | |
|---|---|
| Hydroquinone | 34 g |
| N-methyl-p-aminophenol | 0.23 g |
| Disodium ethylenediaminetetraacetate | 1 g |
| 3-Diethylamino-1,2-propane diol | 15 g |
| 5-Methylbenztriazole | 0.4 g |
| $Na_2SO_3$ | 76 g |
| NaBr | 3 g |
| NaCl | 1.3 g |
| 1 mole/phosphoric acid solution | 400 ml |
| (after addition of NaOH necessary for adjustment to pH 11.5, made up to one liter with water) | |
| <Fixer recipe> | |
| (Composition A) | |
| Ammonium thiosulfate (72.5% W/V aqueous solution) | 240 ml |
| Sodium sulfite | 17 g |
| Sodium acetate trihydrate | 6.5 g |
| Boric acid | 6 g |
| Sodium citrate dihydrate | 2 g |
| (Composition B) | |
| Pure water (deionized water) | 17 ml |
| Sulfuric acid (50% W/V aqueous solution) | 4.7 g |
| Aluminum sulfate (8.1% W/V aqueous solution as calculated on $Al_2O_3$) | 26.5 g |

During use of the fixer, the above compositions A and B During use of were dissolved in this order in 500 ml of water and then made up to one liter before use. The pH of the fixer was adjusted to 6 with acetic acid.

The amount of the silver coated was analyzed by a fluorescent X-ray analyzer.

The silver amount after processing is shown in the silver amount which gives the maximum density.

TABLE 2

| No. | Hydrazine compound | Gelatin amount in emulsion layer (g/m$^2$) | Gelatin amount in protective layer (g/m$^2$) | Coated silver amount (g/m$^2$) | Developed silver amount (g/m$^2$) | γ | The present invention |
|---|---|---|---|---|---|---|---|
| 1 | I-2 | 1.0 | 0 | 2.0 | 2.0 | 12.0 | ○ |
| 2 | " | " | 0.2 | " | 1.9 | 11.4 | ○ |
| 3 | " | 1.3 | 0.2 | " | 2.0 | 10.3 | ○ |
| 4 | " | " | 0.9 | " | 1.5 | 6.8 | X |
| 5 | " | 1.0 | 0.2 | 3.0 | 3.0 | 12.0 | ○ |
| 6 | " | " | 0.7 | " | 2.8 | 11.2 | ○ |
| 7 | " | 1.5 | 0.7 | " | 2.9 | 10.3 | ○ |
| 8 | " | " | 1.7 | " | 2.9 | 6.5 | X |
| 9 | " | 2.0 | 0.5 | 4.0 | 3.9 | 11.8 | ○ |
| 10 | " | " | 1.2 | " | 3.8 | 11.2 | ○ |
| 11 | " | " | 2.4 | " | 2.8 | 6.5 | X |
| 12 | " | 3.0 | 0.5 | " | 3.8 | 11.3 | ○ |
| 13 | " | " | 1.5 | " | 2.9 | 6.3 | X |
| 14 | — | 3.0 | 0.5 | " | 3.6 | 5.4 | X |

γ is defined for density from 0.3 to 3.0.

The product with γ<6 can be practically applied with difficulty because fine lines are practically collapsed.

As is apparent from Table 2, it can be understood that 90% or more of Ag coated was developed, and also a high contrast image with γ of 6 or more is given, when the ratio of the silver amount to gelatin is 1.0 or more.

EXAMPLE 2

To the emulsion B subjected to gold-sulfur sensitization was added 1.2 g of the hydrazine compound shown in Table 3 and also 300 mg of the sensitizing dye shown below per one mole of silver, followed by coating similarly as in Example 1. The gelatin amount relative to the silver amount is shown in Table 3. These samples were subjected to wedge exposure by xenon light, and processed similarly as in Example 1.

Sensitizing dye:

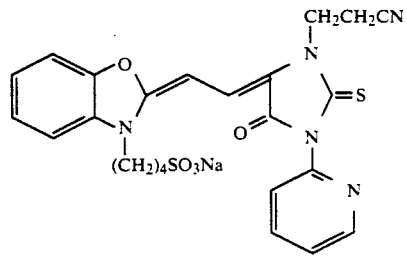

TABLE 3

| No. | Hydrazine compound | Gel amount in emulsion layer (g/m²) | Gel amount in protective layer (g/m²) | Coated silver amount (g/m²) | Developed silver amount (g/m²) | γ | Dot quality rank | The present invention |
|---|---|---|---|---|---|---|---|---|
| 1 | I-1 | 1.0 | 0 | 2.0 | 2.0 | 11.9 | 5 | ○ |
| 2 | " | " | 0.2 | " | 1.9 | 11.4 | 5 | ○ |
| 3 | " | 1.5 | 0.3 | " | 1.9 | 11.3 | 4 | ○ |
| 4 | " | " | 0.7 | " | 1.5 | 6.8 | 2 | X |
| 5 | " | 2.0 | 0.5 | 3.0 | 2.9 | 10.9 | 5 | ○ |
| 6 | " | " | 1.2 | " | 2.5 | 6.8 | 2 | X |
| 7 | " | 2.5 | 0.4 | " | 2.7 | 10.5 | 4 | ○ |
| 8 | " | " | 1.0 | " | 2.3 | 6.4 | 2 | X |
| 9 | " | 3.0 | 0.5 | 4.0 | 3.8 | 10.2 | 4 | ○ |
| 10 | " | " | 1.2 | " | 3.4 | 6.0 | 2 | X |
| 11 | — | 3.0 | 0.5 | " | 3.7 | 5.3 | 1 | X |

The dot quality was evaluated based on the sensory examination by enlarging the dot formed by bringing the contact screen in close dot contact with the film during exposure with a 100-fold magnifier.

The rank 5 indicates the highest state, with the states of rank 2 or lower standing no practical application.

From Table 3, it can be understood that 90% or more of the silver coated is developed and also γ is 6.0 or more, when the ratio of the silver amount to the gelatin amount is 1.0 or more.

EXAMPLE 3

To the emulsion of C applied with gold-sulfur sensitization, 1.2 g of the hydrazine compound shown in Table 4 was added per one mole of silver, and 200 mg of the sensitizing dye shown below per one mole of silver, followed by coating similarly as in Example 1. The amount of the gelatin amount relative to the silver amount is shown in Table 4. These samples were subjected to wedge exposure by xenon light, and processed similarly as in Example 1.

Sensitizing dye:

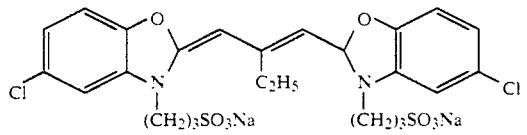

TABLE 4

| No. | Hydrazine compound | Gel amount in emulsion layer (g/m²) | Gel amount in protective layer (g/m²) | Coated silver amount (g/m²) | Developed silver amount (g/m²) | γ | Dot quality rank | The present invention |
|---|---|---|---|---|---|---|---|---|
| 1 | I-1 | 1.0 | 0 | 2.0 | 2.0 | 11.9 | 5 | ○ |
| 2 | " | " | 0.2 | " | 1.9 | 11.3 | 5 | ○ |
| 3 | " | 1.5 | 0.2 | " | 1.9 | 11.2 | 4 | ○ |
| 4 | " | " | 0.7 | " | 1.5 | 6.7 | 2 | X |
| 5 | " | 2.0 | 0.5 | 3.0 | 2.9 | 10.8 | 5 | ○ |
| 6 | " | " | 1.2 | " | 2.5 | 6.5 | 2 | X |
| 7 | " | 2.5 | 0.2 | " | 2.7 | 10.3 | 4 | ○ |
| 8 | " | " | 0.7 | " | 2.3 | 6.2 | 2 | X |
| 9 | " | 3.0 | 0.5 | 4.0 | 3.8 | 10.0 | 4 | ○ |
| 10 | " | " | 1.2 | " | 3.4 | 6.0 | 2 | X |
| 11 | — | " | 0.5 | " | 3.7 | 5.1 | 1 | X |

From Table 4, it can be understood that 90% or more of the silver amount coated is developed, and γ is 6.0 or more and also the dot quality is excellent, when the ratio of the silver amount to gelatin is 1.0 or more.

I claim:

1. A negative type light-sensitive silver halide photographic material for producing a high contrast image in a developing process wherein the photographic material is in the developer for 19 seconds or less, said negative type light sensitive silver halide photographic material comprising light-sensitive silver halide emulsion provided on a support, wherein the ratio of silver amount to gelatin amount (Ag/Gel) (wherein said silver amount is the total silver amount in one or more layers provided in the same side as said light-sensitive silver halide emulsion layer with respect to the support, and said gelatin amount is the total gelatin amount in one or more gelatin layers provided in the same side as said light-sensitive silver halide emulsion layer with respect to the support) is 1.0 or more, and a hydrophilic colloid layer in said light-sensitive silver halide emulsion contains a hydrazine compound of the Formula (I-b) shown below:

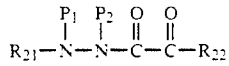

Formula (I-b)

wherein $R_{21}$ represents an aliphatic group, an aromatic group or a heterocyclic group, $R_{22}$ represents hydrogen atom, an alkoxy group, a heterocyclic oxy group, an amino group or an aryloxy group, $P_1$ and $P_2$ each represent hydrogen atom, an acyl group or a sulfinic acid group.

2. The negative type light-sensitive photographic material according to claim 1, wherein said hydrazine compound is one of the following compounds:

I-b-1
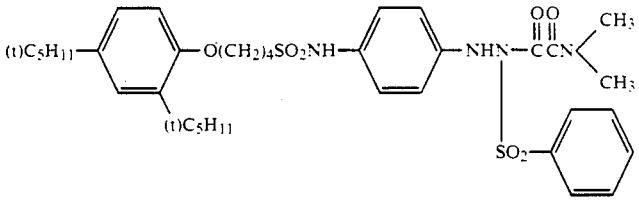
I-b-2
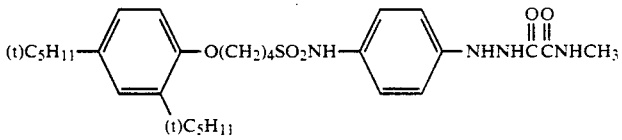
I-b-3
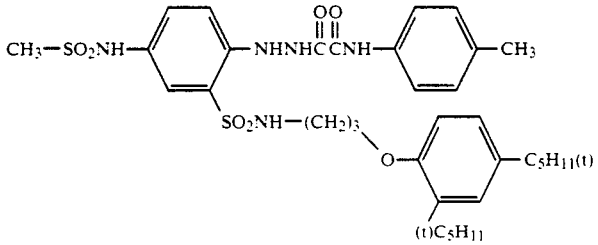
I-b-4
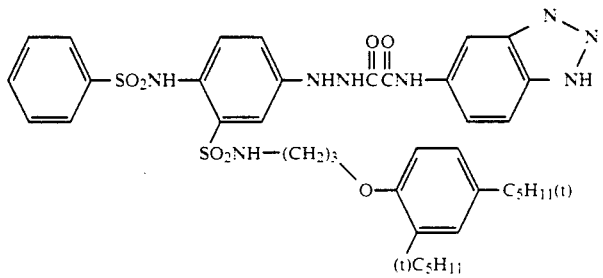
I-b-5
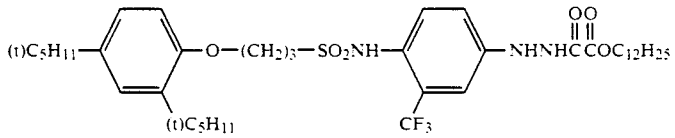
I-b-6
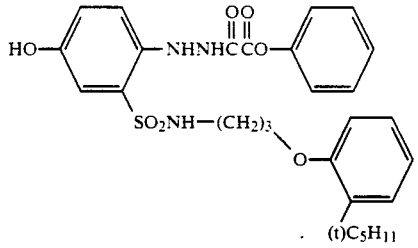
I-b-7
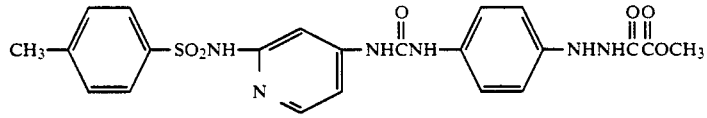
I-b-8
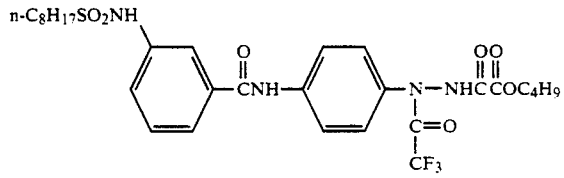

-continued
I-b-9
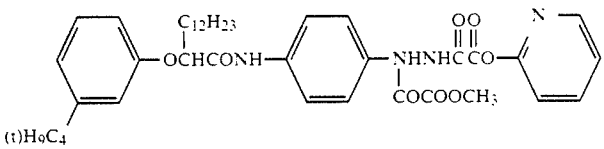
I-b-10
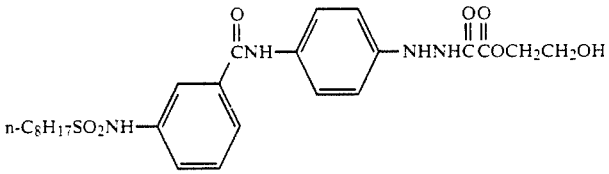
I-b-11
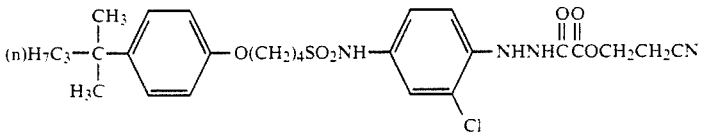
I-b-12
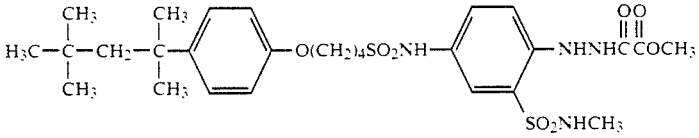
I-b-13
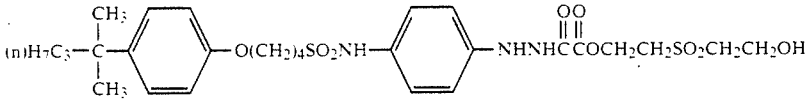
I-b-14
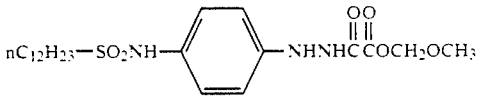
I-b-15
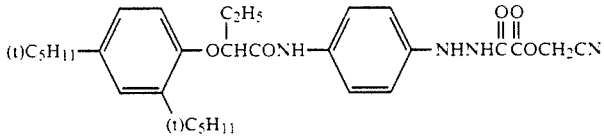
I-b-16
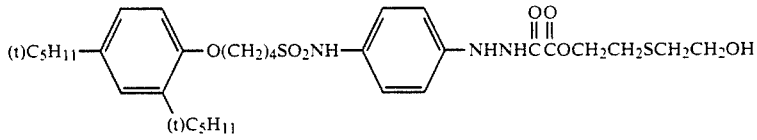
I-b-17
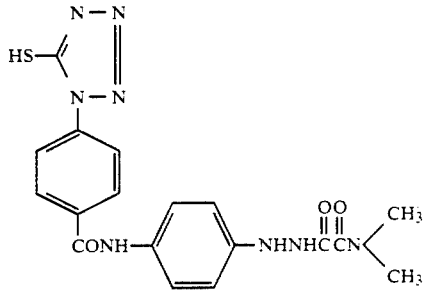

-continued
I-b-18
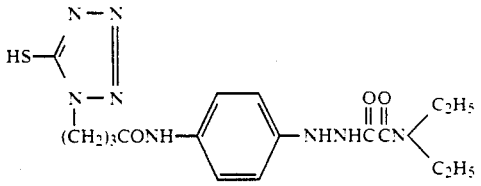
I-b-19
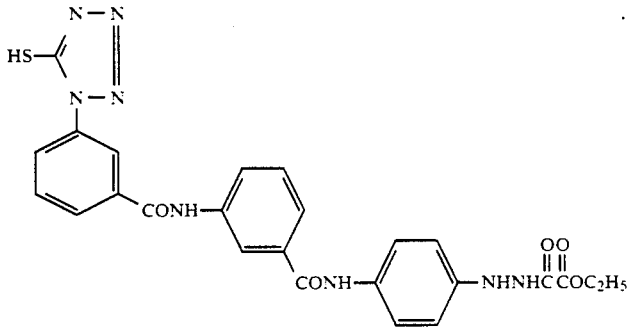
I-b-20
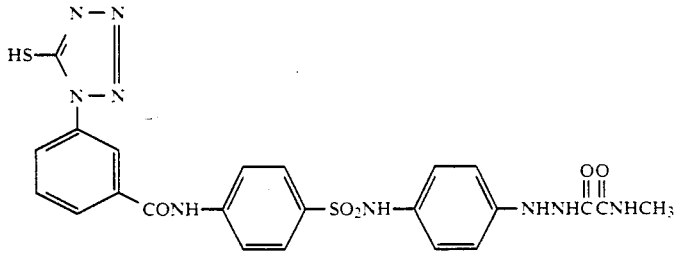
I-b-21
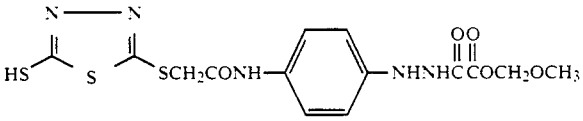
I-b-22
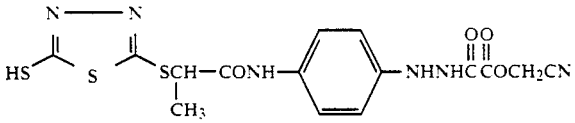
I-b-23
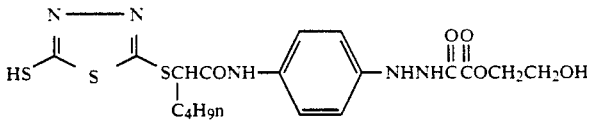
I-b-24
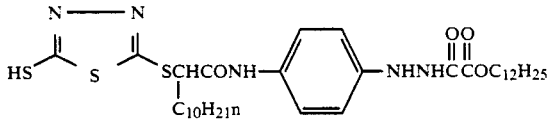
I-b-25
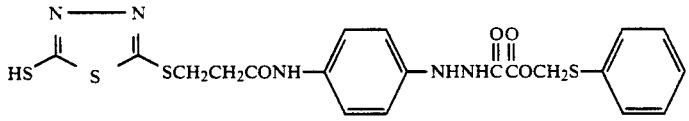
I-b-26
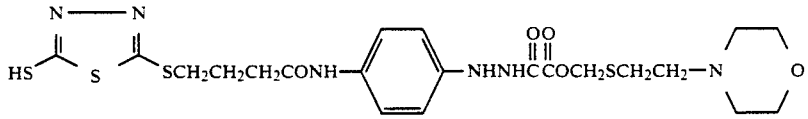

-continued
I-b-27
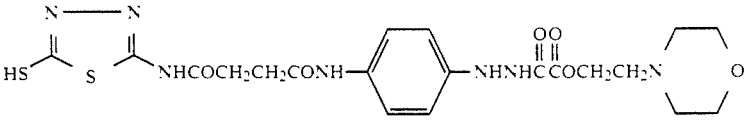
I-b-28
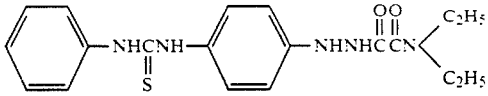
I-b-29
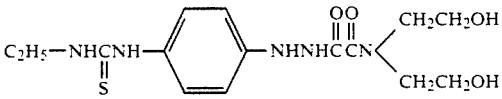
I-b-30
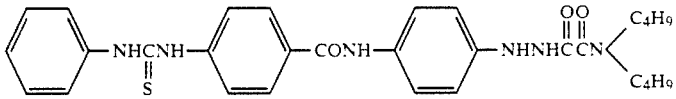
I-b-31
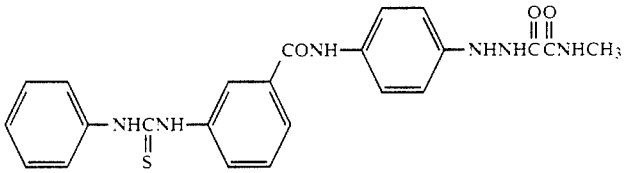
I-b-32
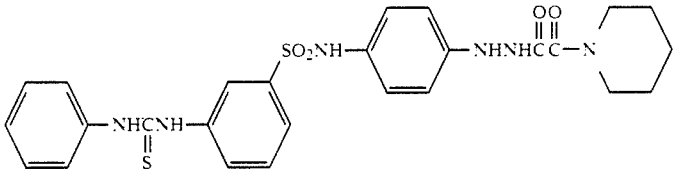
I-b-33
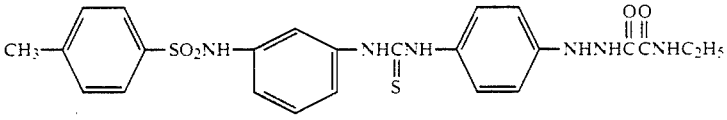
I-b-34
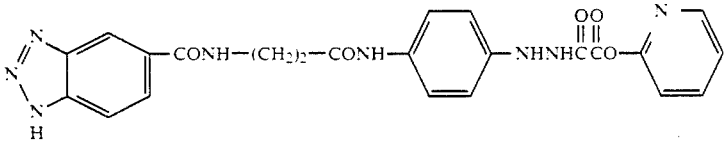
I-b-35
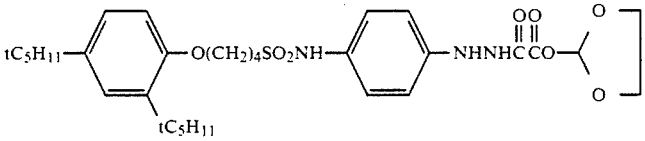
I-b-36
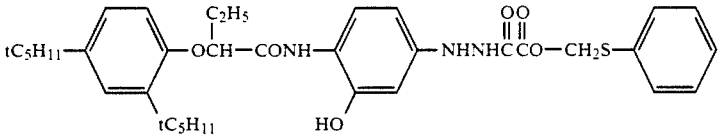
I-b-37
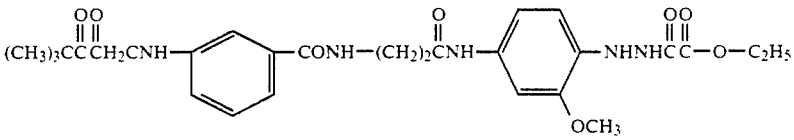

-continued
I-b-38
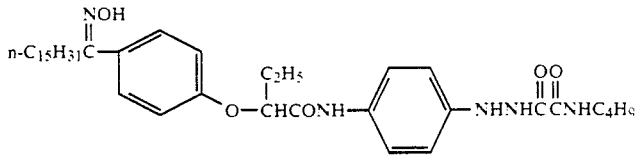
I-b-39
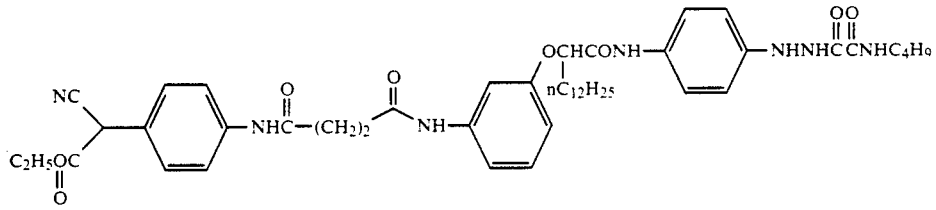
I-b-40
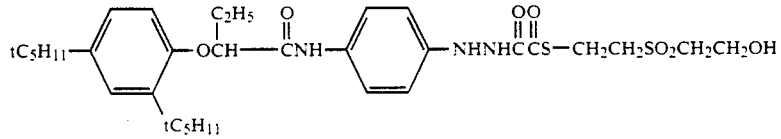
I-b-41
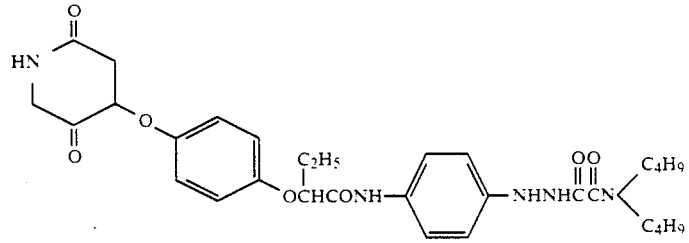
I-b-42
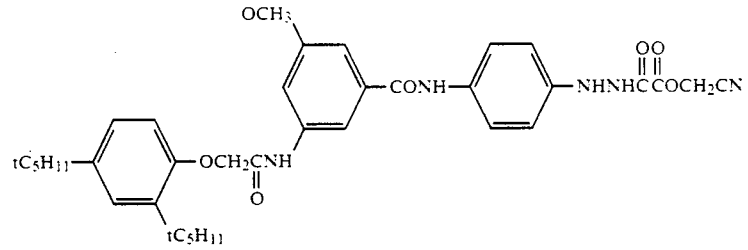
I-b-43
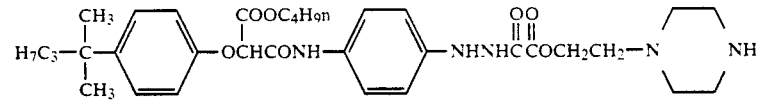
I-b-44
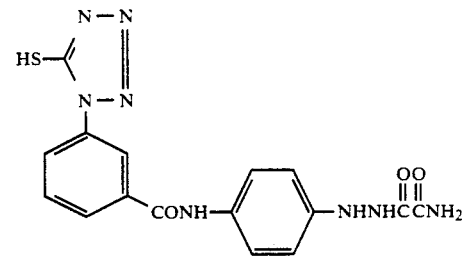
I-b-45
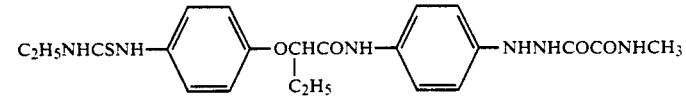

-continued
I-b-46
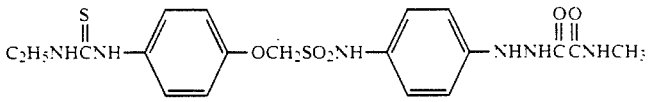
I-b-47
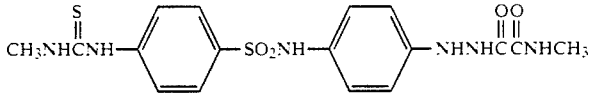
I-b-48
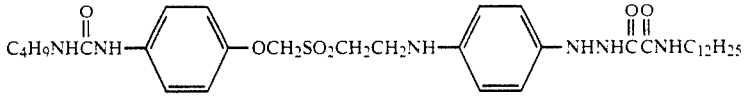
I-b-49
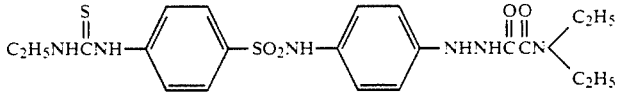
I-b-50
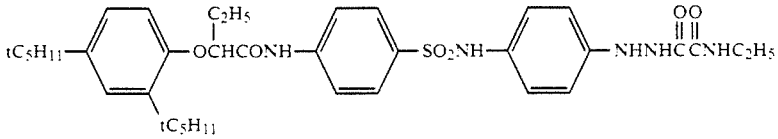
I-b-51
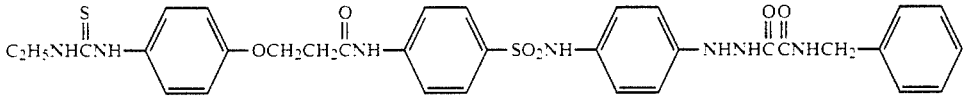
I-b-52
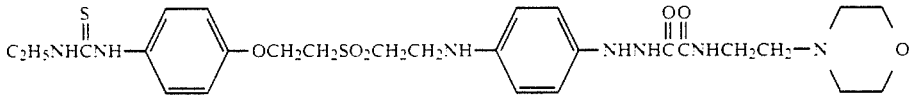
I-b-53
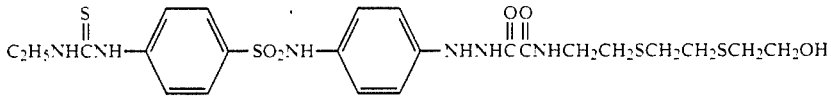
I-b-54
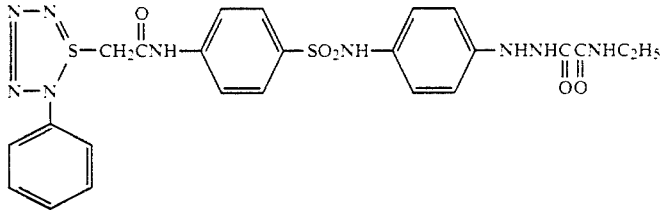
I-b-55
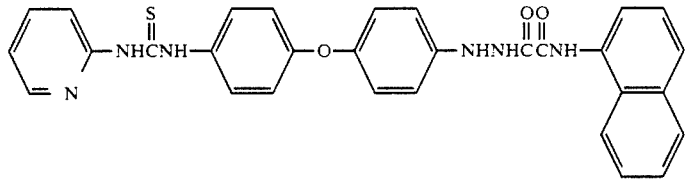
I-b-56
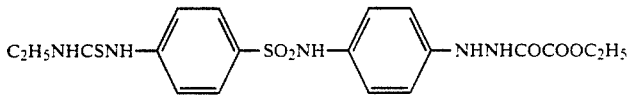
I-b-57
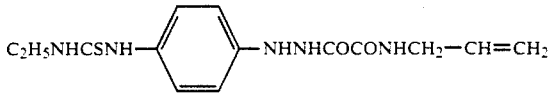

-continued
I-b-58
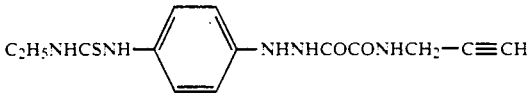
I-b-59
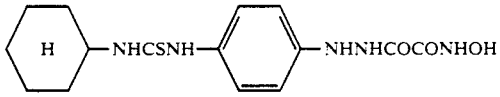
I-b-60
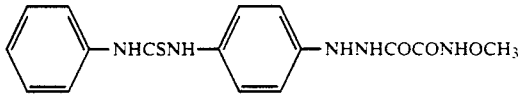
I-b-61
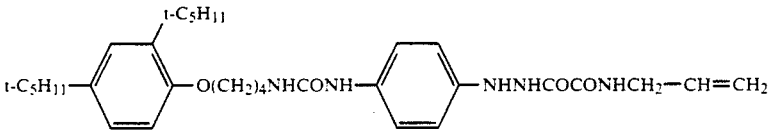
I-b-62
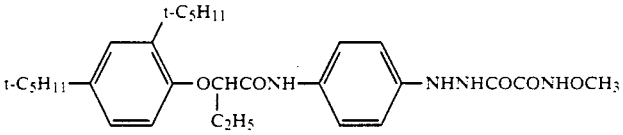
I-b-63
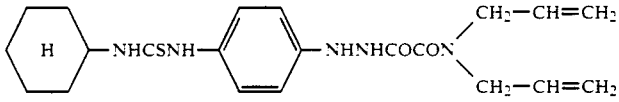
I-b-64
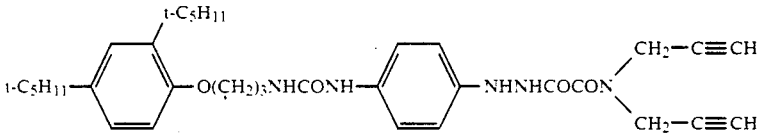
I-b-65
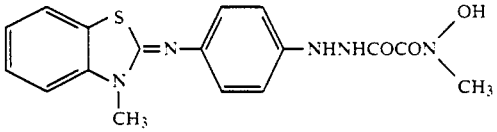
I-b-66
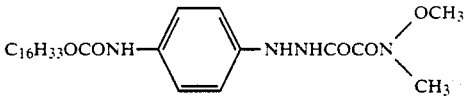
I-b-67
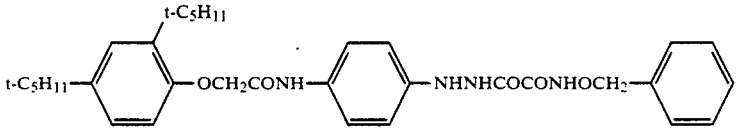
I-b-68
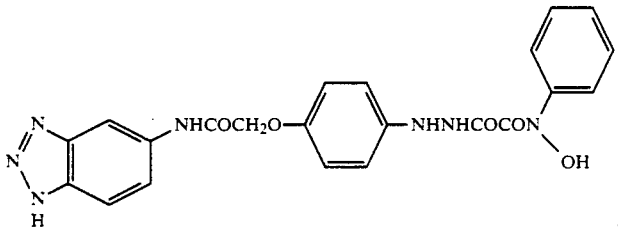

-continued
I-b-69
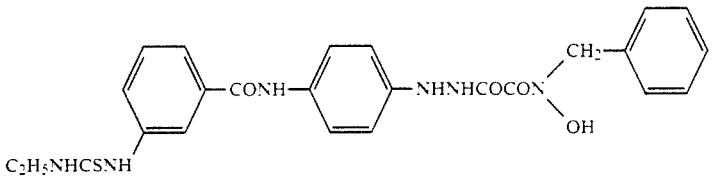
I-b-70
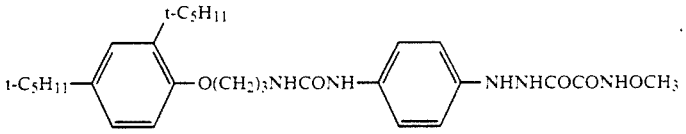
I-b-71
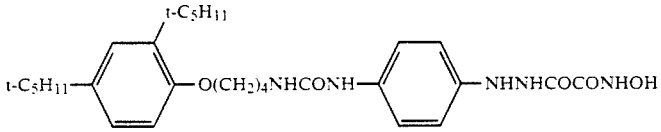
I-b-72
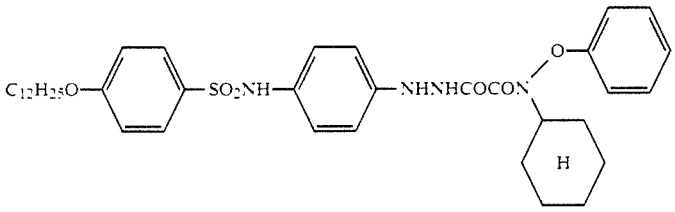
I-b-73
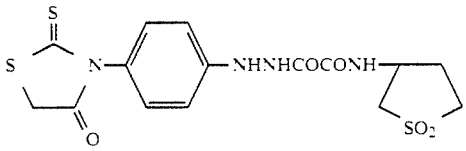
I-b-74
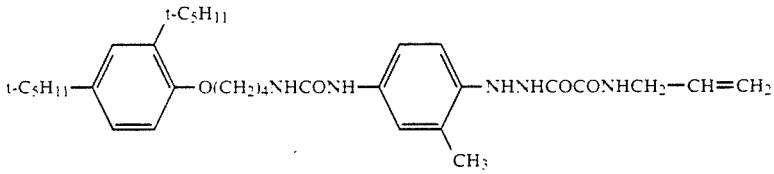
I-b-75
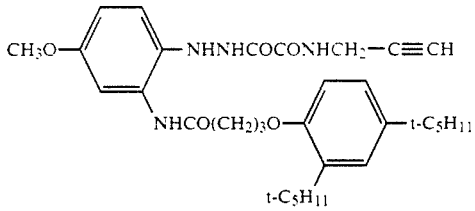
I-b-76
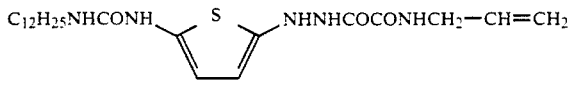
I-b-77
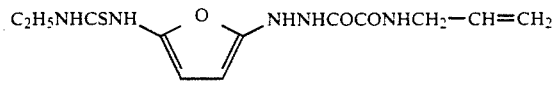
I-b-78
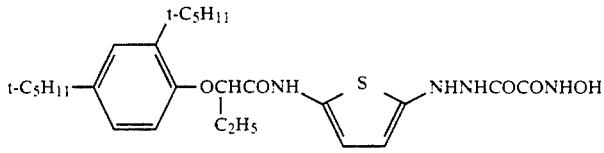

-continued
I-b-79
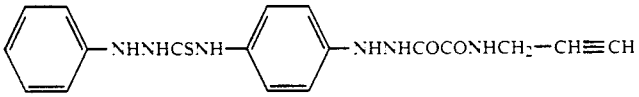
I-b-80
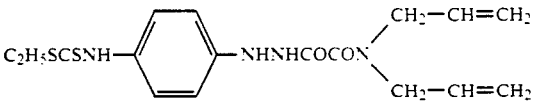
I-b-81
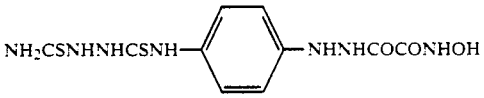
I-b-82
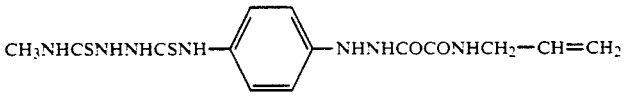
I-b-83
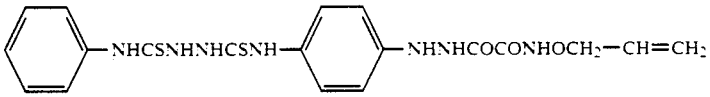
I-b-84
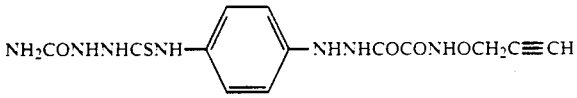
I-b-85
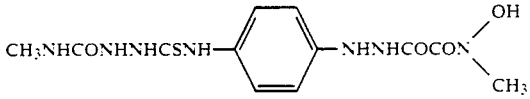
I-b-86
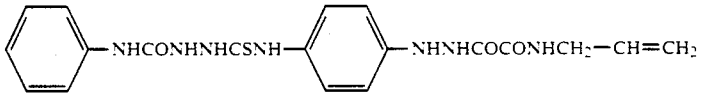
I-b-87
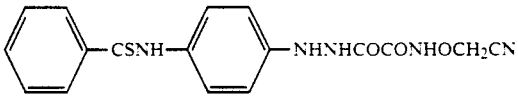
I-b-88
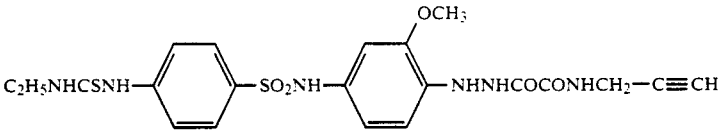
I-b-89
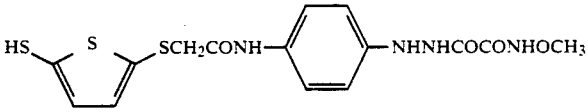
I-b-90
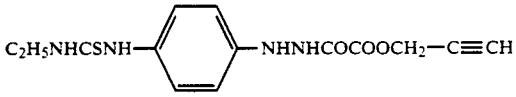
I-b-91
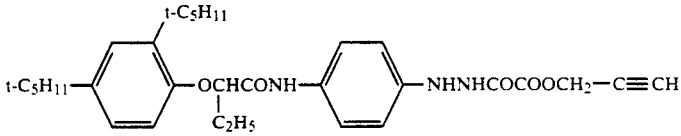

-continued
I-b-92
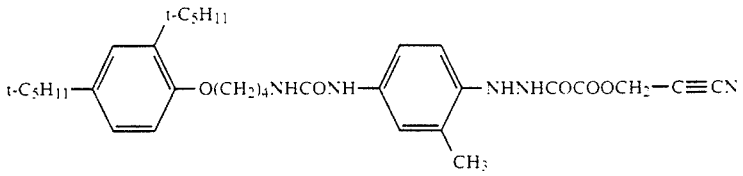
I-b-93
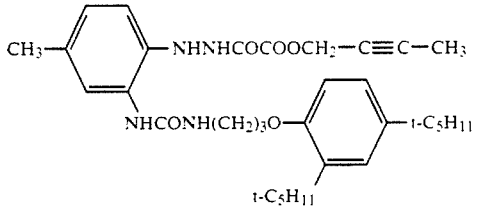
I-b-94
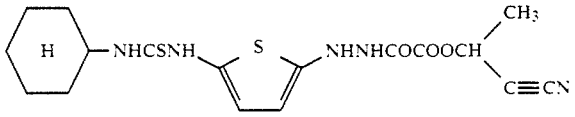
I-b-95
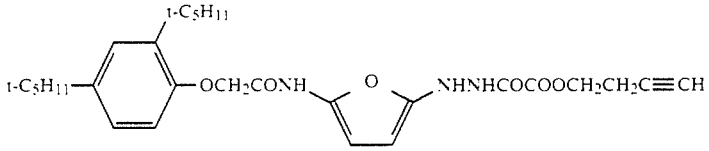
I-b-96
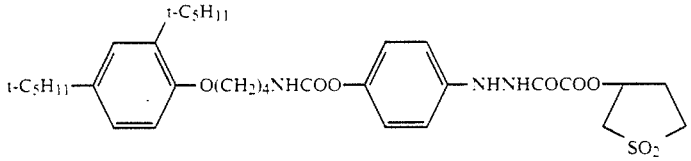
I-b-97
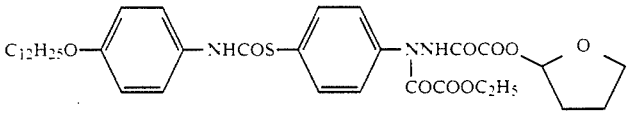
I-b-98
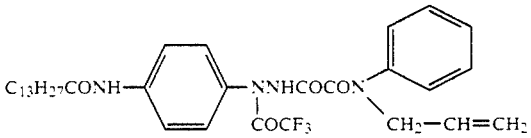
I-b-99
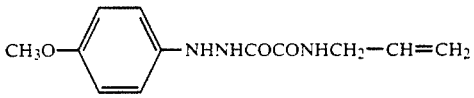
I-b-100
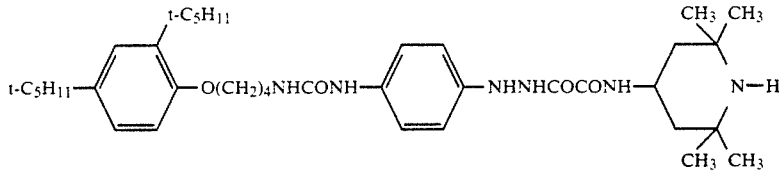
I-b-101
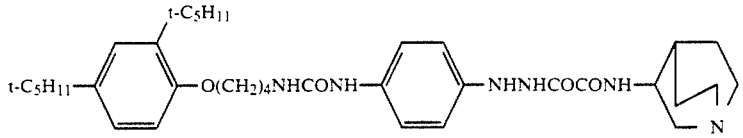

-continued
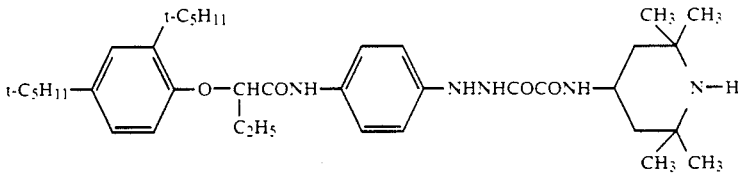
I-b-102
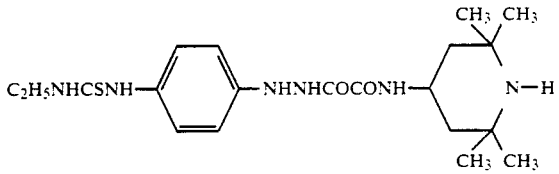
I-b-103
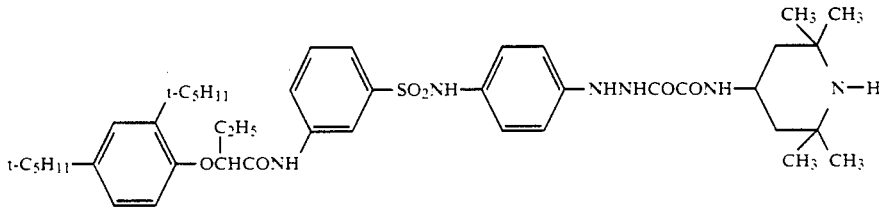
I-b-104
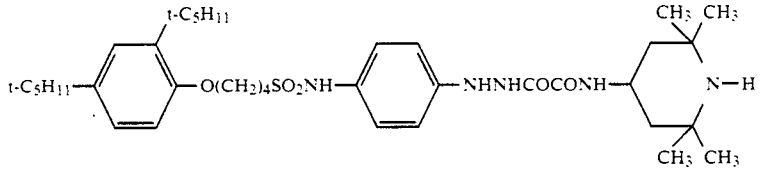
I-b-105
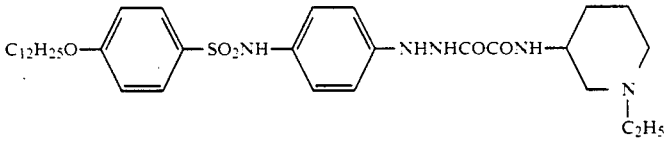
I-b-106
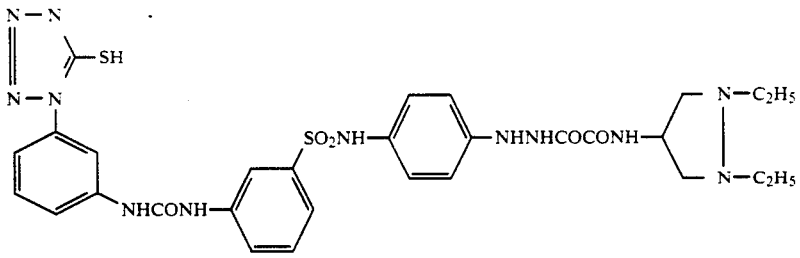
I-b-107
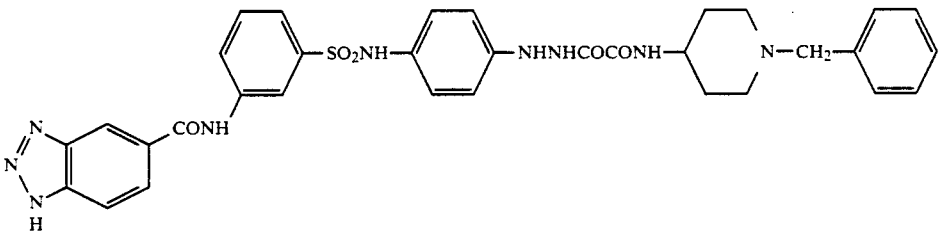
I-b-108

-continued
I-b-109
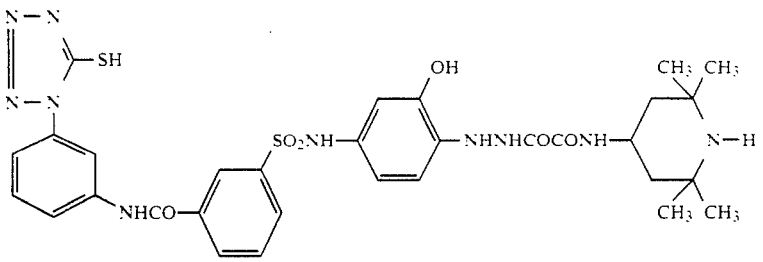
I-b-110
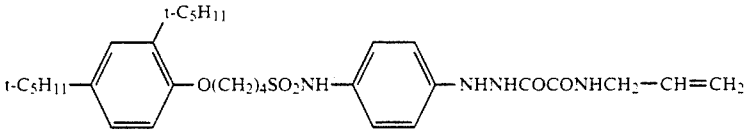
I-b-111
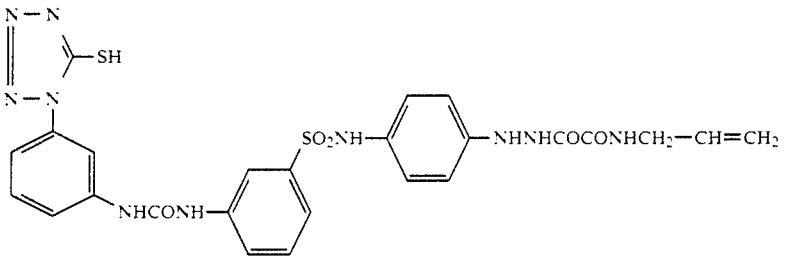
I-b-112
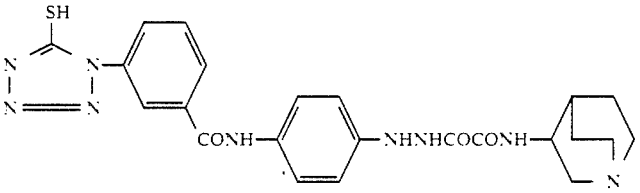
I-b-113
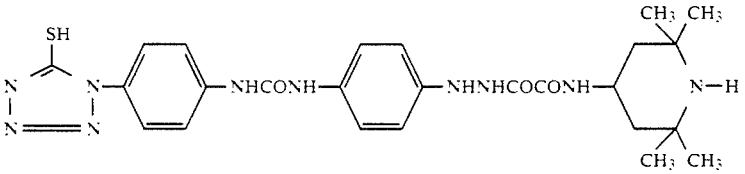
I-b-114
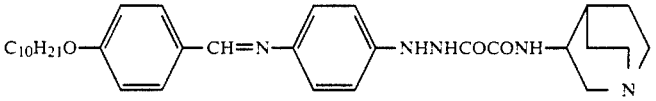
I-b-115
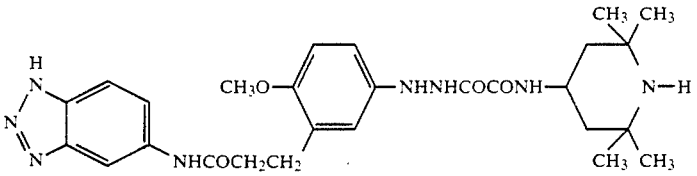
I-b-116
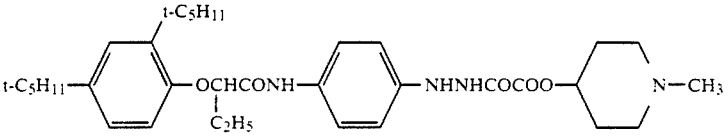

-continued
I-b-117
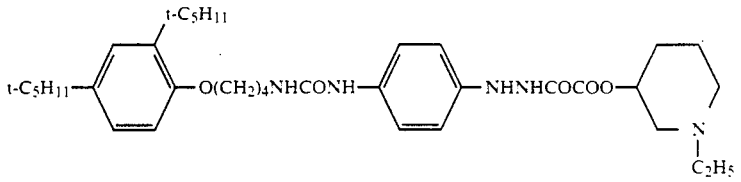
I-b-118
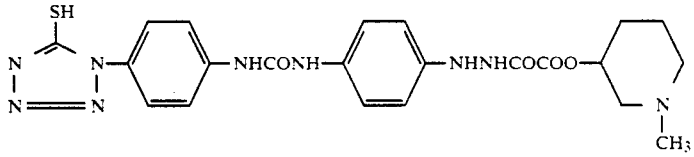
I-b-119
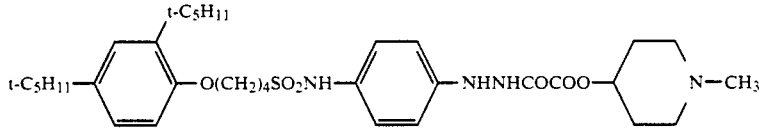
I-b-119'
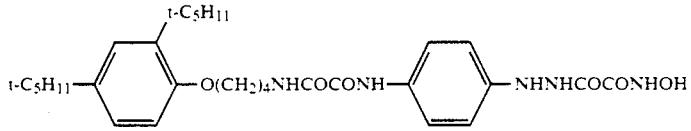
I-b-120
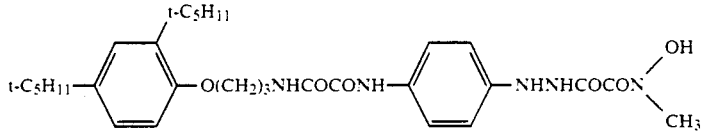
I-b-121
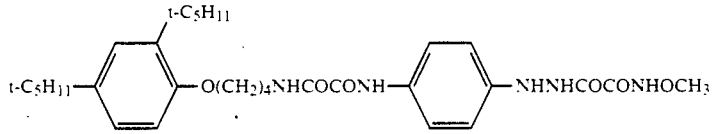
I-b-122
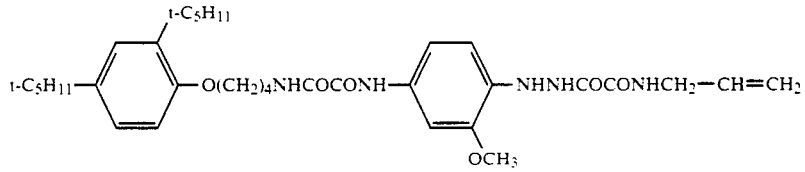
I-b-123
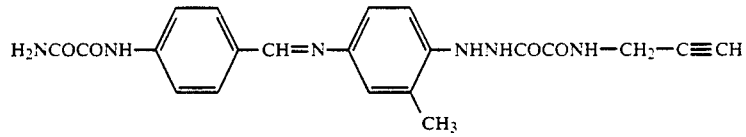
I-b-124
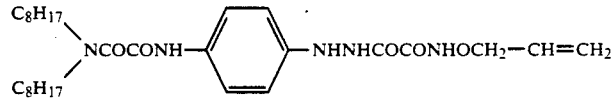
I-b-125
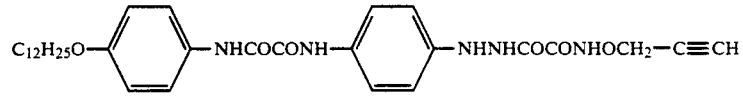
I-b-126
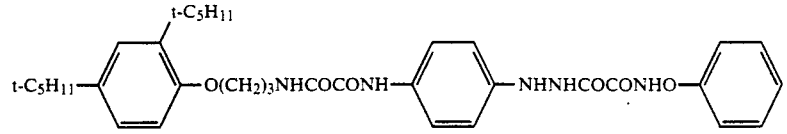

-continued
I-b-127
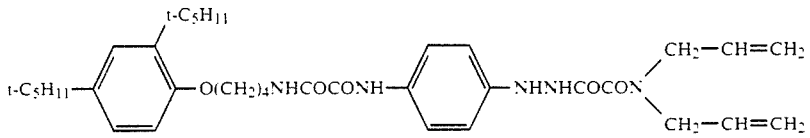
I-b-128
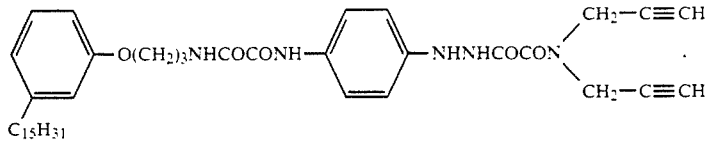
I-b-129
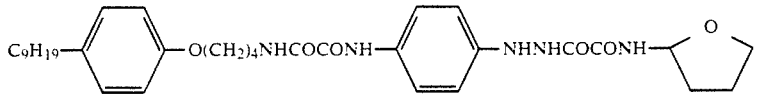
I-b-130
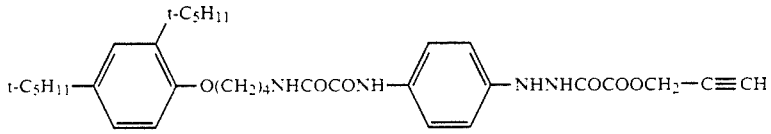
I-b-131
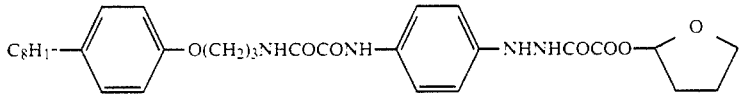
I-b-132
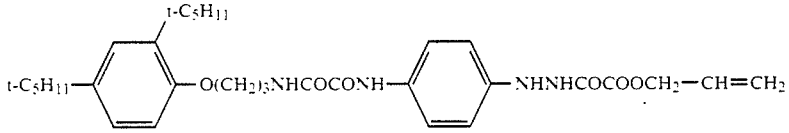
I-b-133
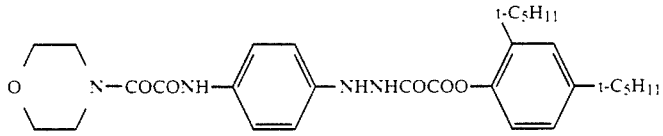
I-b-134
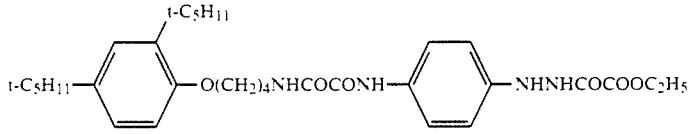
I-b-135
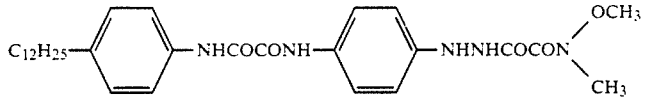
I-b-136
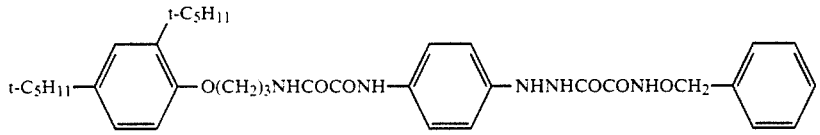
I-b-137
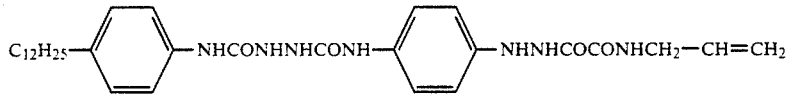
I-b-138
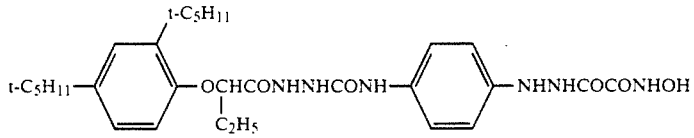

-continued
I-b-139
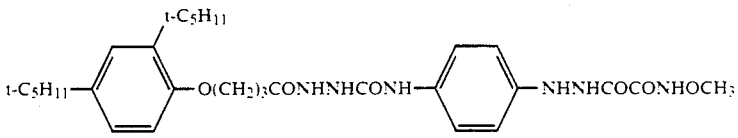
I-b-140
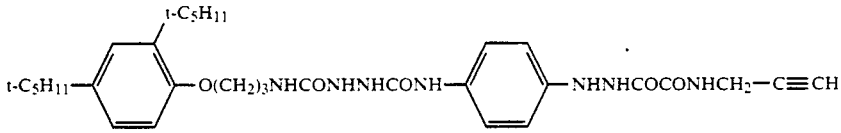
I-b-141
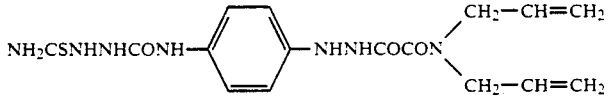
I-b-142
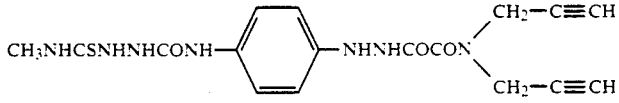
I-b-143
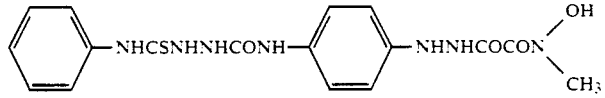
I-b-144
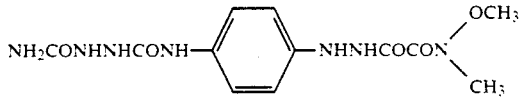
I-b-145
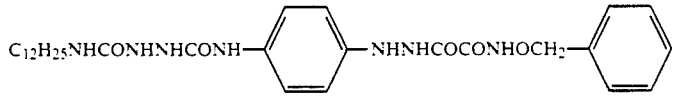
I-b-146
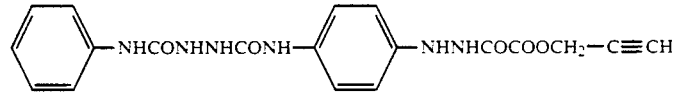
I-b-147
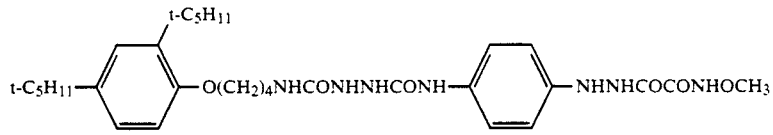
I-b-148
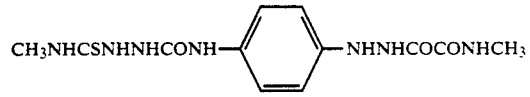
I-b-149
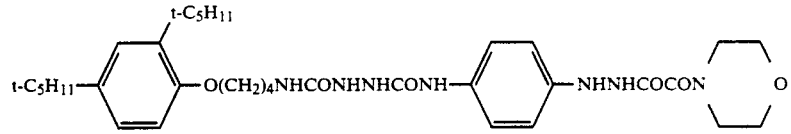
I-b-150
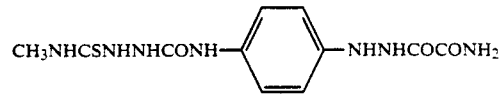

-continued
I-b-151
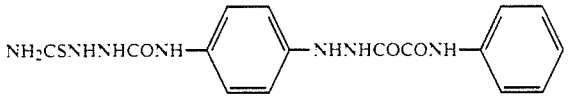
I-b-152
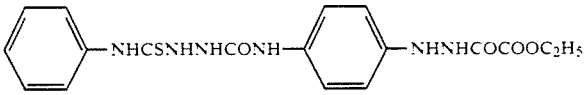
I-b-153
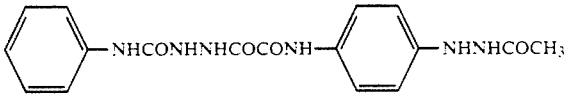
I-b-154
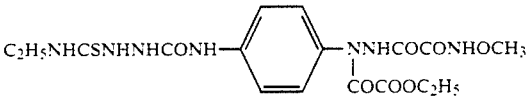
I-b-155
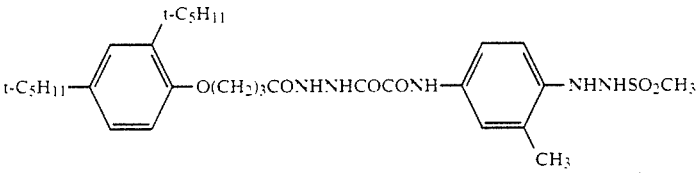
I-b-156
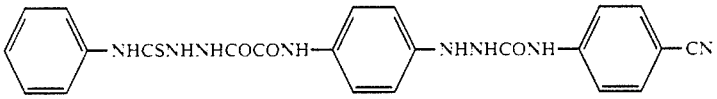
I-b-157
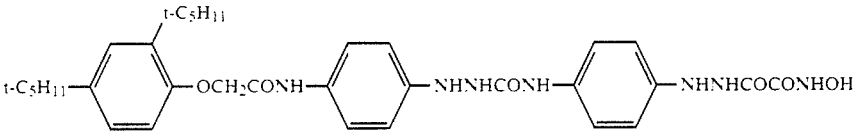
I-b-158
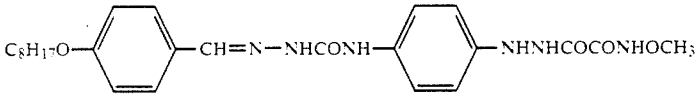
I-b-159
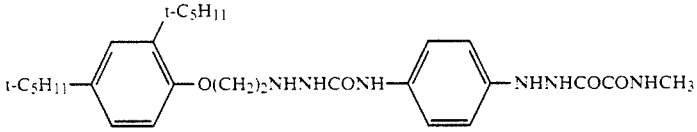
I-b-160
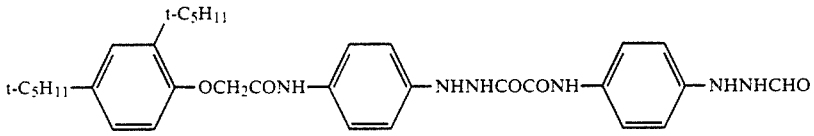
I-b-161
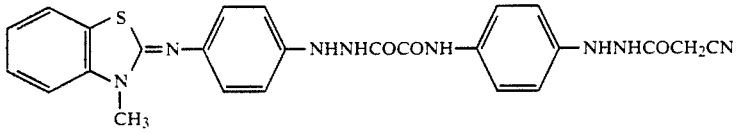
I-b-162
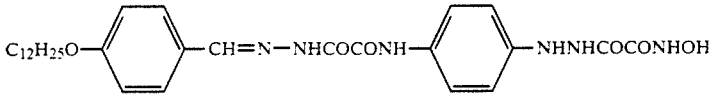

-continued

I-b-163

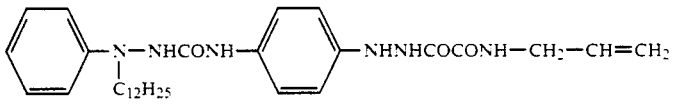

I-b-164

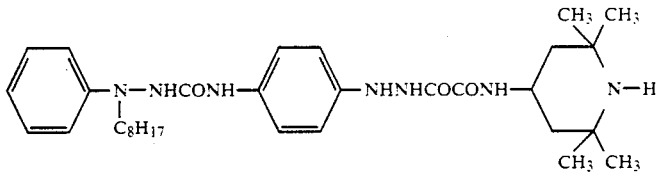

I-b-165

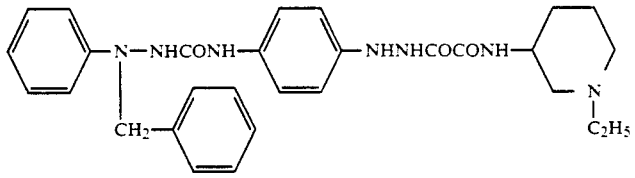

I-b-166

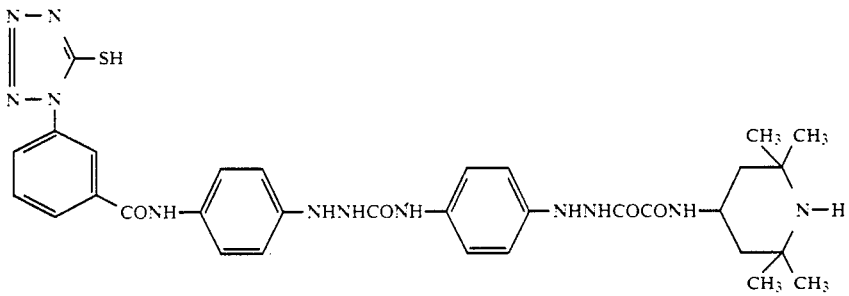

I-b-167

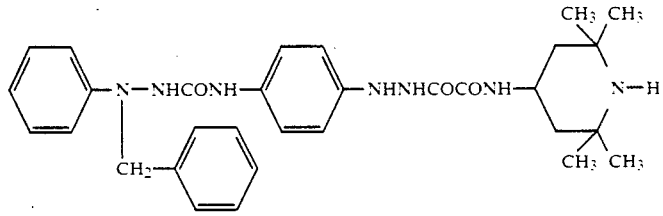

I-b-168

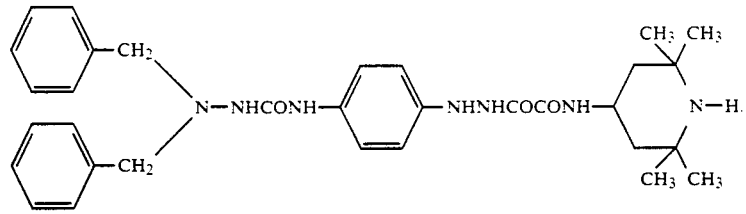

3. The negative type light-sensitive silver halide photographic material according to claim 1, wherein said hydrazine compound is used in an amount of $10^{-5}$ to $10^{-1}$ mole/1 mole of silver.

4. The negative type light-sensitive silver halide photographic material according to claim 1, wherein the amount of said gelatin coated, when containing no polymer latex other than subbing layer on the surface corresponding to the surface of the light-sensitive material, is 1.8 g/m$^2$ to 5.5 g/m$^2$, and when a polymer latex is contained on that surface, is 1.5 to 6.0 g/m$^2$.

5. In a method of developing a negative type light-sensitive silver halide photographic material wherein the negative type light-sensitive silver halide material is subjected to a developing step in a developer, followed by stopping, stabilizing and fixing, the improvement wherein the developing step is for 19 seconds or less and the negative-type light sensitive silver halide material comprises light-sensitive silver halide emulsion provided on a support, wherein the ratio of silver amount to gelatin amount (Ag/Gel) (wherein said silver amount is the total silver amount in one or more layers provided in the same side as said light-sensitive silver halide emulsion layer with respect to the support, and said gelatin amount is the total gelatin amount in one or more gelatin layers provided in the same side as said light-sensitive silver halide emulsion layer with respect to the support) is 1.0 or more, and a hydrophilic colloid layer in said light-sensitive silver halide emulsion contains a hydrazine compound of the formula (I-b) shown below:

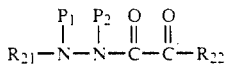

Formula (I-b)

wherein $R_{21}$ represents an aliphatic group, an aromatic group or a heterocyclic group, $R_{22}$ represents hydrogen atom, an alkoxy group which may be substituted, a heterocyclic oxy group, an amino group or an aryloxy group, $P_1$ and $P_2$ each represent hydrogen atom, an acyl group or a sulfinic acid group.

6. The method of developing a negative type light-sensitive silver halide photographic material according to claim 5, wherein said hydrazine compound is used in an amount of $10^{-5}$ to $10^{-1}$ mole/mole of silver.

7. The method of developing a negative type light-sensitive silver halide photographic material according to claim 5, wherein the amount of said gelatin coated, when containing no polymer latex other than subbing layer on the surface corresponding to the surface of the light-sensitive material, is 1.8 g/m$^2$ to 5.5 g/m$^2$ and when a polymer latex is contained on that surface, is 1.5 to 6.0 g/m$^2$.

8. The method of claim 5, wherein the developing time is 15 seconds or less.

9. The method of claim 8, wherein the developing time is 10 to 15 seconds.

* * * * *